United States Patent
Hashi et al.

(10) Patent No.: US 8,754,949 B2
(45) Date of Patent: Jun. 17, 2014

(54) SHAKE MEASUREMENT SYSTEM, SHAKE MEASUREMENT METHOD, AND IMAGING DEVICE

(75) Inventors: Hideyuki Hashi, Osaka (JP); Kenichi Hayashi, Nara (JP); Hiroya Kusaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 348 days.

(21) Appl. No.: 13/131,776

(22) PCT Filed: Nov. 27, 2009

(86) PCT No.: PCT/JP2009/006431
§ 371 (c)(1),
(2), (4) Date: May 27, 2011

(87) PCT Pub. No.: WO2010/061627
PCT Pub. Date: Jun. 3, 2010

(65) Prior Publication Data
US 2011/0228102 A1  Sep. 22, 2011

(30) Foreign Application Priority Data
Nov. 28, 2008 (JP) .................... 2008-305085

(51) Int. Cl.
*H04N 5/228* (2006.01)
(52) U.S. Cl.
USPC .............. 348/208.1; 348/208.99; 348/208.2; 348/208.4
(58) Field of Classification Search
USPC .............. 348/208.99–208.2, 208.4
See application file for complete search history.

(56) References Cited

U.S. PATENT DOCUMENTS

| | | | |
|---|---|---|---|
| 5,649,237 A | 7/1997 | Okazaki | |
| 8,077,923 B2 * | 12/2011 | Tsubaki et al. | 382/107 |
| 8,259,183 B2 * | 9/2012 | Tomita et al. | 348/208.4 |
| 2009/0097836 A1 * | 4/2009 | Tanaka et al. | 396/106 |
| 2009/0128638 A1 | 5/2009 | Okada | |
| 2010/0014846 A1 | 1/2010 | Nishi et al. | |

FOREIGN PATENT DOCUMENTS

| | | |
|---|---|---|
| JP | 03-037616 | 2/1991 |
| JP | 03-046642 | 2/1991 |
| JP | 07-225405 | 8/1995 |
| JP | 10-322584 | 12/1998 |
| JP | 2000-307937 | 11/2000 |

(Continued)

OTHER PUBLICATIONS

Nishi, K., et al., "3D Camera-Shake Measurement and Analysis", IEICE Technical Report, Jan. 2007.

*Primary Examiner* — Anthony J Daniels
(74) *Attorney, Agent, or Firm* — McDermott Will & Emery LLP

(57) ABSTRACT

A shake measurement system (1) is an apparatus for measuring the amount of shake of a camera (2), and comprises a first shake amount acquisition section, a second shake amount acquisition section, and a third shake amount acquisition section. The first shake amount acquisition section uses image processing to acquire the amount of shake of the camera (2) as a first shake amount. The second shake amount acquisition section acquires the amount of shake of the camera (2) as a second shake amount by a different method from that of the first shake amount acquisition section. The third shake amount acquisition section acquires the amount of translational shake of the camera (2) on the basis of the first shake amount and the second shake amount.

21 Claims, 36 Drawing Sheets

(56) References Cited

FOREIGN PATENT DOCUMENTS

| | | |
|---|---|---|
| JP | 2003-209736 | 7/2003 |
| JP | 2005311674 A * | 11/2005 |
| JP | 2007-158853 | 6/2007 |
| JP | 2008-205915 | 9/2008 |
| JP | 2009-105784 | 5/2009 |
| WO | WO 2008/078537 A1 | 7/2008 |

* cited by examiner

SHAKE MEASUREMENT SYSTEM, SHAKE MEASUREMENT METHOD, AND IMAGING DEVICE

RELATED APPLICATIONS

This application is the U.S. National Phase under 35 U.S.C. §371 of International Application No. PCT/JP2009/006431, filed on Nov. 27, 2009, which in turn claims the benefit of Japanese Application No. 2008-305085, filed on Nov. 28, 2008, the disclosures of which Applications are incorporated by reference herein.

TECHNICAL FIELD

The technology disclosed herein relates to a shake measurement system for measuring the amount of shake of an imaging device, and to an imaging device that has a blur correction function.

BACKGROUND ART

When an imaging device is shaken during image capture, there is the danger that the optical image formed by the optical system will be displaced with respect to the imaging element, causing the acquired image to be blurry. In view of this, a blur correction device has been used to reduce the effect that shaking of the imaging device has on the image.

For example, a blur correction device has an image blur correction unit for driving a correcting lens, an angular velocity sensor for detecting the amount of shake of the housing, and a correction controller for controlling the operation of the blur correction unit according to the output of the angular velocity sensor. With an imaging device equipped with this blur correction device, the correcting lens is driven by the blur correction unit on the basis of the amount of shake detected by the angular velocity sensor, so as diminish the displacement of the optical image with respect to the imaging element. This reduces the effect that shaking of the imaging device has on the image, and allows a better image to be acquired (see Patent Literature 1, for example).

CITATION LIST

Patent Literature

Patent Literature 1: Japanese Laid-Open Patent Application H3-37616
Patent Literature 2: International Laid-Open Patent Application 08/078537 pamphlet

SUMMARY ON THE INVENTION

The shake measurement system disclosed in Patent Literature 2 has been proposed to measure the amount of shake of an imaging device. This shake measurement system is an apparatus for measuring the amount of shake in various kinds of imaging device, and has a display section that successively displays a plurality of test patterns, a memory section that stores a plurality of test patterns, and a pattern matching processor. The pattern matching processor performs pattern matching between the plurality of test patterns and the image on the display section acquired by the imaging device. Consequently, the amount of shake of the imaging device that appears in the image of the test patterns can be calculated for every test pattern, and time-series data for the amount of shake of the imaging device can be acquired.

The shaking of an imaging device is not limited to just rotational shake around the X, Y, and Z axes, but also includes translational shake that occurs when the imaging device itself moves in parallel. This translational shake also includes rotational movement of the imaging device that occurs when the rotational center of the rotational shake moves away from the imaging device. The inventors have already verified that the effect that translational shake has on an image is not insignificant, and therefore not just the amount of rotational shake, but also the amount of translational shake must be taken into account to measure the amount of shake accurately.

The above-mentioned shake measurement system, however, does not factor in translational shake, and the amount of shake obtained by pattern matching is computed as the rotational shake of the imaging device, so the amount of translational shake cannot be measured. In other words, with a conventional measurement device, it is difficult to raise the measurement accuracy for the amount of shake.

Also, the amount of translational shake has a relatively strong influence, so a blur correction device that takes the amount of translational shake into account is necessary, but if an acceleration sensor is installed to measured translational shake, this leads to higher costs of the machinery. Also, the detection accuracy of an acceleration sensor is problematic when the sensor is used to detect the amount of translational shake.

The technology disclosed herein has as its goal to provide a shake measurement system with which the measurement accuracy for the amount of shake can be improved. The technology disclosed herein also has as its goal to raise the blur correction performance of an imaging device.

A shake measurement system disclosed herein is an apparatus for measuring an amount of shake of an imaging device, and comprises a first shake amount acquisition section, a second shake amount acquisition section, and a third shake amount acquisition section. The first shake amount acquisition section is configured to acquire an amount of shake of the imaging device as a first shake amount by using image processing. The second shake amount acquisition section is configured to acquire an amount of shake of the imaging device as a second shake amount by a different method from the method of the first shake amount acquisition section. The third shake amount acquisition section is configured to acquire an amount of translational shake of the imaging device on the basis of the first shake amount and the second shake amount.

With this shake measurement system, the first shake amount acquisition section uses image processing to acquire the amount of shake of the imaging device as a first shake amount. Since image processing is utilized, the first shake amount includes the amount of shake when the imaging device moves in parallel (translation), or the rotational movement of the imaging device that occurs when the rotational center of rotational shake moves away from the imaging device.

Meanwhile, the second shake amount acquisition section acquires the amount of shake of the imaging device as a second shake amount by a different method from that of the first shake amount acquisition section. Since the second shake amount is acquired by a different method from that of the first shake amount acquisition section, the second shake amount does not include translational shake.

Furthermore, the third shake amount acquisition section acquires the amount of translational shake of the imaging device on the basis of the first and second shake amounts.

Thus, with this shake measurement system, the amount of shake of the housing can be acquired as a first shake amount and a second shake amount by two different methods. so the first shake amount and second shake amount can be used to acquire the amount of translational shake, and the amount of shake can be measured more accurately.

An imaging device disclosed herein comprises a housing, an image acquisition section, a first shake amount acquisition section, a second shake amount acquisition section, a third shake amount acquisition section, and a blur correction device. The image acquisition section is housed in the housing and is configured to acquire image data for a subject. The first shake amount acquisition section is configured to acquire an amount of shake of the housing as a first shake amount on the basis of the image data acquired by the image acquisition section. The second shake amount acquisition section is configured to acquire an amount of shake of the housing as a second shake amount by a different method from the method of the first shake amount acquisition section. The third shake amount acquisition section is configured to acquire an amount of translational shake of the housing on the basis of the first shake amount and the second shake amount. The blur correction device is configured to reduce the effect that shake of the housing has on the image data on the basis of the second shake amount and the third shake amount.

With this imaging device, the first shake amount acquisition section acquires the amount of shake of the housing as a first shake amount by using the image processing. Since image processing is utilized, the first shake amount also includes the amount of shake when the housing moves in parallel (translation), or the rotational movement of the housing that occurs when the rotational center of the rotational shake moves away from the imaging device.

Meanwhile, the second shake amount acquisition section acquires the amount of shake of the housing as a second shake amount by a different method from that of the first shake amount acquisition section. Since the second shake amount is acquired by a different method from that of the first shake amount acquisition section, the second shake amount does not include translational shake.

Furthermore, the third shake amount acquisition section acquires the amount of translational shake of the housing on the basis of the first and second shake amounts.

Thus, with this imaging device, the amount of shake of the housing can be acquired as a first shake amount and a second shake amount by two different methods, so the first shake amount and second shake amount can be used to acquire the amount of translational shake. Therefore, the amount of translational shake can be taken into account in performing blur correction, and blur correction performance can be enhanced.

The concept of "image processing" as used herein includes pattern matching processing in which a plurality of mutually different test patterns are compared with a captured image, processing in which a movement vector is calculated from a captured image, and so forth. An example of a method that is different from that of the first shake amount acquisition section is a method in which a physical change is utilized to detect the amount of shake. More specifically, the amount of shake can be detected, for example, by a MEMS (micro electro-mechanical system) type of gyro sensor that utilizes the Coriolis effect, an optical gyro sensor that utilizes the Sagnac effect, or a mechanical gyro sensor that utilizes rotational momentum.

DESCRIPTION OF EMBODIMENTS

Before describing embodiments, the effect that the position of the rotational center has on the amount of shake will be described.

Effect that Position of Rotational Center has on Shake Amount

Figure 1:
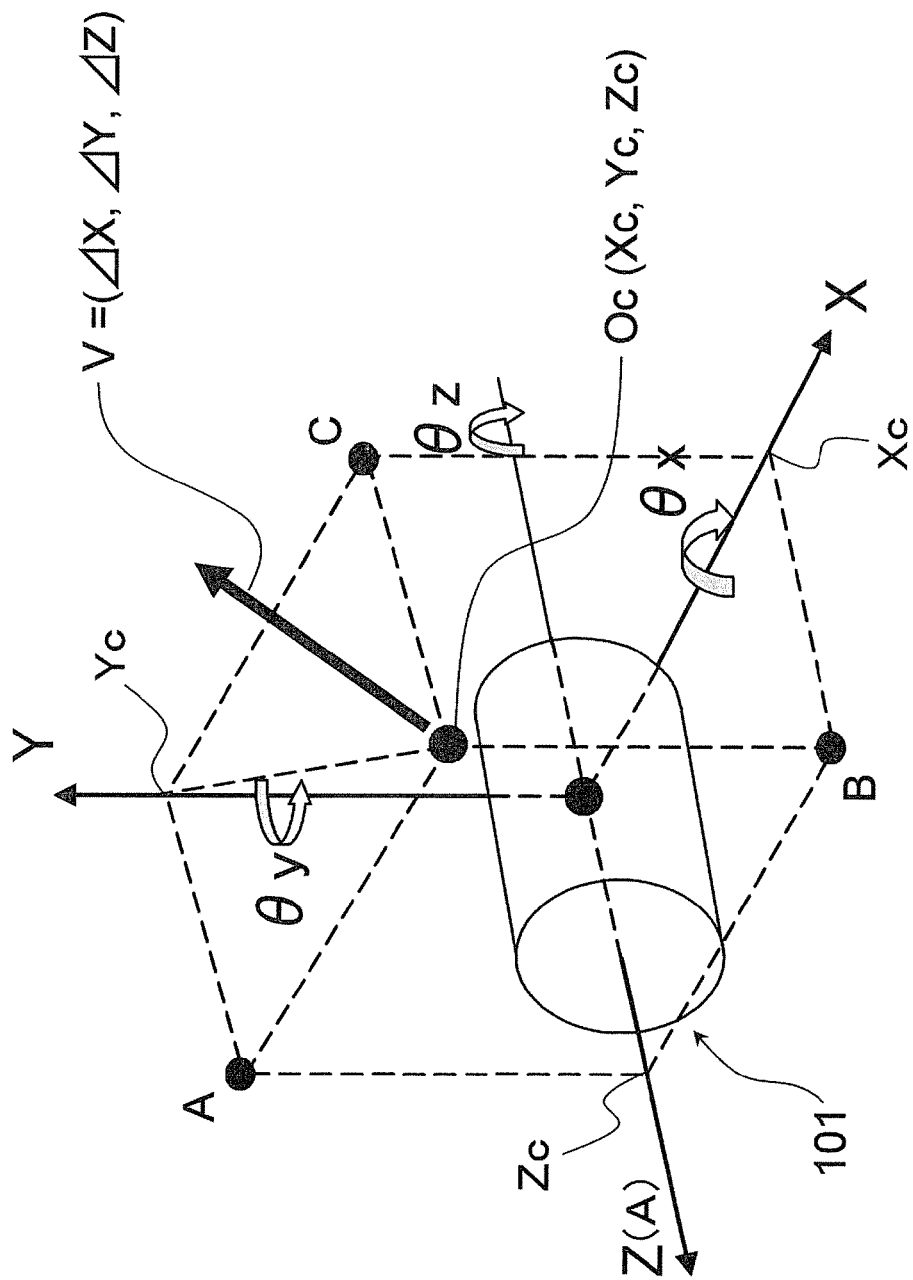
FIG. 1 is a diagram of the camera coordinates.

FIG. 1 shows the coordinate system of a camera 101. The camera 101 is abbreviated with a cylindrical configuration in FIG. 1. As shown in FIG. 1, a perpendicular coordinate system (X, Y, and Z) is set using the optical axis A of the optical system of the camera 101 as a reference. The Z axis coincides with the optical axis A.

Two kinds of shake are possible in the camera 101 during imaging: rotational shake and translational shake. Rotational shake refers to shaking of the camera 101 caused by rotation of the camera 101 around a point present in the coordinate system. Translational shake refers to shaking of the camera 101 caused by movement of the camera 101 with respect to the coordinate system in a state in which there is no change in the angle (orientation) of the camera 101 with respect to the coordinate system. The translational shake includes rotational movement of the camera 101 that occurs when the rotational center of the rotational shake moves away from the camera 101. Usually, the shaking of the camera 101 is a combination of these two kinds of shake.

We will let the rotational center of rotational shake of the camera 101 be Oc (Xc, Yc, Zc), the rotational angle of rotational shake around the X axis be the angle θx (pitch component), the rotational angle around the Y axis be the angle θy (yaw component), and the rotational angle around the Z axis be the angle θz (roll component). We will let the X axis component of the translational shake V of the camera 101 be ΔX, the Y axis component be ΔY, and the Z axis component be ΔZ.

(1) The Effect that the Rotational Angle θx has on the Shake Amount

Figure 2:
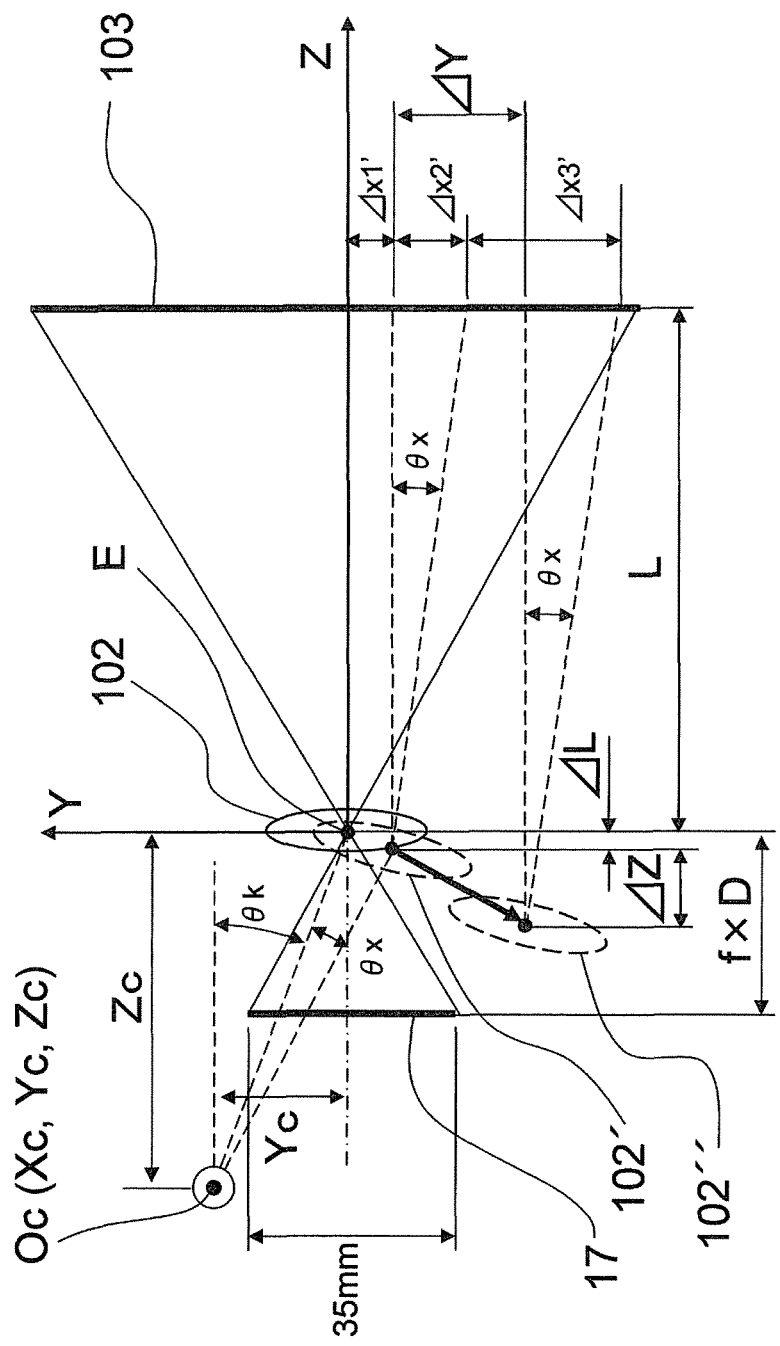
FIG. 2 is a schematic of the effect that the rotational angle θx has on the amount of shake.

FIG. 2 is a schematic of the effect that the rotational angle θx has on the amount of shake. In FIG. 2, for the sake of convenience, the optical system O is substituted with a single lens 102. We will let L be the distance (imaging distance) from the lens 102 to a subject 103 in a state in which no shake of the camera 101 is occurring, and let f×D be the distance from the lens 102 to the imaging element 17 in a state in which no shake of the camera 101 is occurring. Here, f is the focal length (such as 35 mm), and D is the optical zoom ratio.

In FIG. 2, if we assume that the lens 102 has moved to a position 102' after the camera 101 rotates by the angle θx around the point Oc (Xc, Yc, Zc), then the shake amount Δbx' of the camera 101 when viewed in the X axis direction is expressed by the following equation.

$$\Delta bx' = \Delta x1' + \Delta x2' \quad \text{[Mathematical Formula 1]}$$

Here, the shake amount Δx2' is the rotational component of the shake amount of the camera 101 when the center E of the lens 102 is used as a reference, and the shake amount Δx1' is the translational component of the shake amount of the camera 101 caused by offset of the center E of the lens 102 and the rotational center Oc.

When geometrically calculated, the shake amounts Δx1', ΔL, and Δx2' are expressed by the following equations.

When Zc=0, $$\Delta x1' = Yc - Yc \times \cos\theta x \quad \text{[Mathematical Formula 2]}$$

$$\Delta L = Yc \times \sin\theta x \quad \text{[Mathematical Formula 3]}$$

When Zc≠0, $$\Delta x1' = \sqrt{Yc^2 + Zc^2} \times \sin(\theta x + \theta k) - Yc \quad \text{[Mathematical Formula 4]}$$

$$\Delta L = Zc - \sqrt{Yc^2 + Zc^2} \times \cos(\theta x + \theta k) \quad \text{[Mathematical Formula 5]}$$

$$\Delta x2' = (L + \Delta L) \times \tan\theta x \quad \text{[Mathematical Formula 6]}$$

Furthermore, if we assume that a lens 102' has moved to a position 102" due to translational shake V (ΔX, ΔY, ΔZ), then the translational shake amount Δx3' is expressed by the following equation.

$$\Delta x3' = \Delta Y + \Delta Z \times \tan\theta x \quad \text{[Mathematical Formula 7]}$$

Because of the above, the shake amount Δbx' is expressed by the following equation.

$$\Delta bx' = \Delta x1' + \Delta Y + (L + \Delta L + \Delta Z) \times \tan\theta x \quad \text{[Mathematical Formula 8]}$$

(2) The Effect that the Rotational Angle θy has on the Shake Amount

Figure 3:
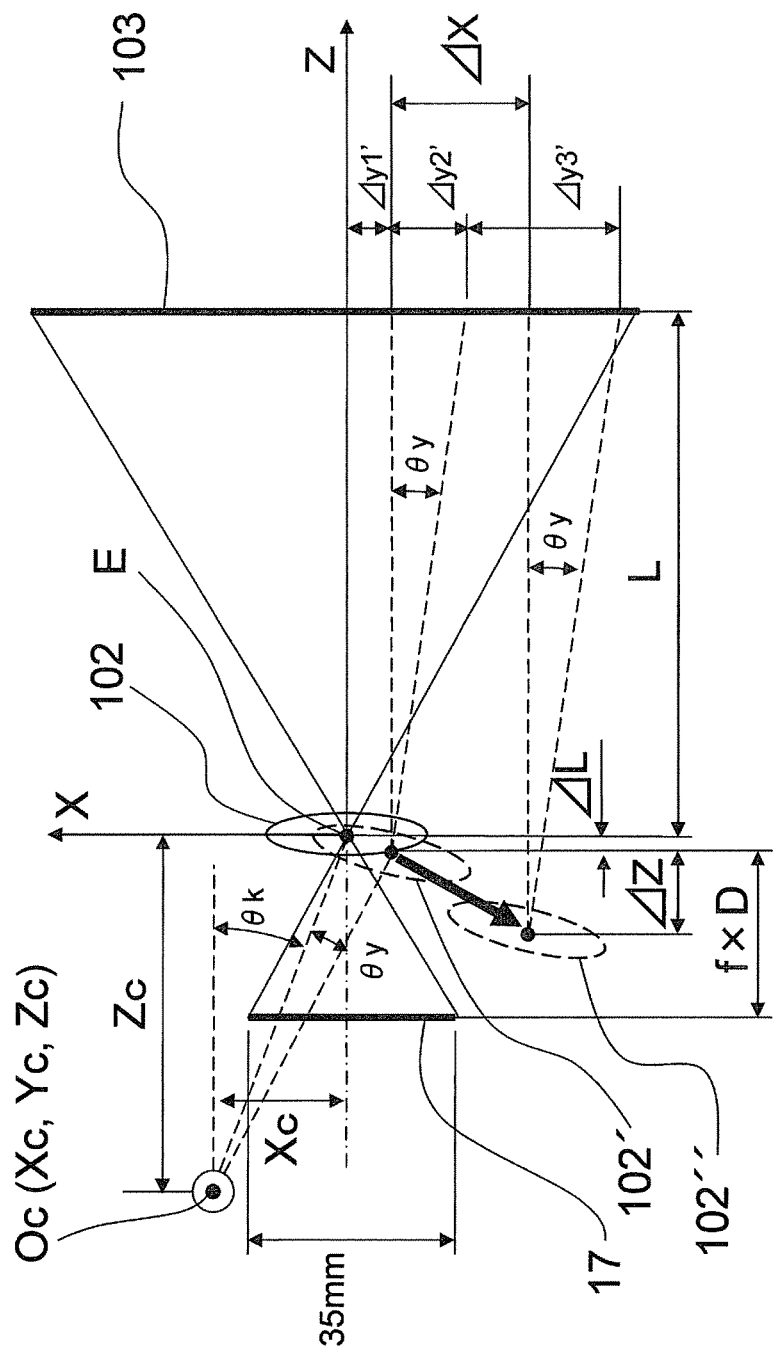
FIG. 3 is a schematic of the effect that the rotational angle θy has on the amount of shake.

FIG. 3 is a schematic of the effect that the rotational angle θy has on the amount of shake. In FIG. 3, just as with FIG. 2, the optical system O is substituted with a single lens 102, and we will let L be the distance (imaging distance) from the lens 102 to the subject 103 in a state in which no shake of the camera 101 is occurring, and let f×D be the distance from the lens 102 to the imaging element 17 in a state in which no shake of the camera 101 is occurring. Here, f is the focal length (such as 35 mm), and D is the optical zoom ratio.

In FIG. 3, when the camera 101 has rotated by the angle θy around the rotational center Oc (Xc, Yc, Zc), and as a result the lens 102 has moved to the position 102', then the shake amount Δby' of the camera 101 when viewed in the Y axis direction is expressed by the following equation.

$$\Delta by' = \Delta y1' + \Delta y2' \quad \text{[Mathematical Formula 9]}$$

Here, the shake amount Δy2' is the rotational component of the shake amount of the camera 101 when the center E of the lens 102 is used as a reference, and the shake amount Δy1' is the translational component of the shake amount of the camera 101 caused by offset of the center E of the lens 102 and the rotational center Oc.

When geometrically calculated, the shake amounts Δy1', ΔL, and Δy2' are expressed by the following equations.

When Zc=0, $$\Delta y1' = Xc - Xc \times \cos\theta y \quad \text{[Mathematical Formula 10]}$$

$$\Delta L = Xc \times \sin\theta y \quad \text{[Mathematical Formula 11]}$$

When Zc=0, $$\Delta y1' = \sqrt{Xc^2 + Zc^2} \times \sin(\theta y + \theta k) - Xc \quad \text{[Mathematical Formula 12]}$$

$$\Delta L = Zc - \sqrt{Xc^2 + Zc^2} \times \cos(\theta y + \theta k) \quad \text{[Mathematical Formula 13]}$$

$$\Delta y2' = (L + \Delta L) \times \tan\theta y \quad \text{[Mathematical Formula 14]}$$

Furthermore, if we assume that a lens 102' has moved to a position 102" due to translational shake V (ΔX, ΔY, ΔZ) of the camera 101, then the translational shake amount Δy3' is expressed by the following equation.

$$\Delta y3' = \Delta X + \Delta Z \times \tan\theta y \quad \text{[Mathematical Formula 15]}$$

Because of the above, the shake amount Δby' is expressed by the following equation.

$$\Delta by' = \Delta 1' + \Delta X + (L + \Delta L + \Delta Z) \times \tan \theta y \quad \text{[Mathematical Formula 16]}$$

(3) Shake Amount when Viewed in the Z Axis Direction

Figure 4:
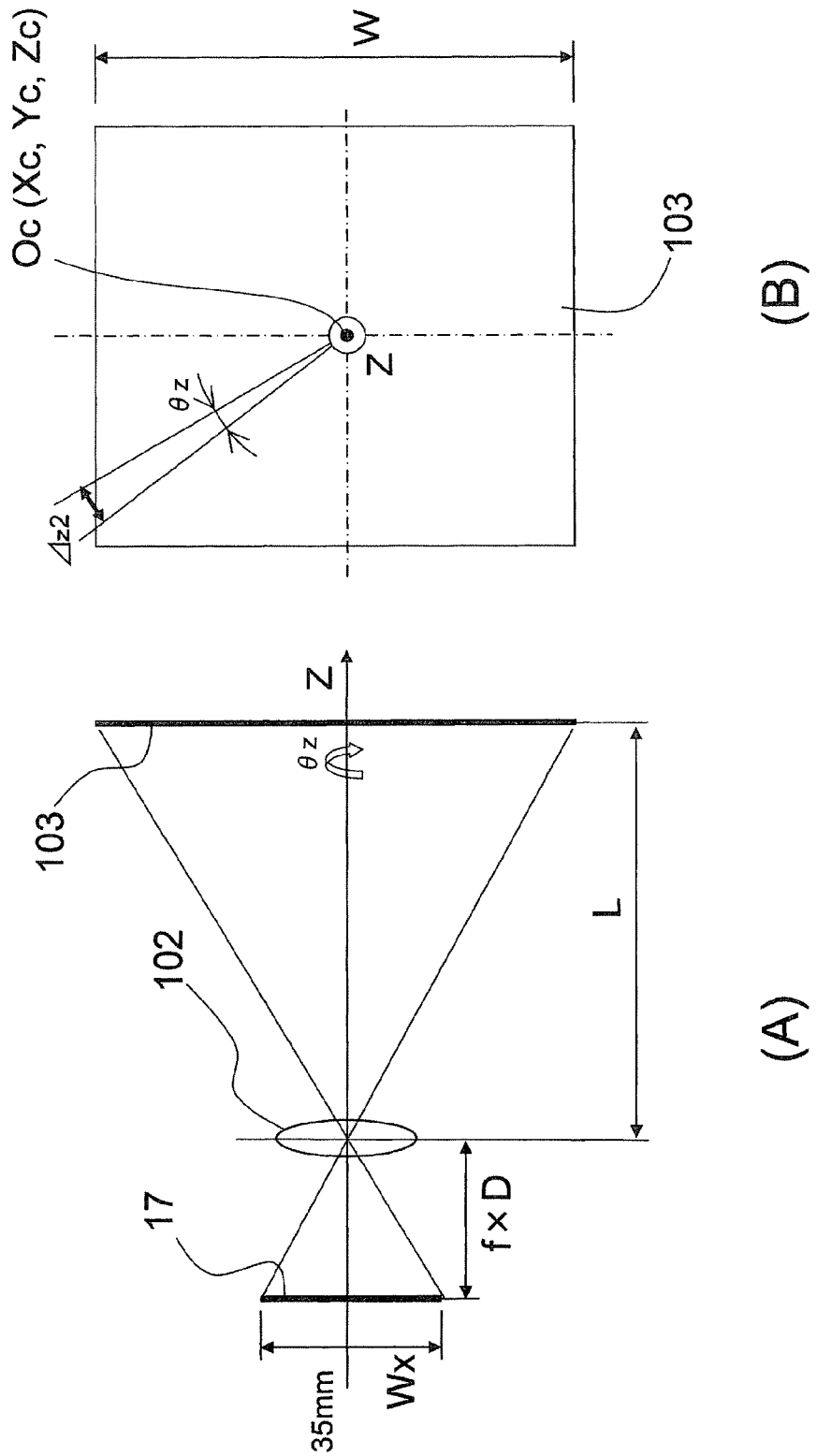
FIGS. 4A and 4B are diagrams illustrating the amount of shake Δz2 when the rotational center Oc coincides with the center E of a lens 102.
Figure 5:
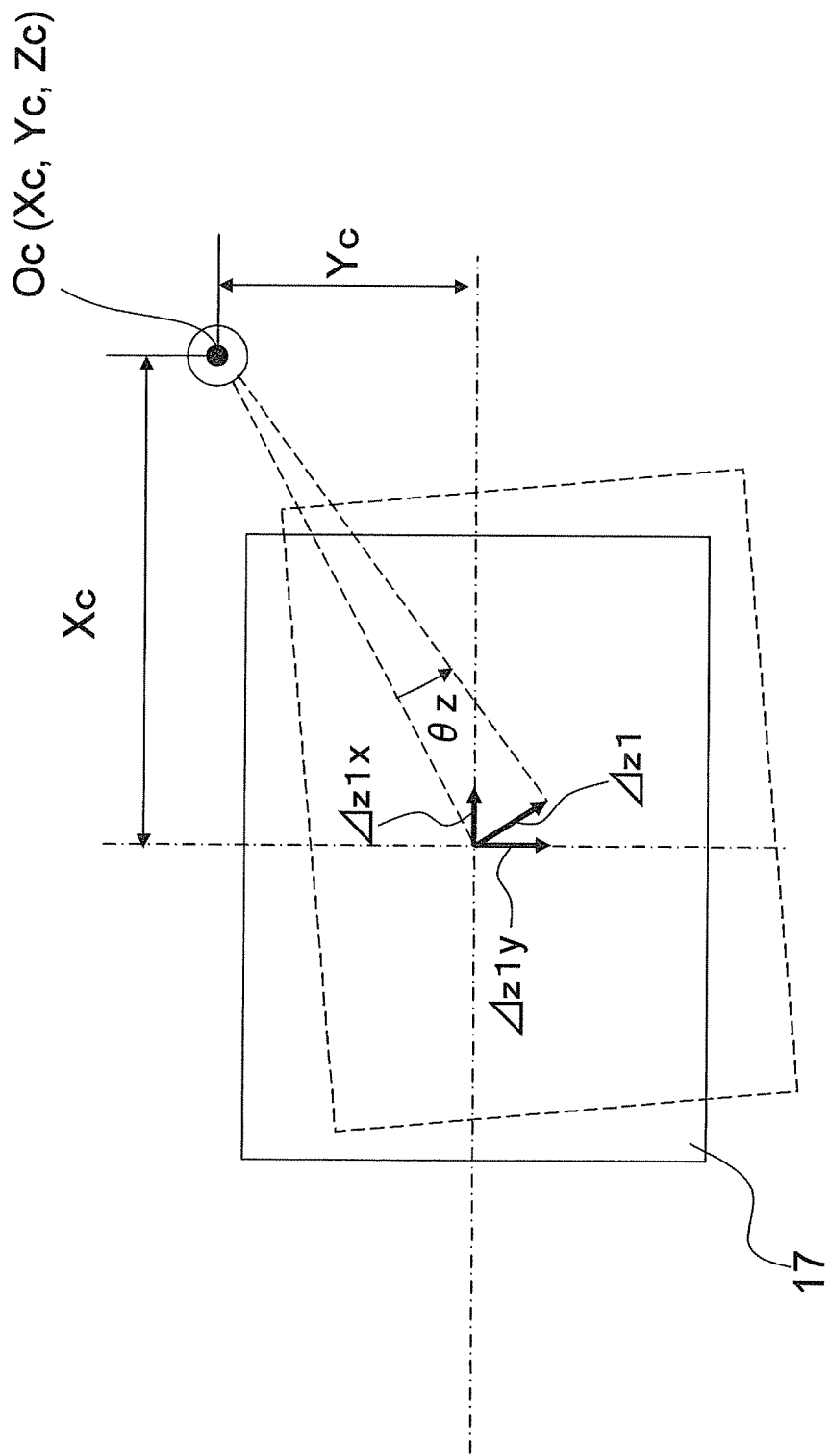
FIG. 5 is a diagram illustrating the amount of shake Δz1 when the rotational center Oc is offset from the center E of the lens 102.

FIGS. 4A and 4B are diagrams illustrating the amount of shake Δz2 of the camera 101 when the rotational center Oc coincides with the center F of the lens 102. FIG. 5 is a diagram illustrating the amount of shake Δz1 when the rotational center Oc is offset from the center E of the lens 102. As shown in FIGS. 4A and 4B, when the rotational center Oc coincides with the center F of the lens 102, the lens 102 rotates by the angle θz around the optical axis A. In this case, the lateral width W of the subject 103 is expressed by the following equation.

$$W = 36 \times L / (f \times D) \quad \text{[Mathematical Formula 17]}$$

Therefore, if we let Wx be the lateral width of the imaging element 17, and Wy be the longitudinal width of the imaging element 17, the shake amount Δz2 is expressed by the following equation.

$$\Delta z2 = 36 / (Wx \times f \times D) \times \sqrt{Wx^2 + Wy^2} \times \sin(\theta z / 2) \quad \text{[Mathematical Formula 18]}$$

In FIG. 5, if the rotational center Oc is offset from the center E, the lens 102 rotates by the angle θz around the rotational center Oc (Xc, Yc, Zc). Therefore, the shake amount Δz1 caused by offset of the center E and the rotational center Oe is expressed by the following equation.

$$\Delta z1 = \sqrt{Xc^2 + Yc^2} \times \tan \theta z \quad \text{[Mathematical Formula 19]}$$

Therefore, the shake amount Δbz when viewed in the Z axis direction is expressed by the following equation.

$$\Delta bz = \Delta z1 + \Delta z2 \quad \text{[Mathematical Formula 20]}$$

(4) Shake Amount Calculation Results

When it is calculated, on the basis of the above relation, who the pitch component Δbx', the yaw component Δby', and the roll component Δbz of the shake amount of the camera 101 (more precisely, the pitch, yaw, and roll components of the amount of displacement of an optical image with respect to the imaging element 17 calculated on the basis of the pitch component Δbx', the yaw component Δby', and the roll component Δbz) are affected by the optical zoom ratio D and the imaging distance L, the following results are obtained. In this calculation, it was assumed that the focal length f was 28 mm when the optical zoom ratio D=1, the optical zoom ratio D was 1 to 10 times, and the imaging element 17 was a CCD with 7,200,000 pixels and a 1/2.5 format.

As discussed above, regarding the rotational shake of the camera 1, it has been confirmed experimentally that the angles θx, θy, and θz are about the same, and this has been discussed, for example, "3D Measurement and Quantification of Hand Shake" published in IEICE Technical Report PRMU2006-202 (2007-1). The fact that the maximum rotational angle of rotational shake is about 0.5° has also been confirmed experimentally in the past. Therefore, we will assume the rotational angles here to be θx=θy=θz=0.5°.

Figure 6:
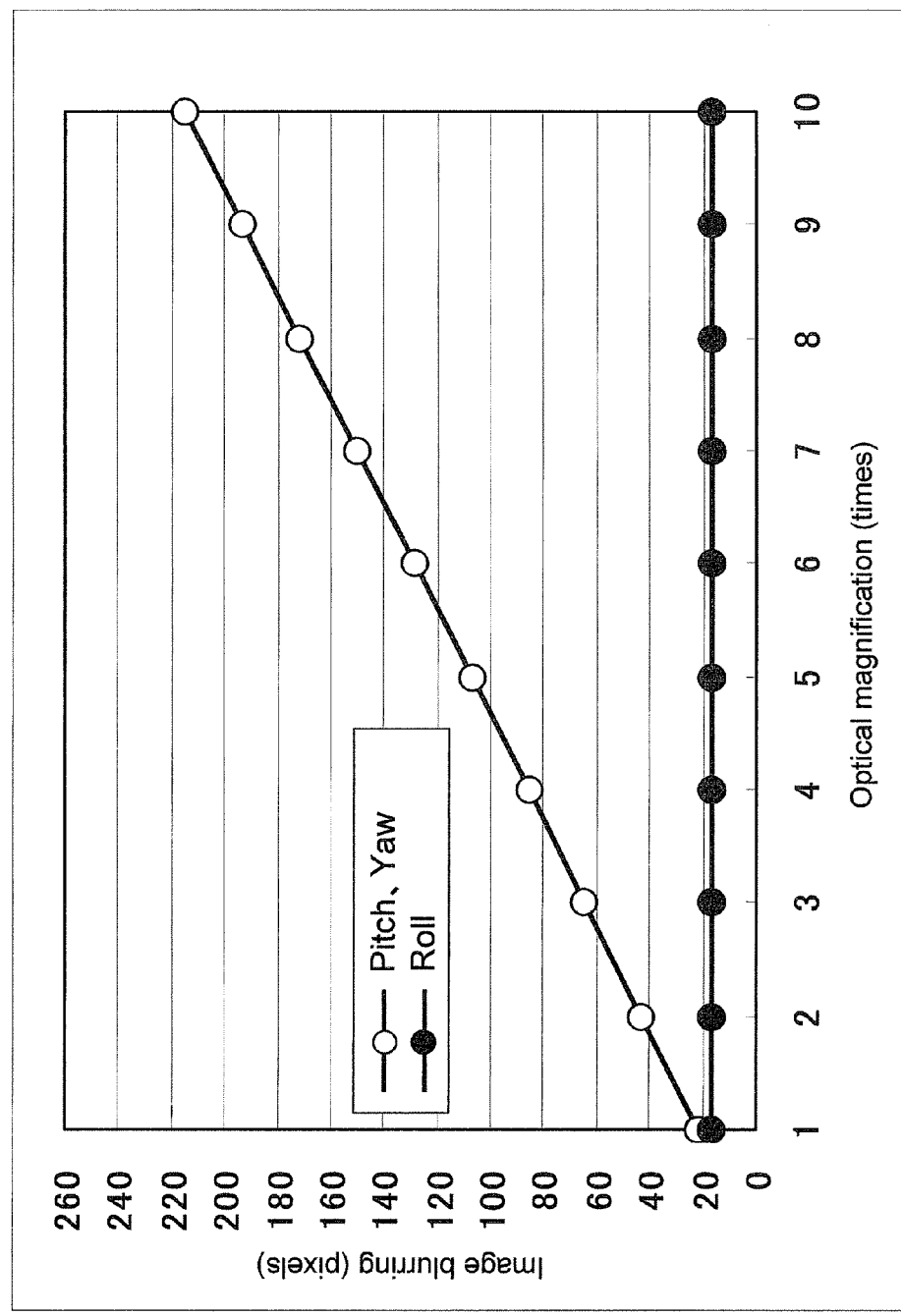
FIG. 6 is a graph of the results of calculating the pitch, yaw, and roll components of the amount of shake.

FIG. 6 is a graph of the results of calculating the pitch, yaw, and roll components of the amount of shake when the rotational center Oc coincides with the center E of the lens 102 and there is no translational shake of the camera 101. That is, FIG. 6 shows the results of calculating when Xc=Yc=Zc=0. The amount of image blur referred to here is the amount of displacement of an optical image with respect to the imaging element 17 caused by shaking of the camera 101. The pitch, yaw, and roll components of the amount of image blur are calculated on the basis of the above-mentioned pitch component Δbx', yaw component Δby', and roll component Δbz, and are each expressed as a pixel count. It can be seen from FIG. 6 that the pitch, yaw, and roll components of the amount of image blur are about the same when the optical zoom ratio D is low, but as the optical zoom ratio D rises, the pitch, yaw, and roll components of the amount of image blur increase.

Figure 7:
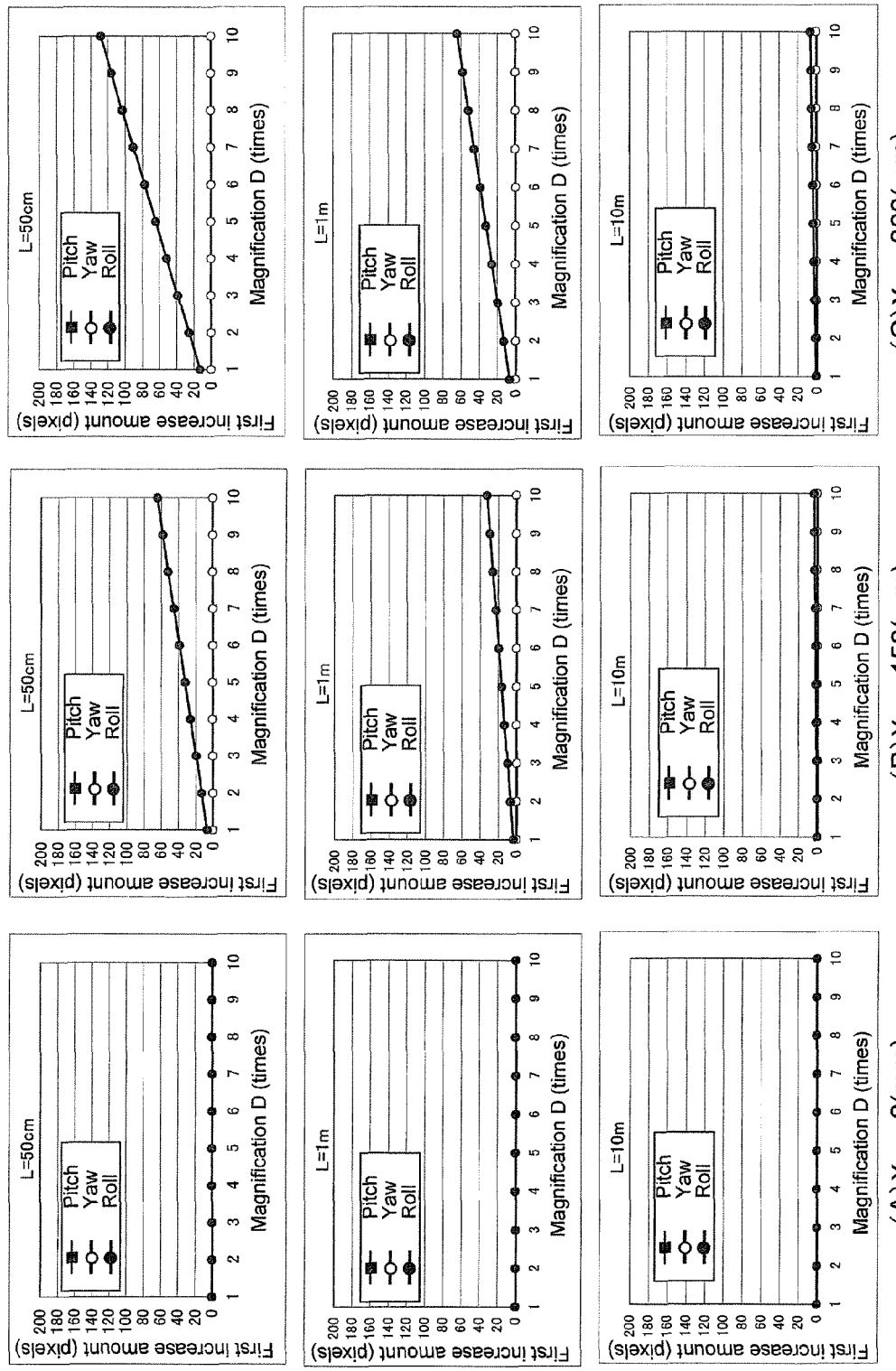
FIGS. 7A to 7C are graphs of the relation between a first increase amount and the X axis component Xc of the rotational center Oc.
Figure 8:
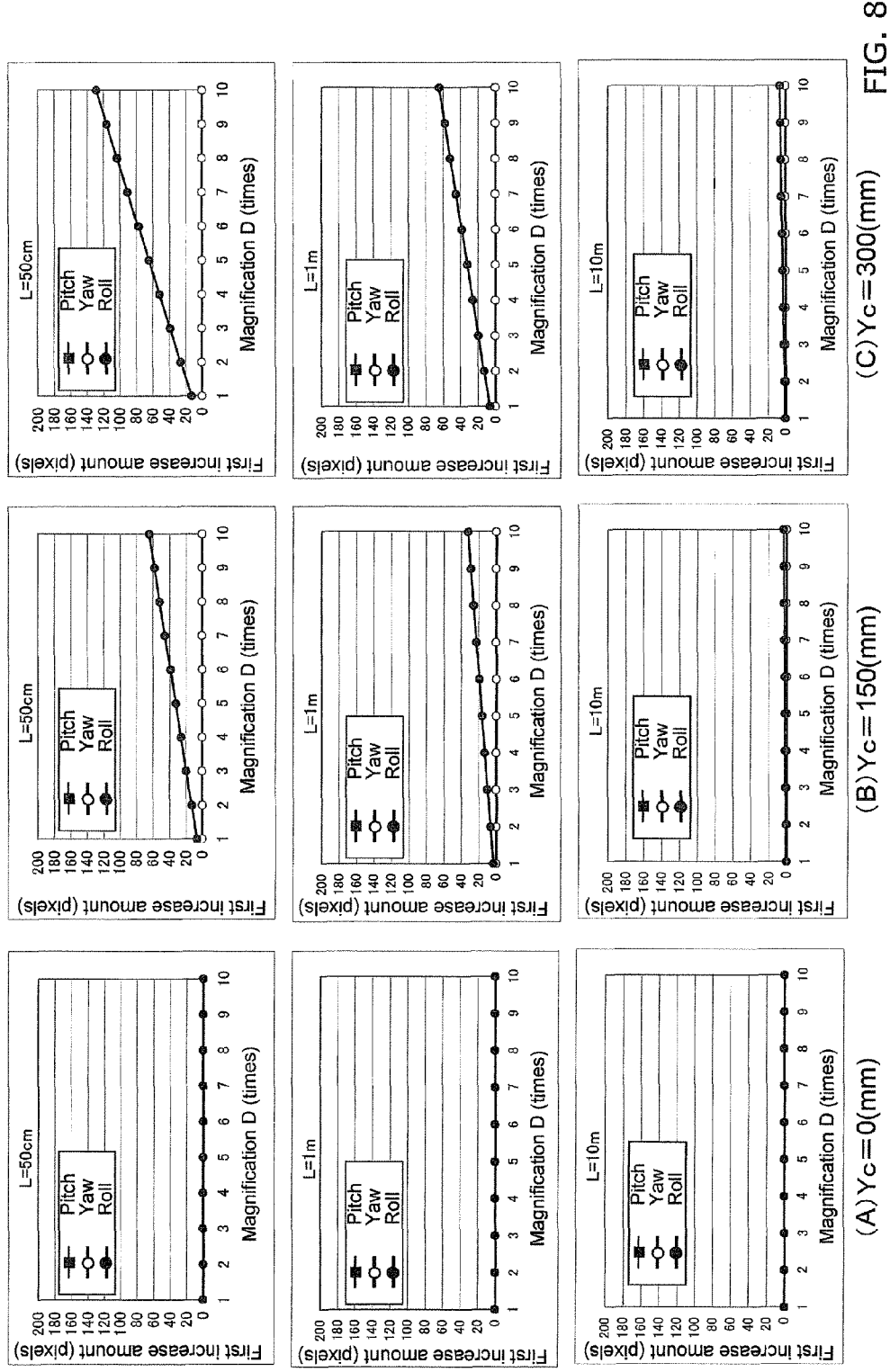
FIGS. 8A to 8C are graphs of the relation between a first increase amount and the Y axis component Yc of the rotational center Oc.
Figure 9:
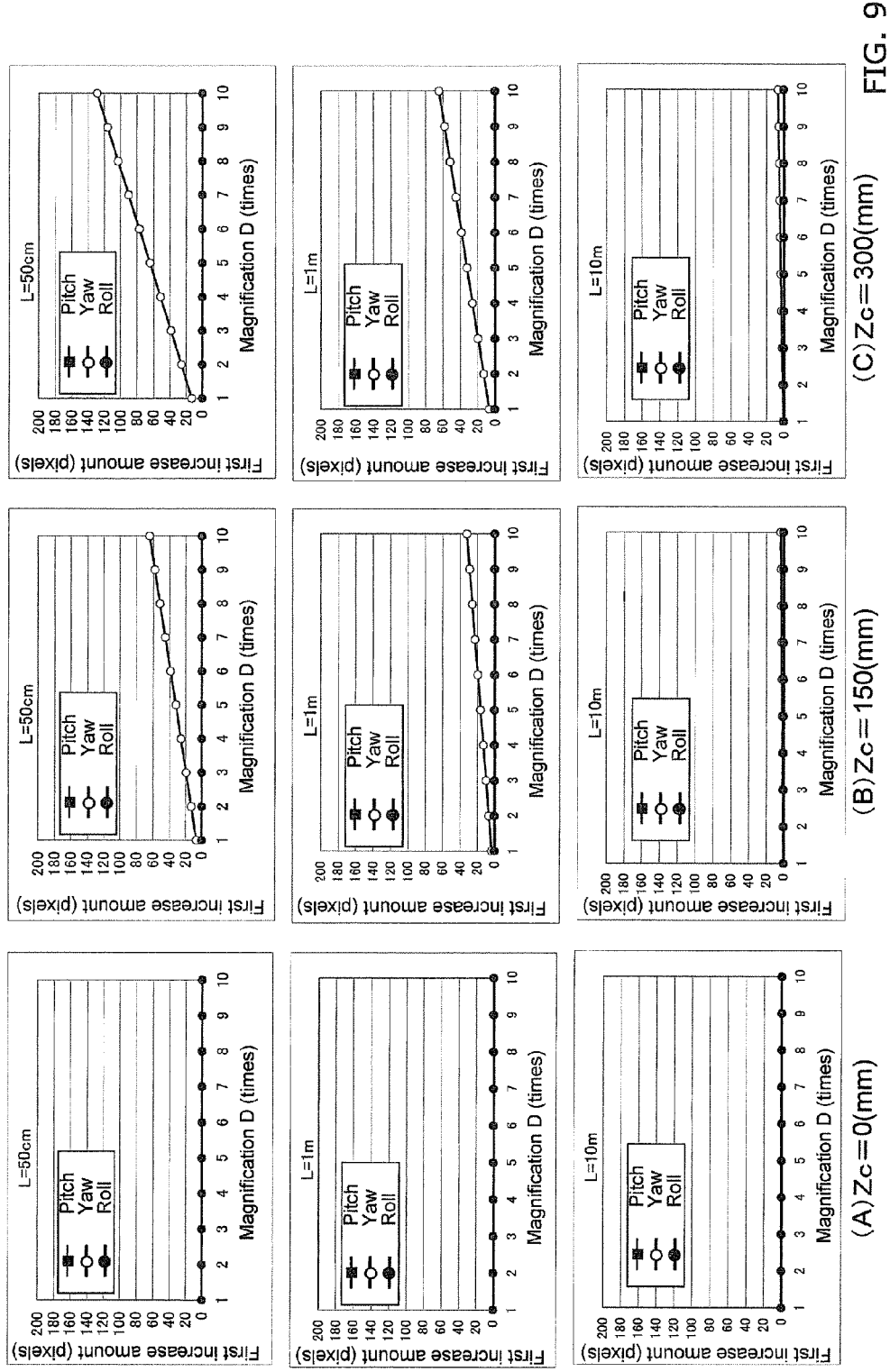
FIGS. 9A to 9C are graphs of the relation between a first increase amount and the Z axis component Zc of the rotational center Oc.

Next, a case in which the rotational center Oc is offset from the center E of the lens 102 will be described. FIGS. 7A to 7C are graphs of the relation between a first increase amount and the X axis component Xc of the rotational center Oc, FIGS. 8A to 8C are graphs of the relation between a first increase amount and the Y axis component Yc of the rotational center Oc, and FIGS. 9A to 9C are graphs of the relation between a first increase amount and the Z axis component Zc of the rotational center Oc. The first increase referred to here is the amount of image blur that is increased by offset of the rotational center Oc from the center E of the lens 102, and is the amount of image blur corresponding to the above-mentioned shake amounts Δx1' and Δy1'.

In the graphs, the horizontal axis is the optical zoom ratio D, and the vertical axis is the first increase amount. Also, the top graph in each drawing shows the imaging distance L=50 cm, the middle graph shows the imaging distance L=1 m, and the bottom graph shows the imaging distance L=10 m. Calculations are made for three different situations, when the distances Xc, Yc, and Zc from the rotational center Oc to the center E of the lens 102 are (A) 0 mm, (B) 150 mm, and (C) 300 mm, respectively. The joints of the user are usually the rotational center in actual imaging. For instance, when a point that is away from the camera, such as an elbow or a shoulder, is the rotational center, the distance from the center E of the lens 102 to the rotational center Oc is about 300 mm.

It can be seen from FIGS. 7A to 9C that when the optical zoom ratio D is high and the imaging distance L is short, offset between the rotational center Oc and the center E of the lens 102 have a greater effect on the amount of image blur. If we take into consideration the fact that shaking of the camera 101 results in very noticeable degradation of the image when the actual amount of image blur is 10 (pixels) or greater, offset between the rotational center Oc and the center E of the lens 30 can no longer be ignored above this level. The offset amount Xc between the rotational center Oc and the center E of the lens 102 in the X axis direction has a particularly great effect on the roll component of the image blur amount, and the offset amount Yc between the rotational center Oc and the center E of the lens 102 in the Y axis direction also greatly affects the roll component of the image blur amount. Further, the offset amount Zc between the rotational center Oc and the center E of the lens 102 in the Z axis direction greatly affects both the pitch component and the yaw component of the image blur amount. In these graphs, the calculation results for the pitch component may look like they are not displayed, but since the calculation results for the pitch component are the same as the calculation results for the yaw component, the pitch component results are merely superposed with the yaw component results.

Effect that translational shake of the camera has on blur amount

Figure 10:
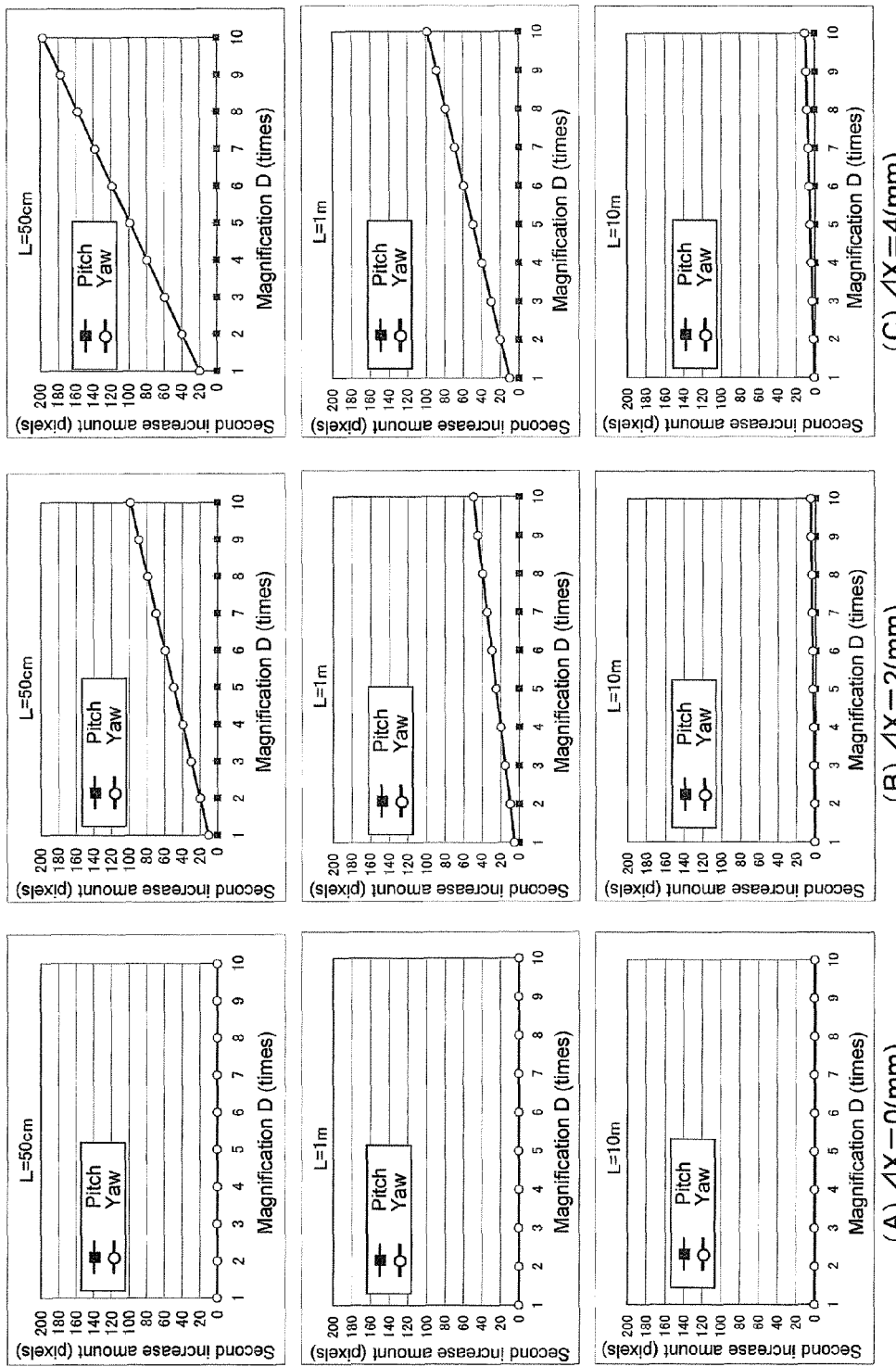
FIGS. 10A to 10C are graphs of the relation between a second increase amount and the translational shake amount ΔX of the camera in the X axis direction.
Figure 11:
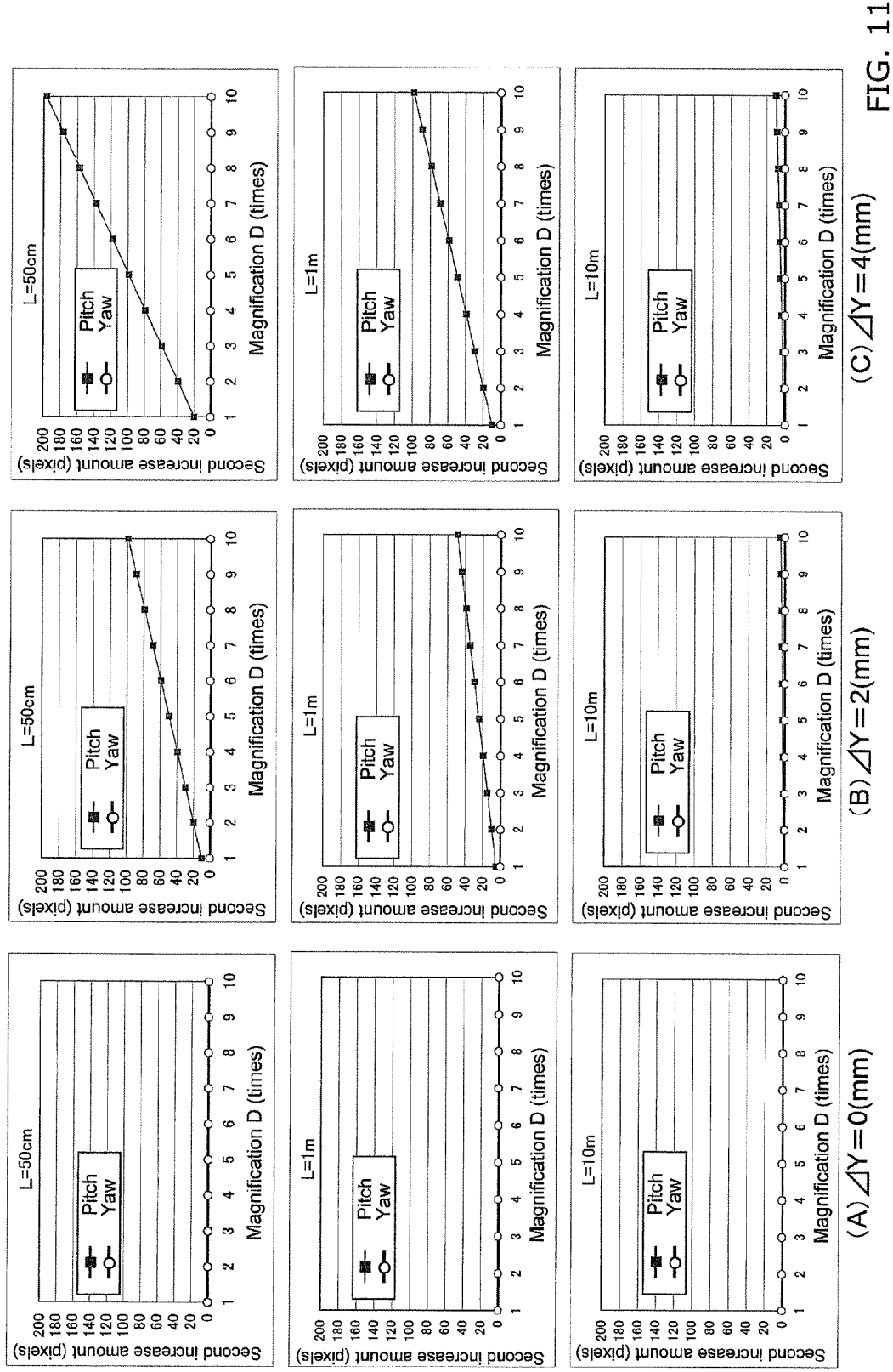
FIGS. 11A to 11C are graphs of the relation between a second increase amount and the translational shake amount ΔY of a camera in the Y axis direction.
Figure 12:
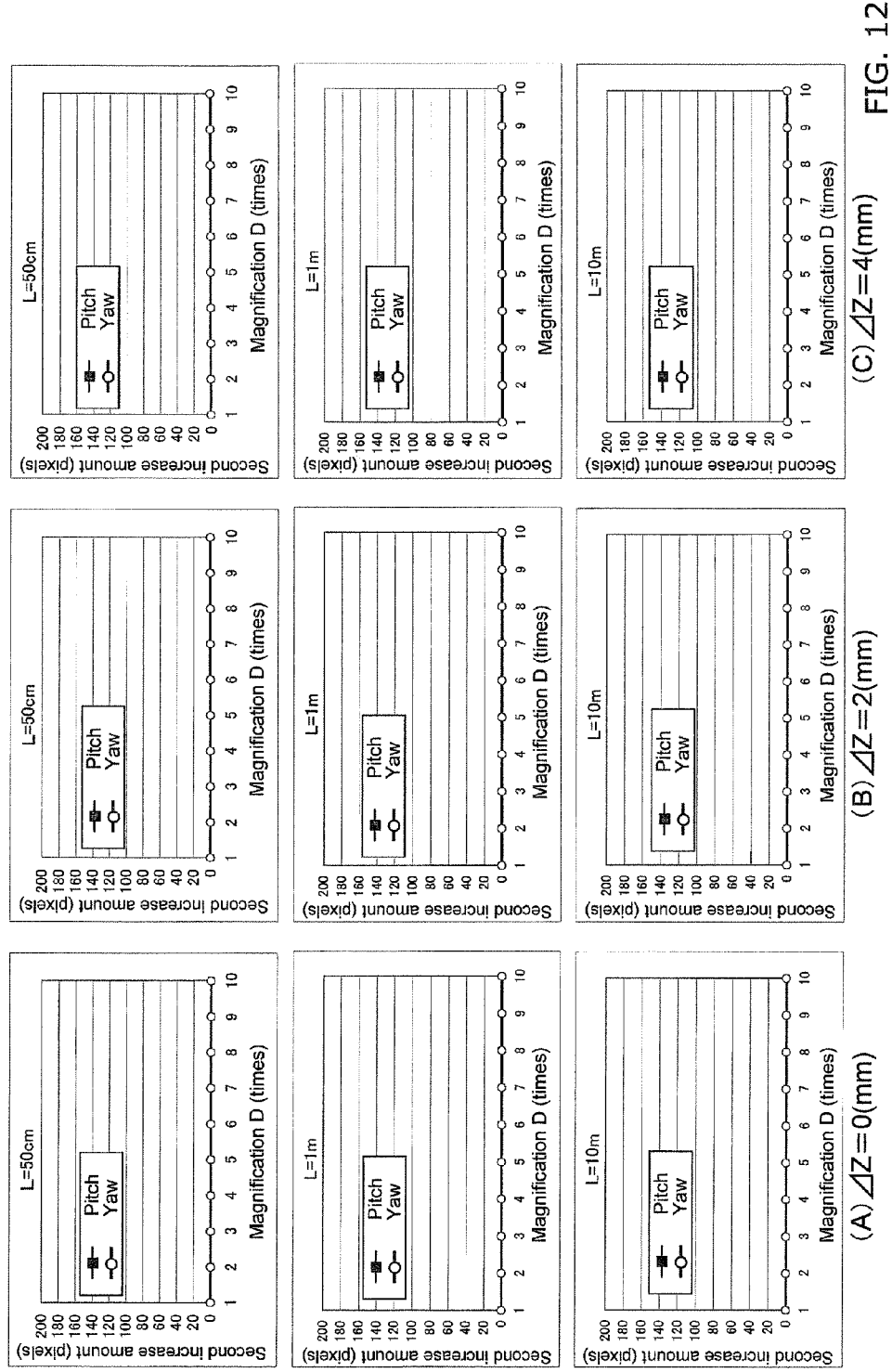
FIGS. 12A to 12C are graphs of the relation between a second increase amount and the translational shake amount ΔZ of a camera in the Z axis direction.

Next, we will describe the effect that translational shake of the camera 101 has on the amount of image blur. FIGS. 10A to 10C are graphs of the relation between a second increase amount and the translational shake amount ΔX of the camera 101 in the X axis direction, FIGS. 11A to 11C are graphs of the relation between the second increase amount and the translational shake amount ΔY of the camera 101 in the Y axis direction, and FIGS. 12A to 12C are graphs of the relation between the second increase amount and the translational shake amount ΔZ of the camera 101 in the Z axis direction. In FIGS. 10A to 12C, the horizontal axis is the optical zoom ratio a and the vertical axis is the second increase amount. The second increase referred to here is the amount of image blur corresponding to translational shake, and is the amount of image blur corresponding to the above-mentioned shake amounts Δx3' and Δy3'.

In FIGS. 10A to 12C, the top graph in each drawing shows the imaging distance=50 cm, the middle graph shows the imaging distance L=1 m, and the bottom graph shows the imaging distance L=10 m. Calculations are made for three different situations, when the translational shake amounts ΔX, ΔY, and ΔZ are (A) 0 mm, (B) 2 mm, and (C) 4 mm, respectively.

It can be seen from FIGS. 10A to 12C that in regard to the translational shake amounts ΔX and ΔY, when the optical zoom ratio D is high and the imaging distance L is short, translational shake of the camera 101 greatly affects the amount of image blur. More specifically, the yaw component of the second increase amount grows with the translational shake amount ΔX, and the pitch component of the second increase amount grows with the translational shake amount ΔY. The translational shake amount ΔZ in the Z axis direction, however, hardly affects the amount of image blur, so the translational shake amount AZ may safely be ignored.

As discussed above, the position of the rotational center Oc has a powerful effect on the amount of image blurring, so much so that it cannot be ignored.

First Embodiment

Summary of Shake Measurement Method

However, as mentioned above, translational shake is not taken into account with a conventional shake measurement system, so it is difficult to improve the shake measurement accuracy.

In view of this, with a shake measurement system 1, it is possible to measure the amount of shake of an imaging device, including the amount of translational shake, by the following method.

More specifically, the above-mentioned International Laid-Open Patent Application 08/078537 discloses a shake measurement system having a display section, a memory section, and a pattern matching processor. The display section successively displays a plurality of different test patterns. The plurality of test patterns are stored in the memory section. The pattern matching processor performs pattern matching processing between a plurality of test patterns and the image on the display section acquired by the imaging device. Consequently, the amount of shake of the imaging device that appears in the image of the test patterns can be calculated for every test pattern, and time-series data for the amount of shake of the imaging device can be acquired.

In this case, there should be not just rotational shake, but also translational shake in the image captured of the display section. Therefore, the amount of translational shake can be calculated by subtracting the amount of rotational shake from the amount of shake calculated by the above method.

Figure 13:
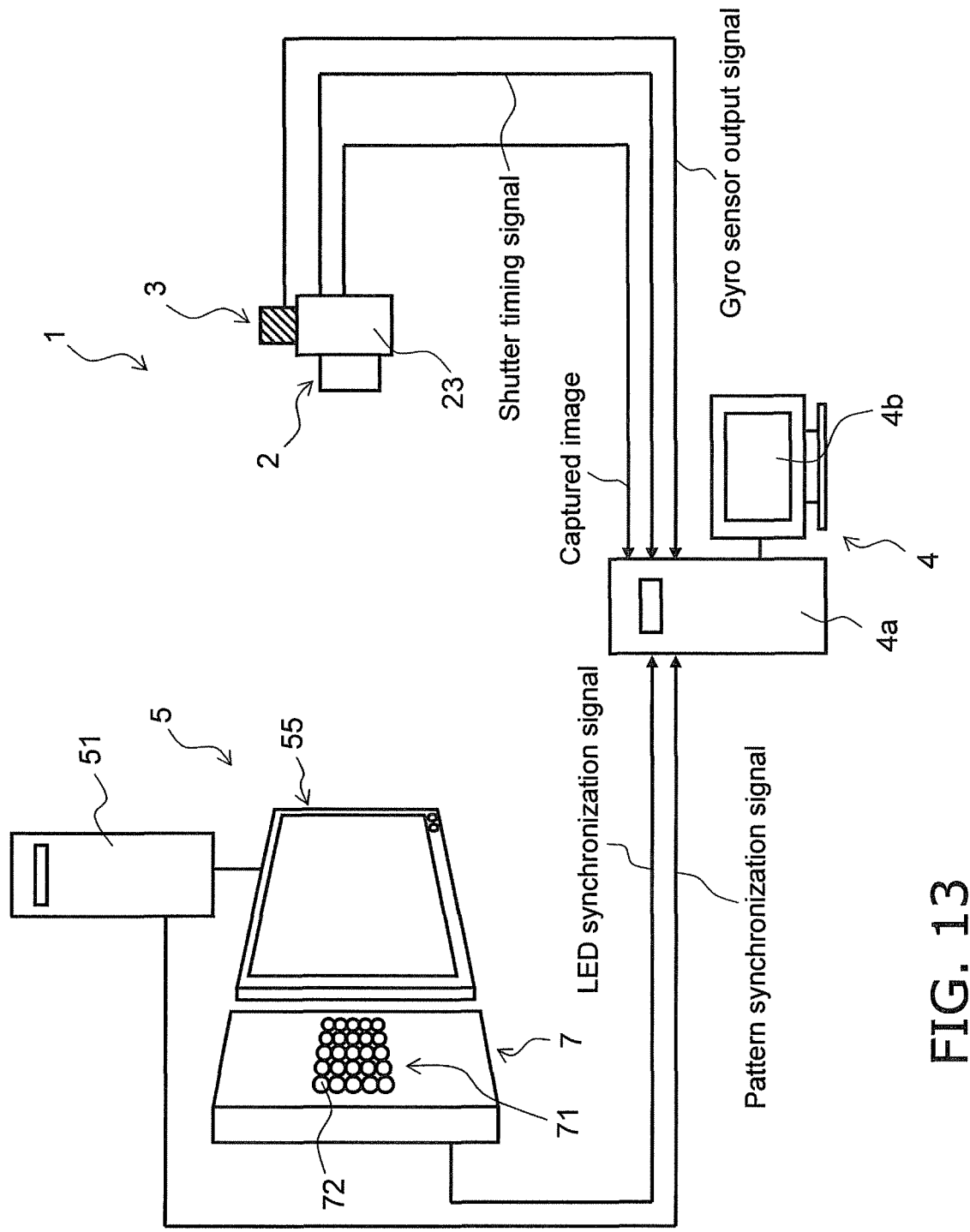
FIG. 13 is a simplified constitution diagram of a shake measurement system.
Figure 14:
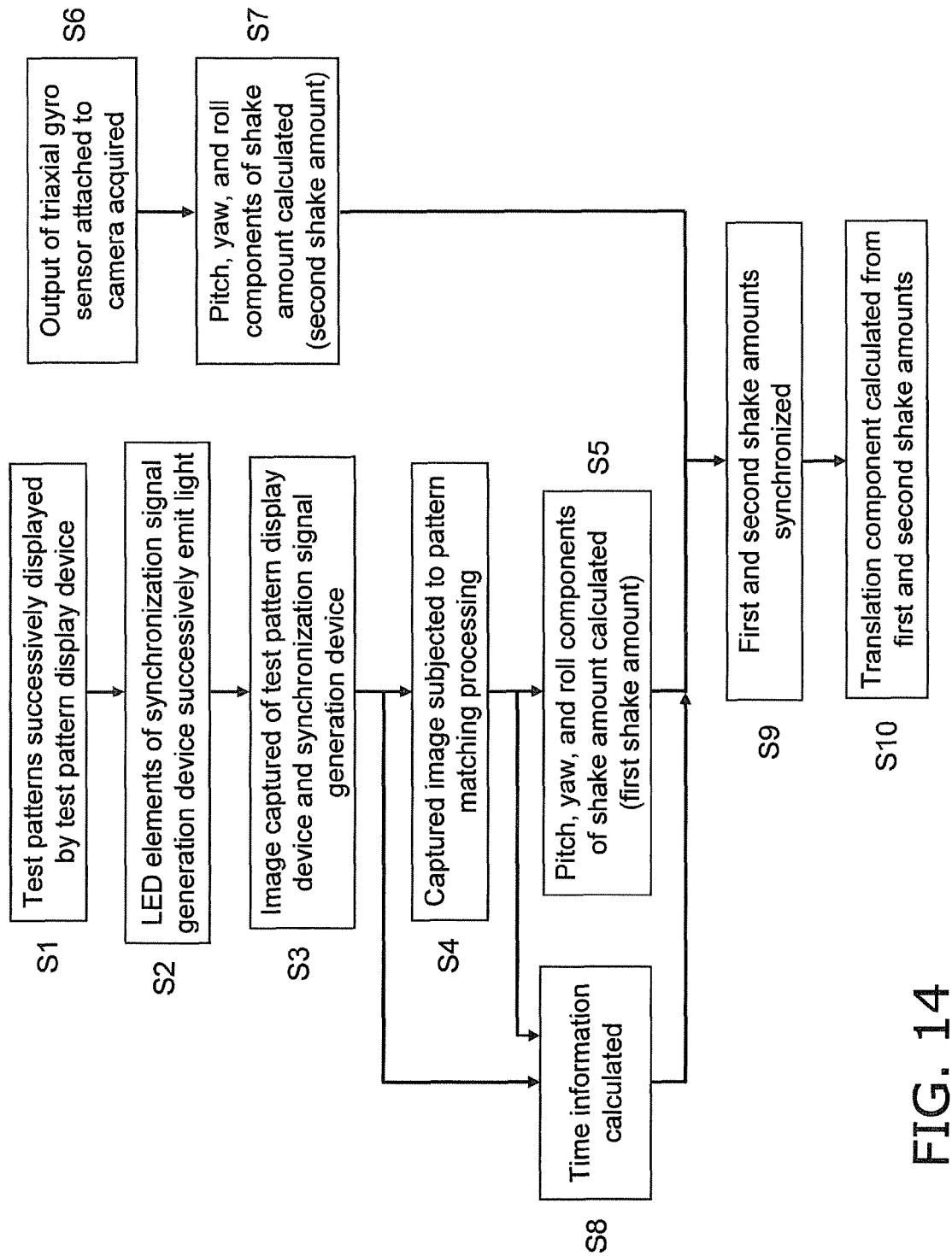
FIG. 14 is a simplified flow chart of a shake measurement method.

More specifically, as shown in FIGS. 13 and 14, with a measurement method featuring the shake measurement system 1, just as with the method discussed above, a test pattern display device 5 successively displays a plurality of test patterns at a specific update period (S1). Also, LED elements 72 of a synchronization signal generation device 7 successively emit light at a specific period (S2). The test pattern display device 5 and the synchronization signal generation device 7 are imaged with a camera 2, and the captured image is subjected to pattern matching processor to calculate the pitch, yaw, and roll components of the amount of shake of the camera 2 as a first shake amount (S3, S4, S5).

Meanwhile, the pitch, yaw, and roll components of the amount of shake of the camera 2 are calculated as a second shake amount on the basis of the output of a triaxial gyro sensor 3 attached to the camera 2 (S6, S7).

Time information, which is necessary for synchronizing the first and second shake amounts, is then calculated on the basis of the above-mentioned pattern matching processor result and the image of the synchronization signal generation device 7 included in the captured image (S8). This time information is utilized to synchronize the first and second shake amount (S9).

The first shake amount calculated by pattern matching processor includes not just the amount of rotational shake, but also the amount of translational shake, but the second shake amount calculated from the output result of the triaxial gyro sensor 3 includes only the amount of rotational shake.

Therefore, with this shake measurement system 1, the amount of translational shake can be acquired from the first shake amount and second shake amount, which are acquired by two different methods. More specifically, the difference between the first shake amount and the second shake amount detected at the same timing is calculated, and the amount of translational shake is calculated from this difference. Consequently, with this shake measurement system 1, the amount of translational shake can be calculated and the amount of shake can be measured more accurately (S10).

Configuration of Shake Measurement System

The shake measurement system 1 is configured as follows in order to realize the measurement method discussed above.

More specifically, as shown in FIG. 13, the shake measurement system 1 comprises the camera 2, the triaxial gyro sensor 3 (an example of a second shake amount acquisition section), the test pattern display device 5 (an example of a first shake amount acquisition section, and an example of a pattern display section), the synchronization signal generation device 7 (an example of a time information display section), and a shake amount computer 4.

Figure 15:
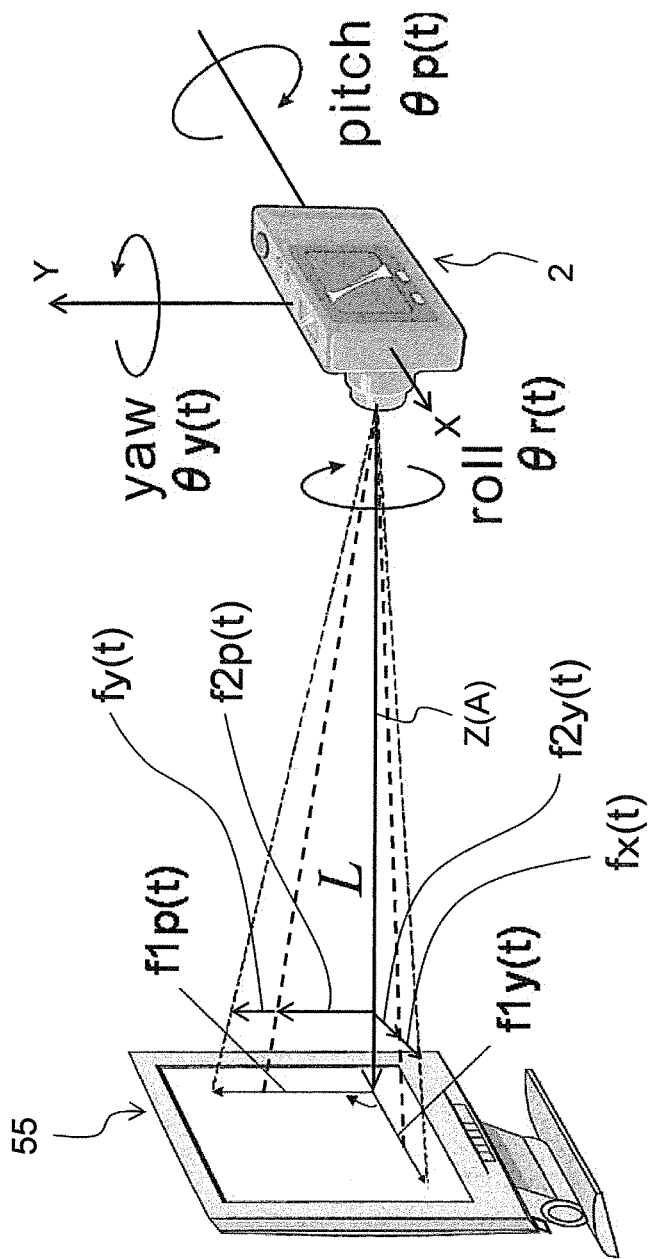
FIG. 15 is a diagram of the amount of shake of a camera.

As shown in FIG. 15, X, Y, and Z axes are set with respect to the camera 2. The X, Y, and Z axes are examples of reference axes. In landscape orientation (positive orientation), the X axis is parallel to the horizontal direction, and the Y axis is parallel to the vertical direction. The Z axis coincides with the optical axis A of the optical system (not shown)

(1) Camera

Figure 16:
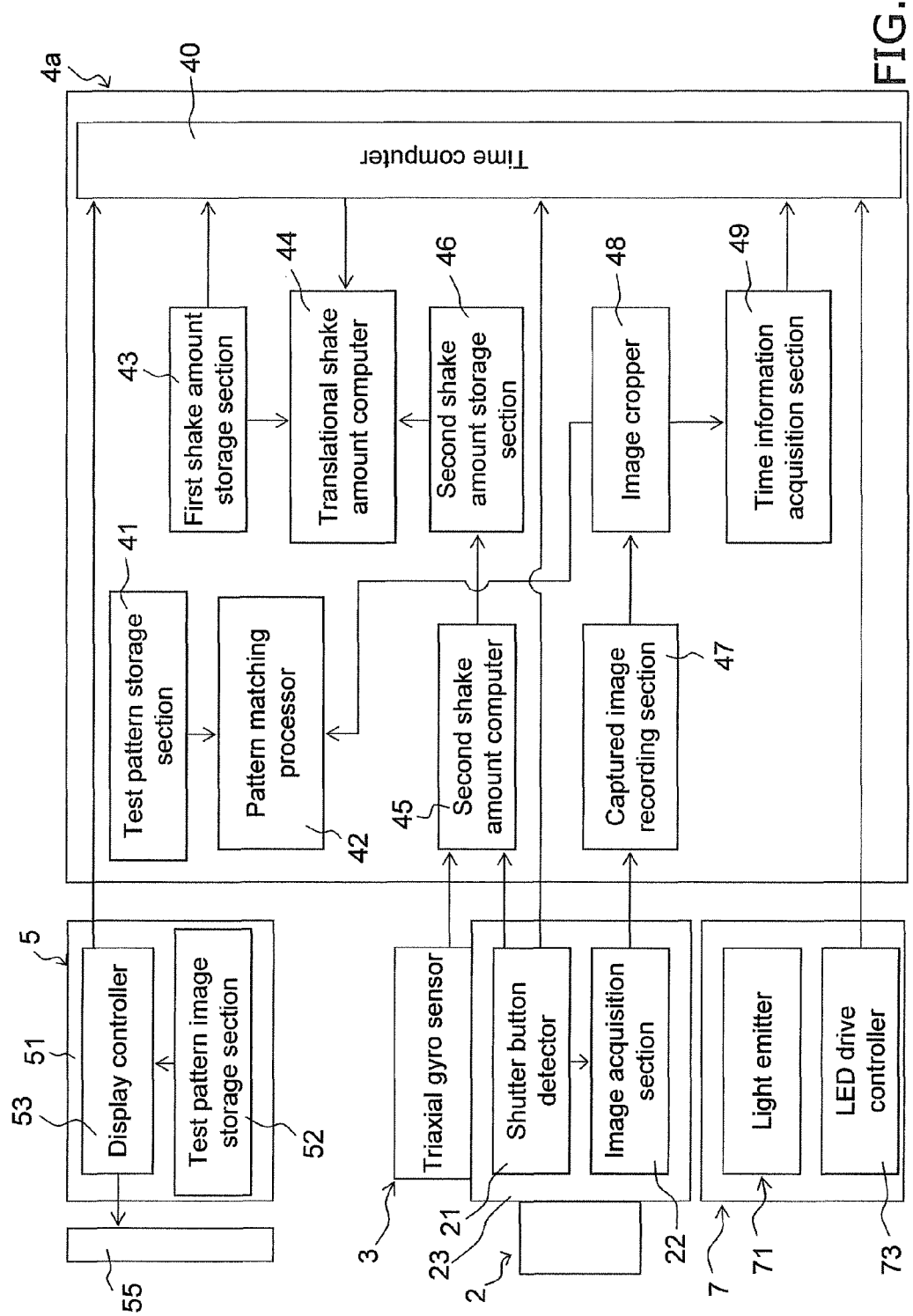
FIG. 16 is a detailed constitution diagram of a shake measurement system.

As shown in FIG. 16, the camera 2 is a digital still camera capable of capturing still pictures, and has a housing 23, a shutter button detector 21, and an image acquisition section 22. The housing 23 constitutes the body of the camera 2, so the phrase "the amount of shake of the camera 2" herein also refers to the amount of shake of the housing 23.

The shutter button detector 21 detects that a shutter button (not shown) has been pressed. The image acquisition section 22 is a unit that acquires image data for an optical image formed by the optical system (not shown), and has a CCD (charged coupled device), a CMOS (complementary metal oxide semiconductor), or other such imaging element. When the shutter button detector 21 detects that the shutter button has been switched on, exposure preparations such as focusing and aperture adjustment are performed, and an image is acquired by the image acquisition section 22.

Since the length of time the exposure preparations take varies with the imaging conditions, the time from when the shutter button is switched on until exposure starts (the time T3 referred to below) is not constant.

(2) Triaxial Gyro Sensor

The triaxial gyro sensor 3 is used to detect the amount of shake of the camera 2 by utilizing a physical change produced by shaking of the camera 2, and is a MEMS type of gyro sensor, for example. The triaxial gyro sensor 3 is a separate sensor from the gyro sensor built into the camera 2, and as shown in FIG. 13, it is removably mounted to the upper part of the camera 2 (more precisely, the upper part of the housing 23). Since the triaxial gyro sensor 3 is a removable type, the amount of shake can be easily detected with a variety of cameras.

The triaxial gyro sensor 3 detects the angular velocities around the X, Y, and axes of the camera 2 at a specific period. These angular velocities are outputted from the triaxial gyro sensor 3 at a specific period. The outputted angular velocities are added up and converted into angles by a second shake amount computer 45 (discussed below) shown in FIG. 16. Consequently, the amount of rotational shake of the camera 2 (an example of the second shake amount) can be calculated.

(3) Test Pattern Display Device

The test pattern display device 5 is used to calculate the amount of shake of the camera 2 by using image processing, and as shown in FIG. 13, it has a control device 51 (an example of a first synchronization signal generator) and a liquid crystal monitor 55 (an example of a pattern display section).

The control device 51 controls the display of the liquid crystal monitor 55. More specifically, as shown in FIG. 16, the control device 51 has a display controller 53 that controls the display of the liquid crystal monitor 55, and a test pattern storage section 52 that stores a plurality of test patterns.

Figure 18:
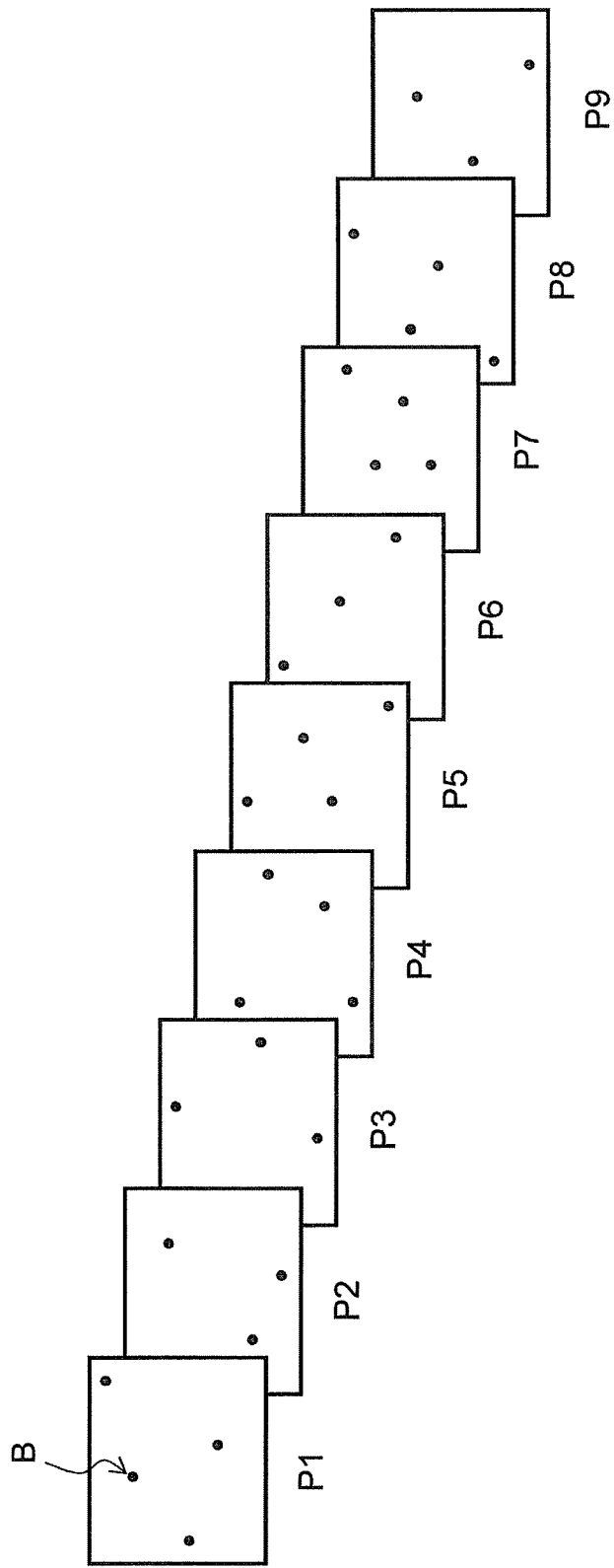
FIG. 18 is a diagram illustrating test patterns.

The display controller 53 controls the liquid crystal monitor 55 so that the plurality of test patterns stored in the test pattern storage section 52 are successively displayed at a specific period. In this embodiment, as shown in FIG. 18, nine mutually different test patterns PI to P9 are stored in the test pattern storage section 52. These nine test patterns P1 to P9 are successively displayed on the liquid crystal monitor 55 by the display controller 53 at the same period of 60 Hz as the frame rate of a moving picture display, for example.

The test patterns each consist of four black dots B. Since there are nine of the test patterns, there is a total of 36 black dots B on an image formed by putting together all of the test patterns. Sine the 36 black dots B are disposed at different positions with specific gaps in between, if the test patterns P1 to P9 are superposed over one another, none of the 36 black dots B overlaps any of the other black dots B. Also, since the spacing between the black dots B is greater than the distance equivalent the amount of shake, good accuracy can be ensured in pattern matching processor.

The display controller 53 generates a pattern synchronization signal (an example of a first synchronization signal) simultaneously with the display of the first test pattern P1. The pattern synchronization signal is outputted from the display controller 53 to the shake amount computer 4 at the same period as the period in which one cycle is made through the test patterns P1 to P9 (that is, 9/60 ms). This pattern synchronization signal is used in keeping track of the time T4.

(4) Synchronization Signal Generation Device

The synchronization signal generation device 7 displays a change in time so that it can be visually discerned, and is disposed aligned with the liquid crystal monitor 55. The synchronization signal generation device 7 has a light emitter 71 (an example of a second display section) and an LED drive controller 73 (an example of a second synchronization signal generator).

Figure 17:
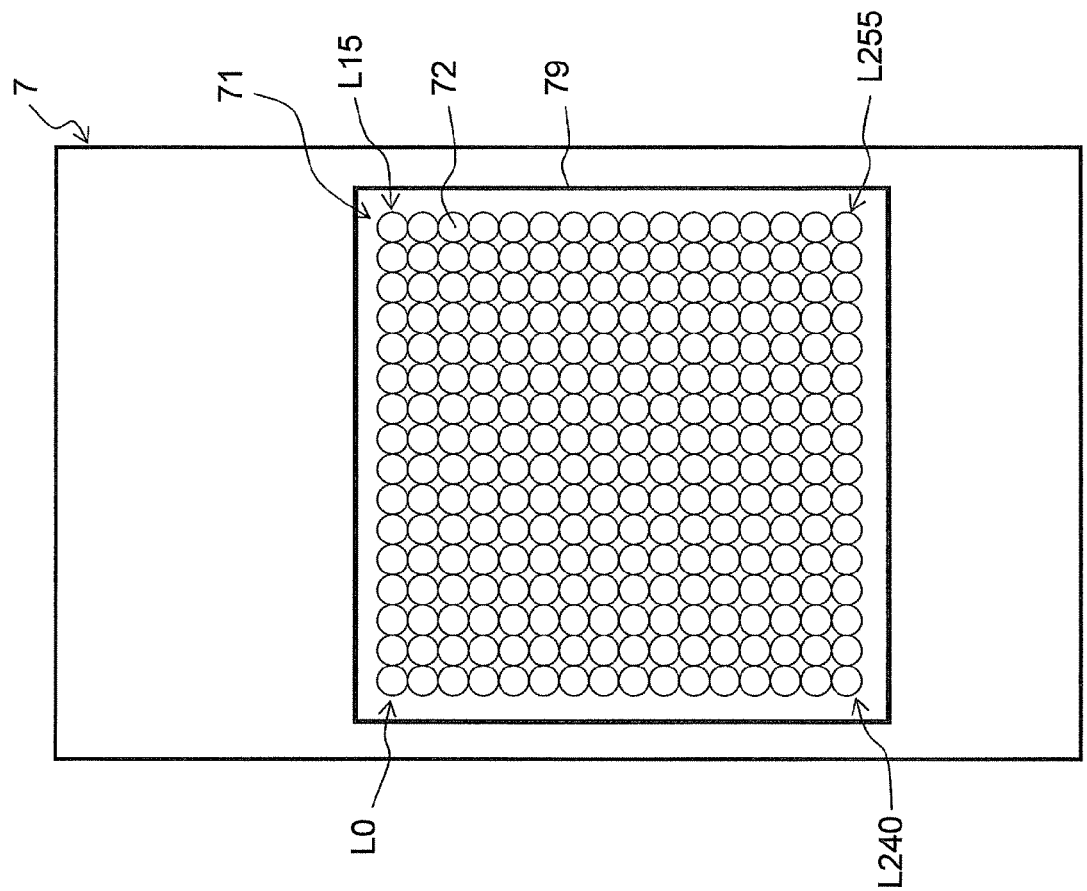
FIG. 17 is a front view of a synchronization signal generation device.

As shown in FIG. 17, the light emitter 71 has a plurality of regularly disposed LED elements 72 (light emitting diodes). In this embodiment, the light emitter 71 has 256 LED elements 72 disposed in a matrix of 16 down and 16 across.

The LED drive controller 73 is a unit that controls the light emission of the light emitter 71, and successively causes the 256 LED elements 72 to emit light, one at a time. More specifically, the position of the LED element 72 that is lit changes from the upper-left LED element L0 and moving to the right side. After the 16 LED elements 72 on the uppermost row (L0 to L15) have been lit, the 16 LED elements 72 in the next lo es row (L16 to L31) are lit. starting from the left side. After the lower-right LED element L255 has been lit, the lighting order starts over again with the LED element L0. The duration a single LED element 72 is lit is 1 ms, and the LED element 72 that is lit is switched every millisecond. That is, the lighting of all the LED elements 72 is completed in 256 ms.

The elapsed time from a certain point can be visually discerned in less time than 256 ms depending on the positions of the LED elements 72 that are lit. That is, the synchronization signal generation device 7 can be said to display a change in time so that he change can be discerned visually.

Further, the LED drive controller 73 generates an LED synchronization signal (an example of a second synchronization signal) simultaneously with the lighting of the upper-left LED element L0. The LED synchronization signal is outputted from the LED drive controller 73 to the shake amount computer 4 at the same period as the period in which one cycle is made by the light emitter 71 (that is, 256 ms). This LED synchronization signal is used in keeping track of the time T1.

(5) Shake Amount Computer

The shake amount computer 4 is a device for computing the amount of translational shake of the camera 2 on the basis of a captured image and various signals sent from the camera 2, the triaxial gyro sensor 3, the test pattern display device 5, and the synchronization signal generation device 7, and as shown in FIG. 13, has a computer main body 4a and a monitor 4b. The computer main body 4a is electrically connected to the camera 2, the triaxial gyro sensor 3, the test pattern display device 5, and the synchronization signal generation device 7. The monitor 4b is a device that displays computation results, etc., from the computer main body 4a, and is electrically connected to the computer main body 4a.

The computer main body 4a is connected to the camera 2 so that images captured by the camera 2 can be taken in. For example, an image captured by the camera 2 can be taken in by inserting an image output card, which is connected to the computer main body 4a, into the memory card drive (not shown) of the camera 2.

Also, the computer main body 4a is connected to the camera 2 so that it can take in shutter timing signals indicating the on and off operation of the shutter button (not shown) of the camera 2. For example, the computer main body 4a is connected to a contact (not shown) of the shutter button of the camera 2.

The computer main body 4a is a device with which various functions can be realized, and has, for example, a CPU, a ROM, and a RAM. Programs stored in the ROM are read by the CPU, allowing the computer main body 4a to perform various functions. For instance, the computer main body 4a can have the function of synchronizing the first shake amount calculated using image processing with the second shake amount calculated using the triaxial gyro sensor 3.

As shown in FIG. 16, the computer main body 4a has a time computer 40 (an example of a synchronization information acquisition section), the test pattern storage section 41, a pattern matching processor 42 (an example of a first shake amount acquisition section), the first shake amount storage section 43, a translational shake amount computer 44 (an example of a third shake amount acquisition section), the second shake amount computer 45 (an example of a second shake amount acquisition section), a second shake amount storage section 46, a captured image storage section 47, an image cropper 48, and a time information acquisition section 49 (an example of a synchronization information acquisition section).

The time computer 40 receives signals and information from various components for synchronizing the first and second shake amounts, and calculates the synchronization information needed for synchronization on the basis of the received signals and information.

More specifically, the time computer 40 receives a shutter timing signal outputted from the shutter button detector 21 of the camera 2. The time computer 40 receives pattern synchronization signals outputted at a specific period (150 ms) from the display controller 53, and receives LED synchronization signals outputted at a specific period (256 ms) from the display controller 53. The method for calculating synchronization information will be discussed below.

The captured image storage section 47 temporarily stores a captured image acquired by the camera 2. The image cropper 48 crops out just the range needed for pattern matching processing from the captured image stored in the captured image storage section 47. The image cropper 48 also crops out just the range of the light emitter 71 of the synchronization signal generation device 7 from the captured image.

The test pattern storage section 41 stores the nine test patterns P1 to P9, just as the test pattern storage section 52 does. The nine test patterns stored in the test pattern storage section 41 are the same as the nine test patterns stored in the test pattern storage section 52. The nine test patterns stored in the test pattern storage section 41 are used in processing by the pattern matching processor 42.

The pattern matching processor 42 calculates the first shake amount of the camera 2 by pattern matching on the basis of the image cropped out by the image cropper 48 and the nine test patterns stored in the test pattern storage section 41. The method disclosed in International Laid-Open Patent Application 08/078537 pamphlet. for example, is used for this pattern matching processing.

Furthermore, as discussed below, the pattern matching processor 42 can calculate the time T4 from when the shutter button is pressed until the first test pattern P1 of the first page is displayed on the liquid crystal monitor 55.

The first shake amount storage section 43 temporarily stores the first shake amounts f1p(t) and f1y(t) and the time T4 calculated by the pattern matching processor 42. The information stored in the first shake amount storage section 43 is used as needed by the time computer 40 and the translational shake amount computer 44.

The second shake amount computer 45 receives angular velocities ωx(t), ωy(t), and ωz(t) at a specific period from the triaxial gyro sensor 3, and calculates the rotational angles θp(t), θy(t), and θr(t) around the X, Y, and Y axes from the received angular velocities ωx(t), ωy(t), and ωz(t) (see FIG. 15). The second shake amount computer 45 may also calculate the rotational lengths f2p(t), f2y(t), and f2r(t) that have been converted to rotational angles on the basis of the imaging distance L and the rotational angles θp(t), θy(t), and θr(t). The rotational angles θp(t), θy(t), and θr(t) (or the rotational lengths f2p(t), f2y(t), and f2r(t)) calculated by the second shake amount computer 45 are temporarily stored in the second shake amount storage section 46 along with time information t.

The translational shake amount computer 44 calculates the translational shake amounts fx(t) and fy(t) in the X and Y directions on the basis of the information stored in the first shake amount storage section 43 and the second shake amount storage section 46. More specifically, the translational shake amounts fx(t) and fy(t) are calculated on the basis of the following Formulas 21 and 22.

$$fx(t)=f1y(t)-f2y(t)=f1y(t)-L\times\tan\theta y(t) \quad \text{[Mathematical Formula 21]}$$

$$fy(t)=f1p(t)-f2p(t)=f1p(t)-L\times\tan\theta p(t)$$

Here, L is the imaging length (the distance from the camera 2 to the liquid crystal monitor 55) (see FIG. 15). In Formulas 21 and 22, the first shake amounts f1p(t) and f1y(t) are concepts of length adjusted so that the second shake amounts (the rotational angles θp(t), θy(t), and θr(t), or the rotational lengths f2p(t), f2y(t), and f2r(t)) match up with the unit time.

Thus, with Formulas 21 and 22, the translational shake amounts fx(t) and fy(t) can be calculated using the first shake amounts f1p(t) and f1y(t) obtained by pattern matching processing.

The time information acquisition section 49 calculates the time T2 from the start of exposure until the LED synchronization signal is received, on the basis of the image of the light emitter 71 cropped out by the image cropper 48. The calculated time T2 is outputted to the time computer 40 and used to calculate other times with the time computer 40. The method for calculating the time T2 will be discussed below.

Operation of Shake Measurement System

Figure 19:
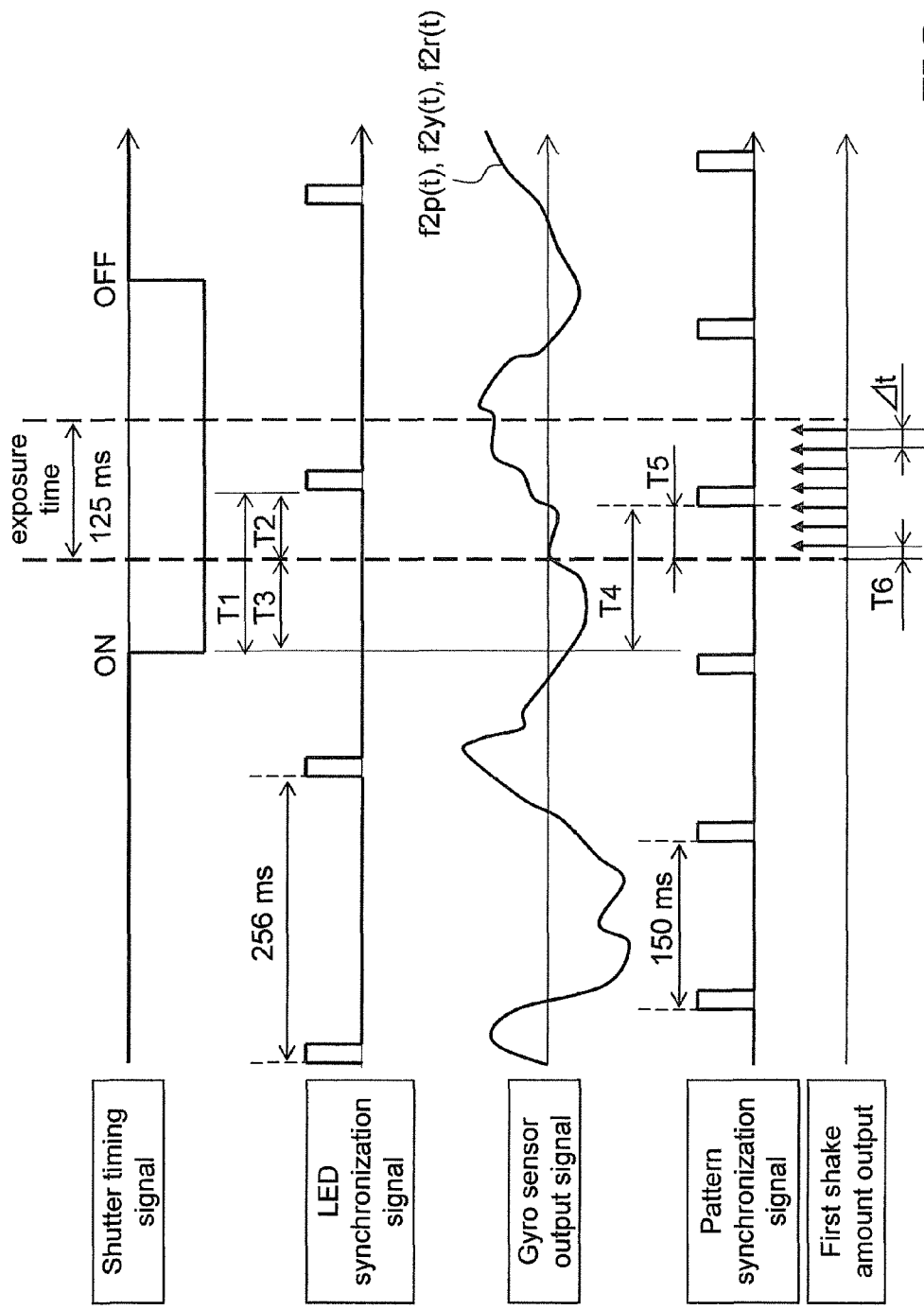
FIG. 19 is a timing chart during measurement of the amount of shake.

The operation of the shake measurement system 1 will now be described. FIG. 19 is a timing chart illustrating the operation of the shake measurement system 1.

(1) Before Shake Measurement

First, in the state prior to shake measurement, the synchronization ion signal generation device 7 and the test pattern display device 5 are operating. More specifically, the synchronization signal generation device 7 switches the lit LED element 72 at a specific period (1 ms) with the LED drive controller 73. Along with this, as shown in FIG. 19, an LED synchronization signal is outputted to the shake amount computer 4 at a specific period (256 ms) by the LED drive controller 73. More precisely, the LED synchronization signal is outputted from the LED drive controller 73 to the time computer 40 at the instant the upper-left (facing the light emitter 71) LED element L0 is lit.

At the test pattern display device 5, the nine test patterns are successively displayed on the liquid crystal monitor 55 at a specific update period (1/60 ms) by the display controller 53. More specifically, as shown in FIG. 18, the first test pattern P1 to the ninth test pattern P9 stored in the test pattern storage section 52 are displayed in order on the liquid crystal monitor 55. Also, a pattern synchronization signals is outputted at a specific period (150 ms) from the display controller 53 to the time computer 40. More precisely, a pattern synchronization signal is outputted from the display controller 53 to the time computer 40 at the instant the first test pattern P1 is displayed on the liquid crystal monitor 55.

Further, the angular velocities ωp(t), ωy(t), and ωr(t) of the camera 2 are detected by the triaxial gyro sensor 3. These angular velocities ωp(t), ωy(t), and ωr(t) are outputted from the triaxial gyro sensor 3 to the second shake amount computer 45 at a specific period. The period at which the angular velocities are detected is shorter than the period at which the test patterns are switched (60 Hz), so computation accuracy can be improved in synchronizing the first and second shake amounts. The period at which the angular velocities are detected is 1 ms, for example.

(2) During Shake Measurement

The liquid crystal monitor 55 and the synchronization signal generation device 7 are imaged using the camera 2, without using the blur correction function of the camera 2. More specifically, when the shutter button of the camera 2 is pressed, the shutter button detector 21 detects that the shutter button has been pressed. As a result, focusing, aperture adjustment, and other such exposure preparations are performed by the various components of the camera 2, and the shutter (not shown) operates at a specific shutter speed at the point when the exposure preparations are complete.

Figure 20:
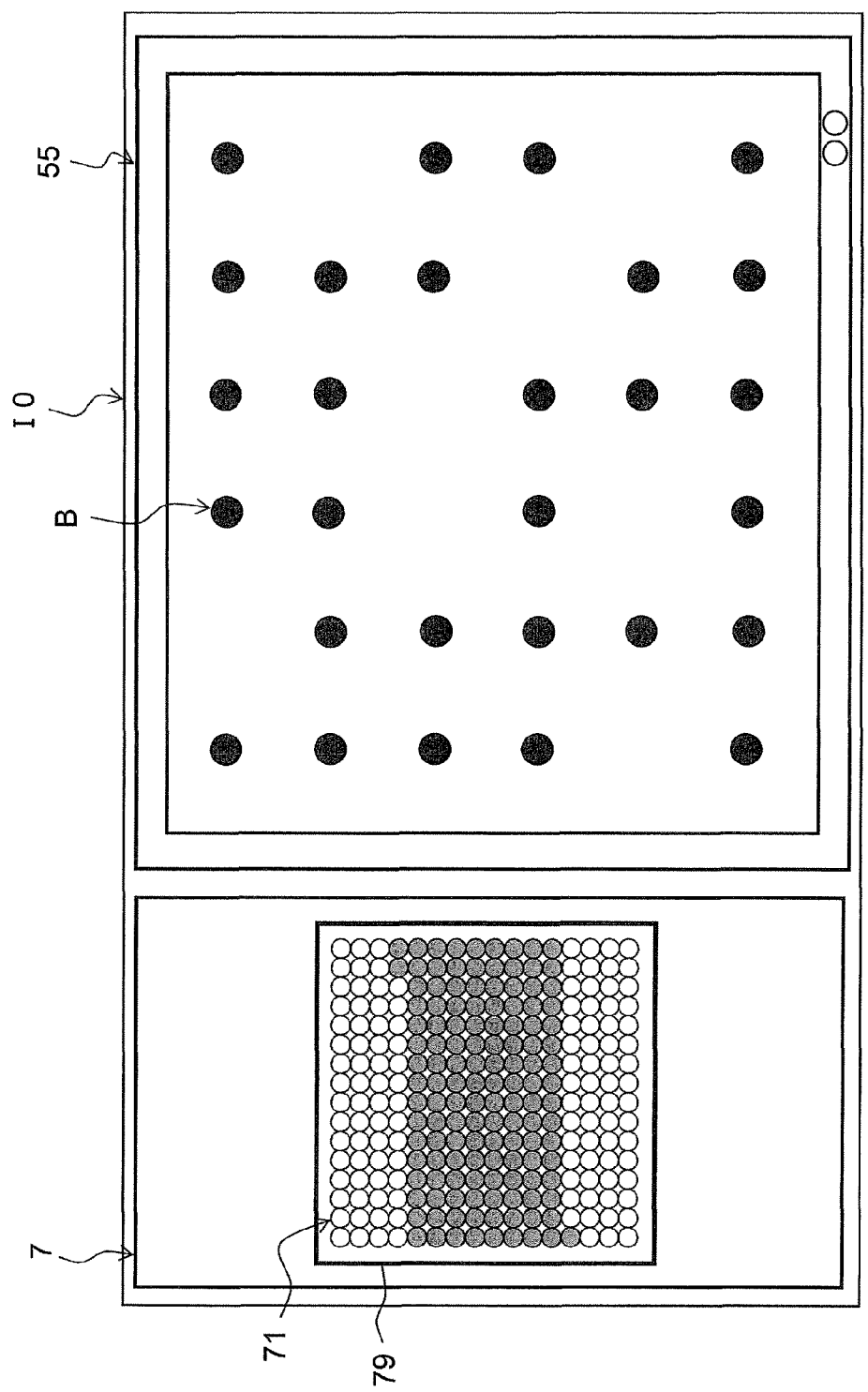
FIG. 20 is an example of a captured image.

When exposure is complete, a captured image 10 (see FIG. 20) that includes an image of the liquid crystal monitor 55 and an image of the synchronization signal generation device 7 is acquired by the image acquisition section 22, and the captured image 10 is stored in the captured image storage section 47 shown in FIG. 16. As shown in FIG. 20, the liquid crystal monitor 55 and the synchronization signal generation device 7 are depicted side by side in the captured image 10. A total of 28 black dots 13 are displayed on the screen of the liquid crystal monitor 55 depicted in the captured image 10. This means that seven test patterns have been imaged. The light emitter 71 depicted in the captured image 10 has some of the LED elements 72 lit, with the rest of the LED elements 72 switched off.

Meanwhile, when the shutter button detector 21 detects that the shutter button has been pressed, a shutter timing signal is outputted from the shutter button detector 21 to the time computer 40 and the second shake amount computer 45. When the time computer 40 receives the shutter timing signal, the time computer 40 starts keeping track of the time T1. Monitoring of the time T1 is continued until an LED synchronization signal is received. That is, the time T1 is the time from when the time computer 40 receives the shutter timing signal until the LED synchronization signal is received. This time T1 is used to calculate the exposure preparation time T3 from when the shutter button is pressed until exposure begins.

Also, when the second shake amount computer 45 receives a shutter timing signal, the second shake amount computer 45 starts keeping track of the time T4. Monitoring of the time T4 is continued until a pattern synchronization signal is received. That is, the time T4 is the time from when the second shake amount computer 45 receives the shutter timing signal until the pattern synchronization signal is received. This time T4 is used to calculate the time T5 from when the exposure begins until a pattern synchronization signal is received, When tracking of the times T1 and T4 is complete, the tracked times T1 and T4 are temporarily stored in the time computer 40.

Next, the user operates the shake amount computer 4, for example, to start various computation processing in the shake amount computer 4.

More specifically, at the shake amount computer 4, the time information acquisition section 49 uses the captured image 10 to calculate the time T2 (see FIG. 19). The method for calculating the time T2 will now be described.

Figure 21:
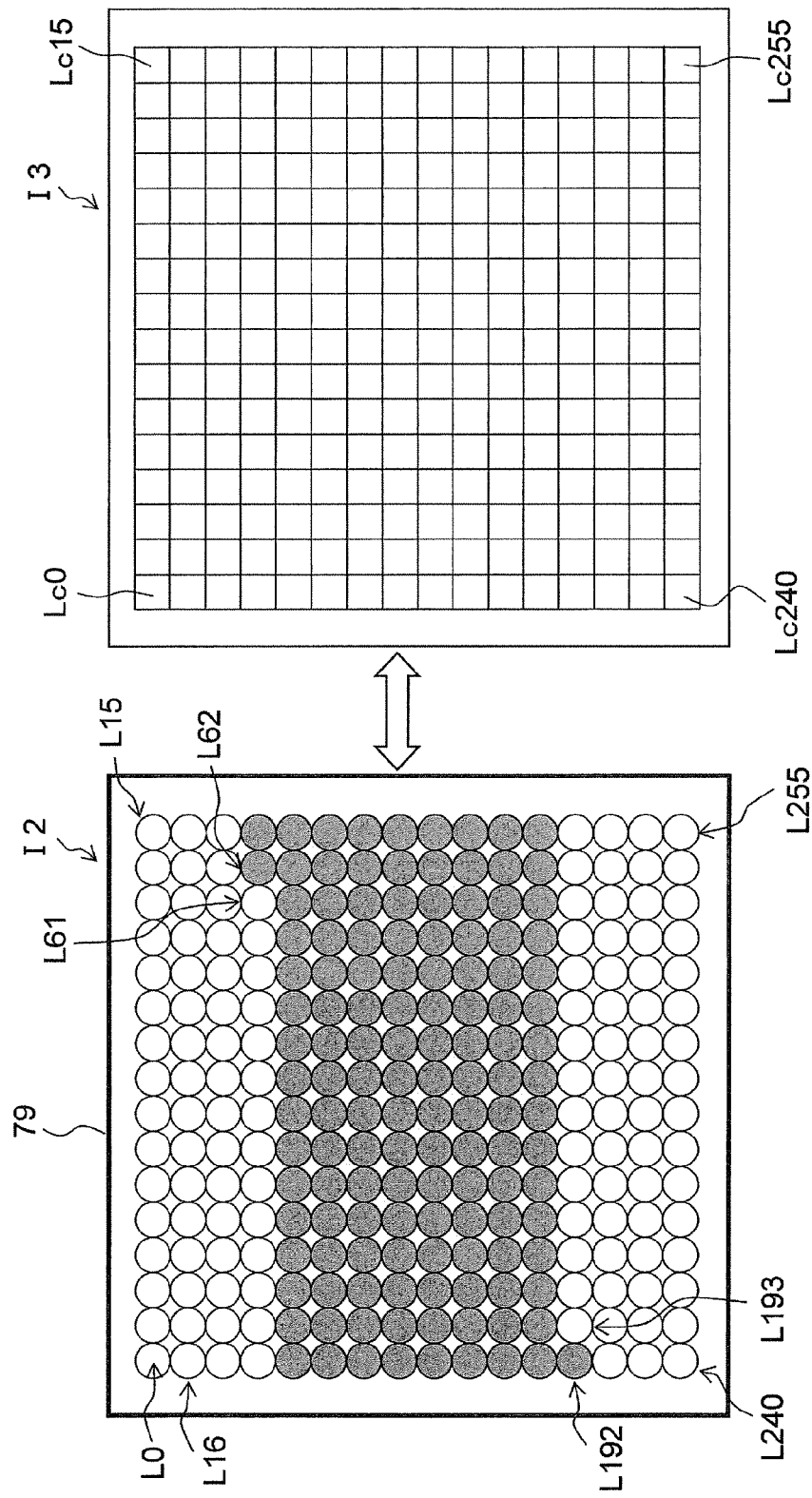
FIG. 21 is an example of the range corresponding to a light emitter out of a captured image.

As shown in FIG. 21, the portion of the light emitter 71 of the synchronization signal generation device 7 depicted in the captured image 10 is cropped out by the image cropper 48, and which of the LED elements 72 (among the LED elements L0 to L255) is lit is detected by image processing in the shake amount computer 4. In the cropping of an image 12 by the image cropper 48, the image 12 is cropped out using as a reference a square box 79 as shown in FIGS. 20 and 21.

With the image 12 shown in FIG. 21, for example, the LED elements L0 to L62 and the LED elements L193 to L255 are lit, and the LED elements L63 to L192 are not lit. The exposure time can be calculated by the time information acquisition section 49 from the number of lit LED elements 72. In this embodiment, since the number of lit LED elements 72 is 125, the exposure time is 125 ms.

Furthermore, the LED element 72 that is first lit during exposure can be specified by specifying the lit LED element 72 disposed after the unlit LED elements 72. In the case of this embodiment, the LED element 1,193 is disposed after the lit LED element L192, so the LED element 72 that is first lit during exposure is the LED element L193.

The time information acquisition section 49 stores the cell image 13 shown in FIG. 21 in order to specify which of the LED elements 72 was lit first during exposure. This cell image 13 has 256 cells Lc0 to Lc255 at positions roughly corresponding to the LED elements L0 to L255. The time information acquisition section 49 calculates the brightness of the image at the cells Lc0 to Lc255, and this is temporarily stored in the time information acquisition section 49 along with the cell positions, The boundary between the lit LED elements 72 and the unlit LED elements 72 is specified by the time information acquisition section 49 on the basis of this brightness information.

It can be seen from the above that the time T2 from the start of exposure until the LED element L0 is lit matches the time it takes from the lighting of the LED element L193 until the LED element L255 is switched off. Therefore, 63 ms, which is equivalent to the lit time of the 63 LED elements 72 from L193 to L255 becomes the time 12. The time T2 calculated by the time information acquisition section 49 is outputted to the time computer 40, and is temporarily stored by the time computer 40.

Here, when the LED element L0 is lit, at the same time an LED synchronization signal is outputted from the LED drive controller 73 to the time computer 40. When the time computer 40 receives the LED synchronization signal, it ends the tracking of the time T1, and temporarily stores the tracked time T1.

As shown in FIG. 19, the exposure preparation time T3 from when the shutter button is pressed until exposure is started can be found on the basis of the time T1 tracked by the time computer 40 and the time T2 calculated by the time information acquisition section 49. More specifically, the time T3 is calculated by the time computer 40 on the basis of the following Formula 23.

$$T3=T1-T2 \quad \text{[Mathematical Formula 23]}$$

When a pattern synchronization signal is received, the time computer 40 stops tracking the time T4, and temporarily stores the time T4. The time T4 and the time T3 are used by the time computer 40 to calculate the time T5 on the basis of the following Formula 24.

$$T5=T4-T3 \quad \text{[Mathematical Formula 24]}$$

Figure 22:
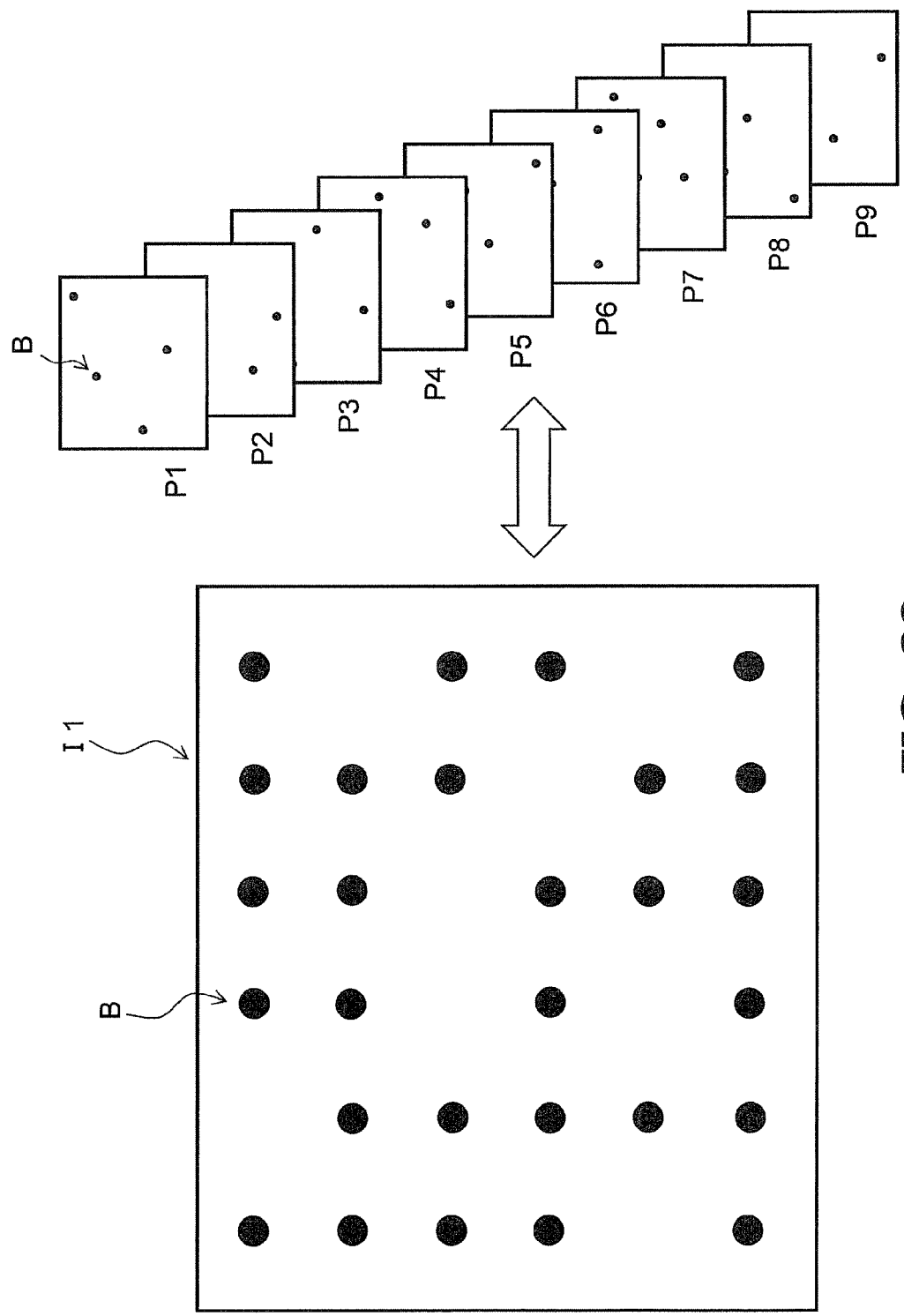
FIG. 22 is an example of the range corresponding to a liquid crystal monitor out of a captured image.

Further, the time T6 is calculated by subjecting the image displayed on the liquid crystal monitor 55 to pattern matching processing. More specifically, as shown in FIG. 22, the range of the captured image 10 in which a test pattern is depicted is cropped out as an image 11 by the image cropper 48. At this point, for example, the range of the test pattern is cropped out using the box of the liquid crystal monitor 55 as a reference.

At the pattern matching processor 42, pattern matching processing is performed on the image 11 cropped by the image cropper 48. More specifically, just as with the method described in International Laid-Open patent application Ser.

No. 08/078,537, the captured image II is compared with the first to ninth test patterns P1 to P9 stored in the test pattern storage section 41, and the conformity is calculated for each of the first to ninth test patterns P1 to P9. If the update period of the test patterns is 60 Hz, seven test patterns will be displayed on the liquid crystal monitor 55 within 125 ms during exposure, so the result that is obtained is that the conformity is high for seven of the nine, and the conformity is low for the other two. In calculating the conformity, the positions of the test patterns are adjusted, but as discussed in International Laid-Open patent application Ser. No. 08/078,537, these adjustment amounts are calculated as the first shake amounts f1p(t) and f1y(t) by the pattern matching processor 42.

In this embodiment, the first to fifth test patterns P1 to P5 and the eighth to ninth test patterns P8 to P9 are depicted overlapping the image 11, and as a result, a single image is formed. That is, the other test patterns, the sixth P6 and the seventh P7, are not depicted in the image 11. Accordingly, conformity is high for the first to fifth test patterns P1 to P5 and the eighth to ninth test patterns P8 to P9, and conformity is low for the other test patterns, the sixth P6 and the seventh P7, Furthermore, the first shake amounts f1p(t) and f1y(t) are calculated for the first to fifth test patterns P1 to P5 and the eighth to ninth test patterns P8 to P9.

The pattern matching processor 42 further calculates the number N1 of test patterns displayed on the liquid crystal monitor 55 during exposure. More specifically, the number of test patterns for which conformity was deemed high corresponds to NI, and in this embodiment N1=7.

Here, the test pattern displayed first on the liquid crystal monitor 55 during exposure is the test pattern with high conformity disposed after a test pattern with low conformity. That is, in this embodiment, as shown in FIG. 23, the eighth test pattern P8 is the test pattern first displayed on the liquid crystal monitor 55 during exposure.

Figure 23:
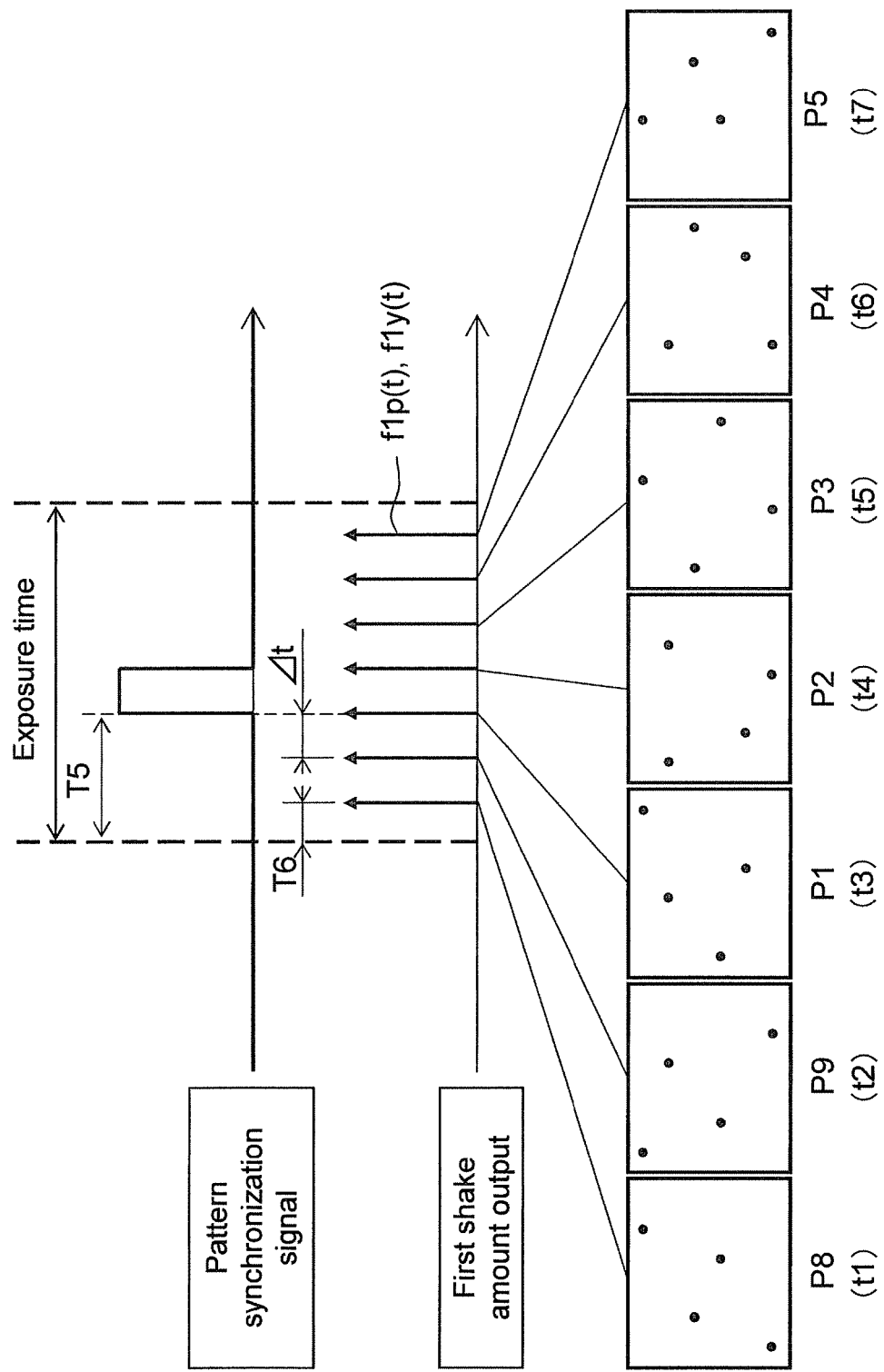
FIG. 23 is a comparative diagram of a timing chart and test patterns.

As discussed above, since the test patterns are displayed on the liquid crystal monitor 55 at a specific update period $\Delta t$ (60 Hz), as shown in FIG. 23, the time T6 from the start of exposure until a pattern synchronization signal is received by the time computer 40 is expressed by the following Formula 25.

$$T6=T5-\Delta t1 \times N2 \qquad \text{[Mathematical Formula 25]}$$

Here, N2 is the number of test patterns from the test pattern first displayed on the liquid crystal monitor 55 during exposure up to the ninth test pattern P9. In this embodiment, the eighth test pattern P8 and the ninth test pattern P9 correspond to N2, so N2=2. The time T6 can be calculated in this way.

Figure 24:
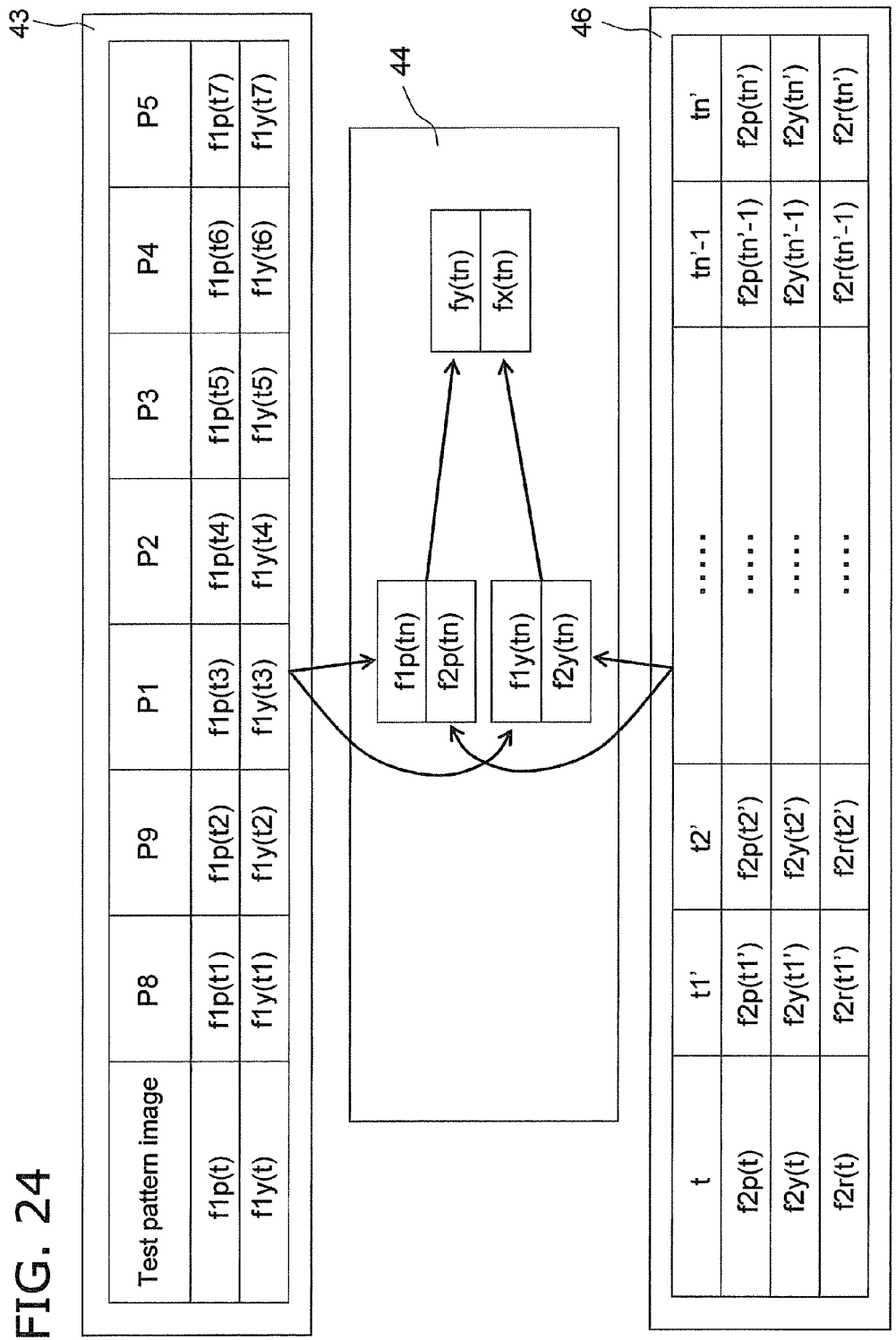
FIG. 24 is a simplified diagram of the data configuration of the amount of shake.

Here, the first shake amounts f1p(t) and f1y(t) corresponding to the first to fifth test patterns P1 to P5 and the eighth to ninth test patterns P8 to P9 are calculated by processing at the pattern matching processor 42. As shown in FIG. 24, these first shake amounts f1p(t) and f1y(t) are temporarily stored in the first shake amount storage section 43. More specifically, as shown in FIG. 24, the first shake amounts f1p(tn) and f1y(tn) (n=1 to N1) are stored in the first shake amount storage section 43.

If the point at which a shutter timing signal is received is used as a reference here, the time tn is expressed by the following Formula 26.

$$tn=T3+T6+\Delta t \times (n-1) \qquad \text{[Mathematical Formula 26]}$$

As shown in FIG. 24, the second shake amounts f2p(tn'), f2y(tn'), and f2r(tn') detected at a specific period are stored in the second shake amount storage section 46. The second shake amounts are detected by the triaxial gyro sensor 3 between the time when the second shake amount computer 45 receives a low-level shutter timing signal and the time when it receives a high-level shutter timing signal.

However, since the amount of data of the second shake amounts is greater than the amount of data of the first shake amounts, the second shake amount must be selected corresponding to the first shake amounts at the time tn.

In view of this, the translational shake amount computer 44 uses Formula 26 to select second shake amounts corresponding to first shake amounts at the time tn. More specifically, the translational shake amount computer 44 selects f2p(tn') and f2y(tn') that satisfy tn'=tn. In this embodiment, n=1 to 7, so the translational shake amount computer 44 selects seven each of the second shake amounts f2p(tn') and f2y(tn').

Finally, as shown in FIG. 24, the first shake amounts f1p(tn) and f1y(tn), the second shake amount f2p(tn') and f2y(tn'), and the imaging distance L are used to compute the above-mentioned Formulas 21 and 22, and the translational shake amounts fx(t) and fy(t) are calculated. This computation result is stored in the translational shake amount computer 44, and is displayed on the monitor 4b as needed.

The amount of shake is measured in this way with the shake measurement system 1.

Features

Features of the shake measurement system 1 described above are compiled below.

(1)

With this shake measurement system 1, the pattern matching processor 42 uses image processing to acquire the amount of shake of the camera 2 as the first shake amounts f1p(t) and f1y(t). Since image processing is used to calculate the first shake amounts f1p(t) and f1y(t), the first shake amounts f1p(t) and f1y(t) include the translational shake of the camera 2. This translational shake includes shake generated by parallel movement of the camera 2, or rotational movement of the camera 2 generated when the rotational center moves away from the camera 2.

Meanwhile, the amount of shake of the camera 2 is acquired as the second shake amounts f2p(t) and f2y(t) by a different method from that used for the first shake amounts. More specifically, the triaxial gyro sensor 3 and the second shake amount computer 45 acquire the second shake amounts f2p(t) and f2y(t). The second shake amounts include only the amount of rotational shake of the camera 2, and do not include the above-mentioned translational shake.

Further, with this shake measurement system 1, the translational shake amount computer 44 acquires the amount of translational shake on the basis of the first and second shake amounts.

Thus, with this shake measurement system 1, since the amount of shake of the camera 2 can be acquired as the first and second shake amounts by two different methods. the first and second shake amounts can be used to acquire the amount of translational shake, and the amount of shake can be measured more accurately.

(2)

With this shake measurement system 1, synchronization information (such as the times T1 to T3) for synchronizing the first and second shake amounts can be acquired by the synchronization signal generation device 7, the time information acquisition section 49, and the time computer 40. Also, synchronization information (such as the times T4 to T6) can be acquired by the test pattern display device 5 and the pattern matching processor 42.

Since the translational shake amount computer 44 uses the acquired synchronization information to calculate the amount of translational shake, the first and second shake amounts can be associated in terms of time, and the amount of translational shake can be acquired on the basis of the first and second shake amounts at the same timing. Consequently, the amount of translational shake can be detected more accurately.

(3)

In particular, with this shake measurement system 1, since the synchronization signal generation device 7 displays changes in time so that they can be perceived visually, the time information needed for synchronization can be read from the captured image 10.

More specifically, since the LED elements 72 are used, which allows the drive time to be shortened, the resolution of the time information can be enhanced. In particular, since the lighting of the LED elements 72 is switched at a shorter period (1 ms) than the update period of the test patterns (60 Hz), the captured image 10 can be used to accurately specify how long the test patterns are displayed.

(4)

With this shake measurement system 1, the image processing by the pattern matching processor 42 is performed on the basis of the captured image 10 acquired by the camera 2. Since this captured image 10 includes an image of the synchronization signal generation device 7 and an image of the liquid crystal monitor 55, how long the test patterns are displayed on the liquid crystal monitor 55 can be accurately specified using the image of the synchronization signal generation device 7. Consequently, the first and second shake amounts can be synchronized more accurately.

(5)

With this shake measurement system 1, the difference between the first and second shake amounts is used to calculate the amount of translational shake. More specifically, since the amount of translational shake is calculated using Formulas 21 and 22, it is possible to measure the amount of translational shake, which was difficult to measure with prior art.

Second Embodiment

In the first embodiment above, pattern matching processing is performed in calculating the first shake amount, but other methods are also possible. For example, the first shake amount (amount of translational shake) may be calculated by calculating the movement vector from a captured image.

In the embodiments given below, those components having substantially the same function will be numbered the same, and will not be described again in detail.

Figure 25:
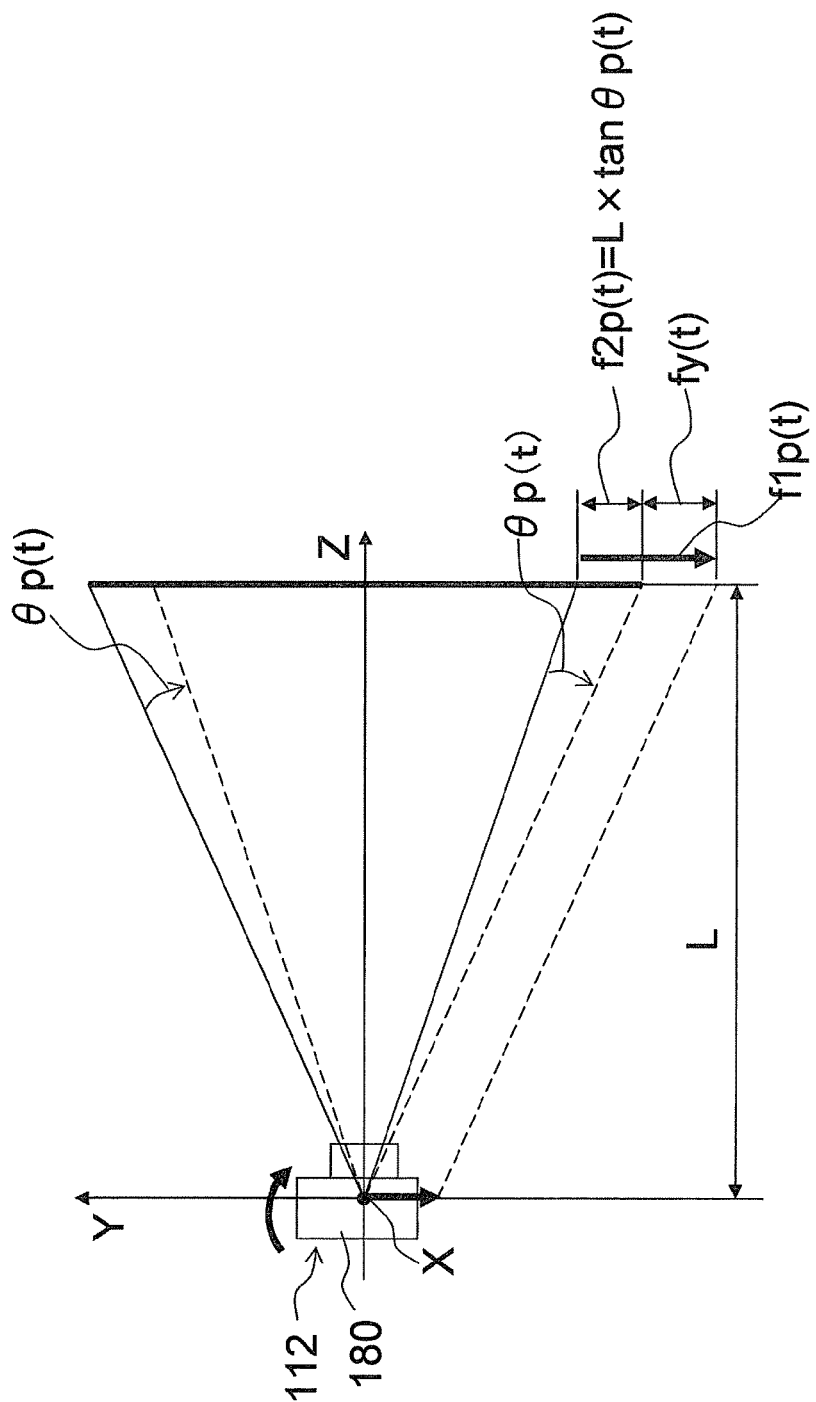
FIG. 25 is a diagram of the method for calculating the amount of translational shake (the pitch direction)
Figure 26:
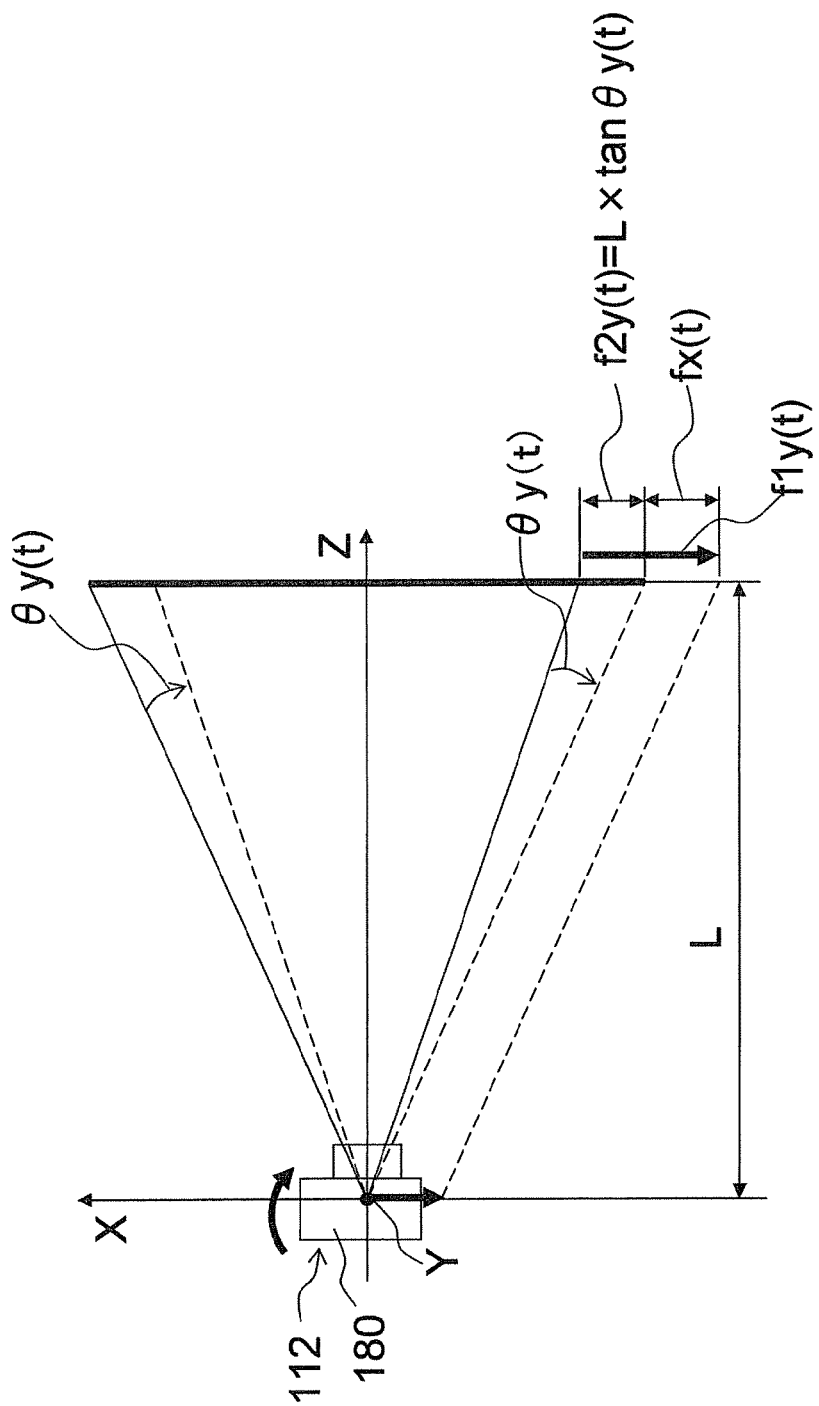
FIG. 26 is a diagram of the method for calculating the amount of translational shake (the yaw direction)

As shown in FIG. 25, as long as the amount of rotational shake θp(t) in the pitch direction of a camera 112, the movement vector f1p(t), and the imaging distance L are known, Formula 21 can be used to calculate the amount of translational shake fy(t) in the pitch direction. Also, as shown in FIG. 26, as long as the amount of rotational shake θy(t) in the yaw direction of a camera 112, the movement vector f1y(t), and the imaging distance L are known, Formula 22 can be used to calculate the amount of translational shake fx(t) in the yaw direction. In order to calculate the amount of translational shake by this method, the camera 112 has the following configuration.

Figure 27:
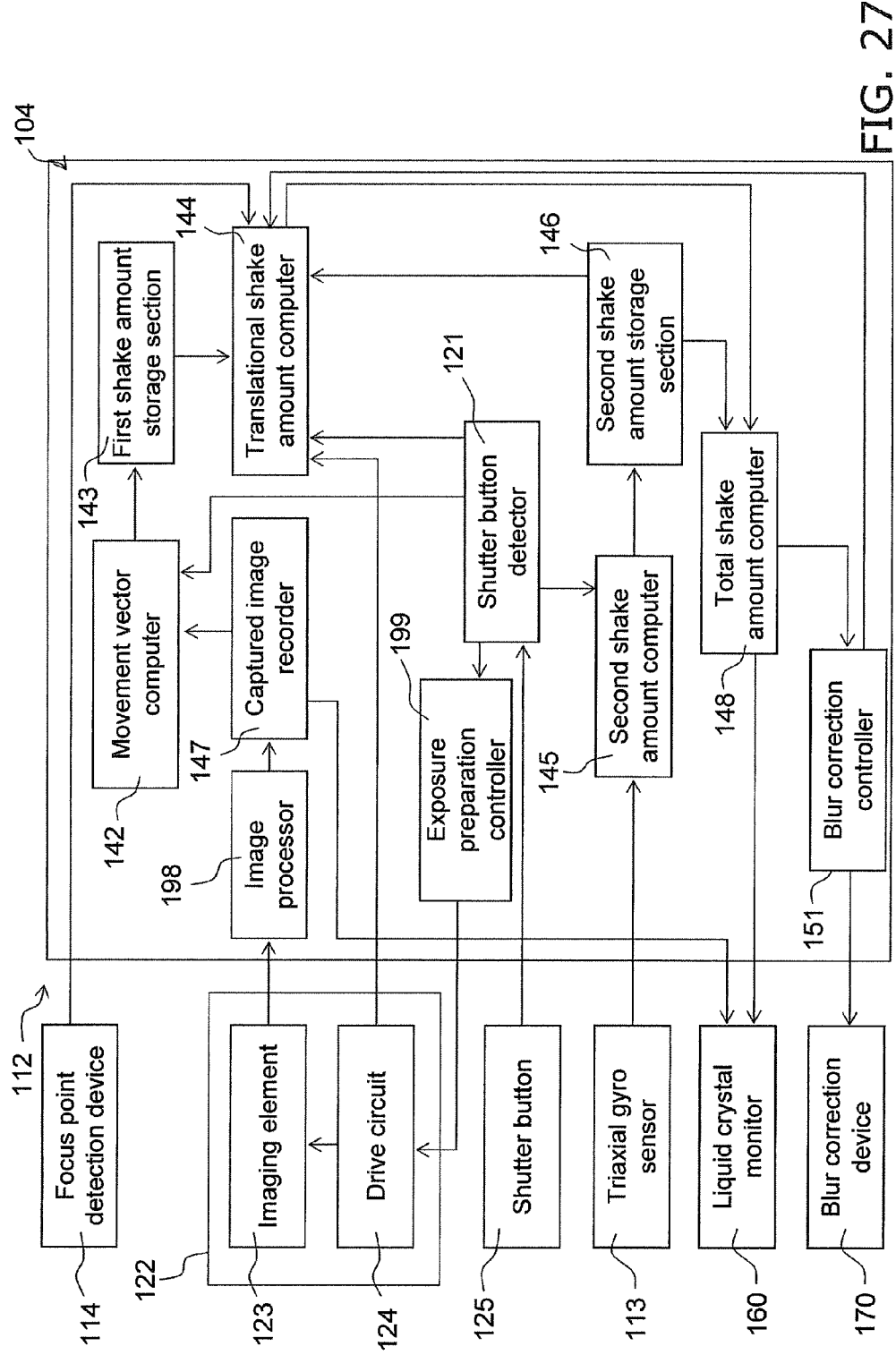
FIG. 27 is a simplified diagram of a camera configuration (second embodiment)
Figure 28:
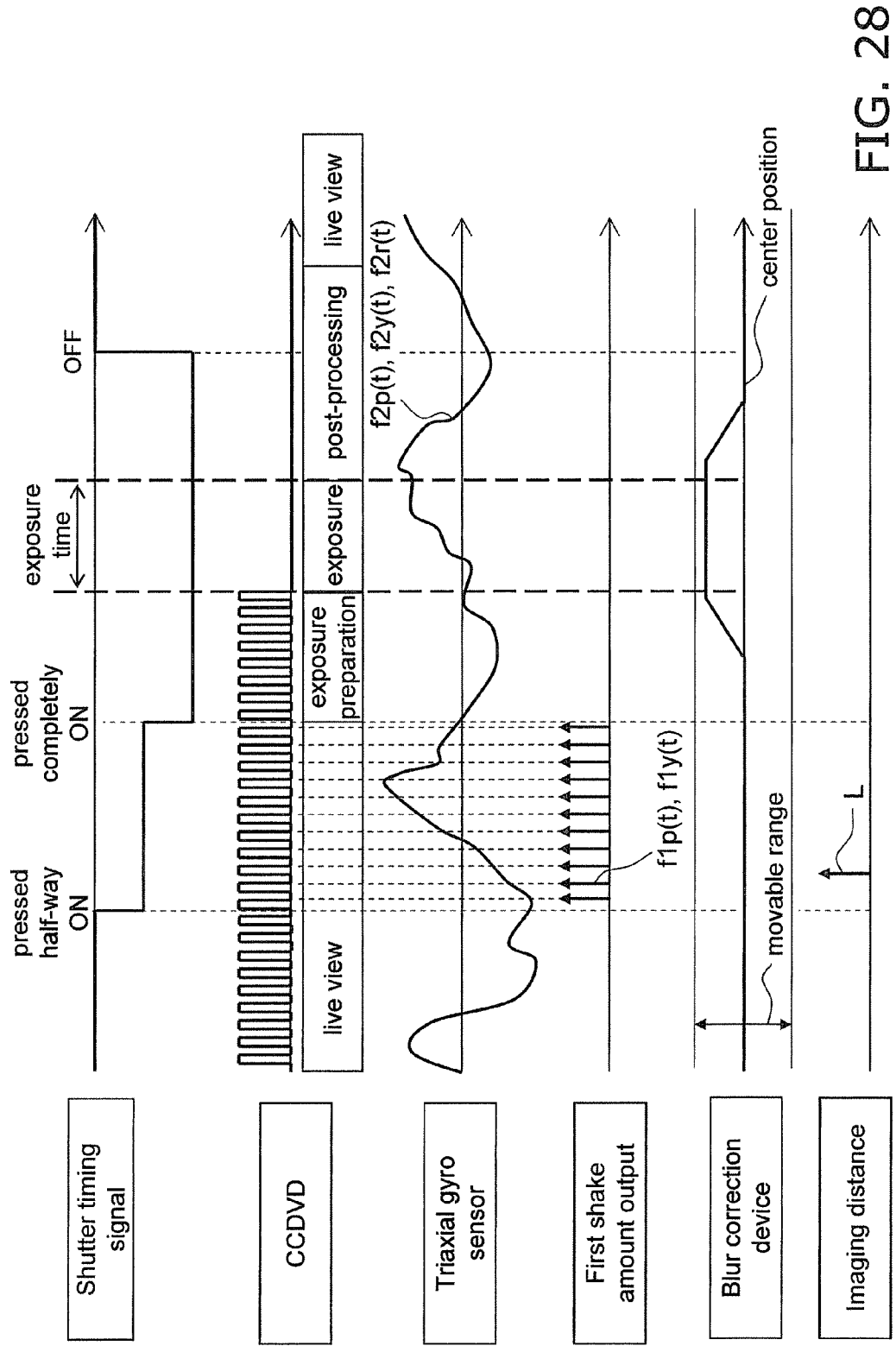
FIG. 28 is a timing chart for a camera (second embodiment)

As shown in FIG. 27, the camera 112 (an example of an imaging device) has a housing 180 (see FIGS. 25 and 26), an optical system (not shown), an image acquisition section 122, a triaxial gyro sensor 113, a focal point detection device 114, a controller 104, a shutter button 125, a liquid crystal monitor 160, and a blur correction device 170. The housing 180 holds the various components.

The image acquisition section 122 is a unit that acquires image data about a subject, and has an imaging element 123 and a drive circuit 124 for driving the imaging element 123. The imaging element 123 is a CCD, for example. The drive circuit 124 produces a vertical synchronization signal that serves as a reference for the timing at which the imaging element 123 starts charge elimination or charge accumulation, for example. The image acquisition section 122 is housed in the housing 180.

The shutter button 125 is pressed when imaging is to be performed. The pressing of the shutter button 125 is detected by a shutter button detector 121 of the controller 104. The shutter button 125 is a two-stage button, and the shutter button detector 121 can detect whether the shutter button 125 has been pressed half-way or all the way down. Upon detecting half-way or complete depression of the shutter button 125, the shutter button detector 121 outputs a half-pressed signal or completely-pressed signal.

The triaxial gyro sensor 113 (an example of a second shake amount acquisition section) has basically the same configuration as the triaxial gyro sensor 3 discussed above, but differs in that it is built into the camera 112 from the outset. The triaxial gyro sensor 113 detects the angular velocity around the X, Y, and Z axes of the camera 112, and acquires the amount of rotational shake of the housing 180 as a second shake amount by a different method from that of a movement vector computer 142, which functions as a first shake amount acquisition section. The triaxial gyro sensor 113 should be able to detect the angular velocity around at least the X and Y axes.

The liquid crystal monitor 160 displays a captured image acquire by the image acquisition section 122. In live view mode, a real-time image of a subject is displayed on the liquid crystal monitor 160.

The blur correction device 170 reduces the effect that shaking of the camera 112 has on a captured image, and has a correcting lens (not shown) provided movably in a direction perpendicular to the optical axis, and a drive unit (not shown) for driving the correcting lens, for example. With the blur correction device 170, the correcting lens is driven by the drive unit on the basis of data about the shake amount calculated by a total shake amount computer 148 (discussed below) of the controller 104. For example, possible blur correction modes include a first correction mode in which correction is started after the shutter button 125 has been pressed half-way down, and a second correction mode in which correction is started after the shutter button 125 has been pressed all the way down. If no blur correction is performed, the drive unit performs centering to hold the correcting lens in the center position either mechanically or electrically.

The focal point detection device 114 has, for example, an auto-focus function that employs a contrast detection method or phase difference detection method. The focal point detection device 114 can measure the distance from the camera 112 to a subject.

The controller 104 is a unit that controls the camera 112. and has an image processor 198, a captured image recorder 147, the movement vector computer 142, a first shake amount storage section 143, a translational shake amount computer 144, an exposure preparation controller 199, the shutter button detector 121, a second shake amount computer 145, a second shake amount storage section 146, the total shake amount computer 148, and a blur correction controller 151.

The image processor 198 subjects an image acquired by the image acquisition section 122 to digitization or other such specific processing. The captured image recorder 147 stores as a captured image the image data that has been processed by the image processor 198. The movement vector computer 142 (an example of a first shake amount acquisition section)

detects a movement vector on the basis of the captured image (an example of image data) acquired by the image acquisition section 122. An example of how the movement vector is detected is a method in which the movement of a representative point between two images is found by computation. The first shake amount storage section 143 stores as first shake amounts the shake amounts (f1p(t) and f1y(t)) obtained by the movement vector computer 142.

The shutter button detector 121 detects whether or not the shutter button 125 has been pressed. The exposure preparation controller 199 is a unit for adjusting the focus unit and the aperture unit to the desire imaging state prior to the start of exposure with the image acquisition section 122. If the shutter button detector 121 has detected that the shutter button 125 has been pressed, control of the various components is begun by the exposure preparation controller 199.

The second shake amount computer 145 (an example of a second shake amount acquisition section) is similar to the above-mentioned second shake amount computer 45 in that it calculates rotational angle on the basis of the angular velocity outputted from the triaxial gyro sensor 113. The second shake amount storage section 146 stores as second shake amounts the rotational angles θp(t) and θy(t) outputted by the second shake amount computer 145.

The 244 (an example of a third shake amount acquisition section) calculates the amount of translational shake of the housing 180 (an example of a third shake amount) by using the first shake amounts stored in a first shake amount storage section 243 and the second shake amounts stored in a second shake amount storage section 246. More specifically, the 244 uses the above-mentioned Formulas 21 and 22 to calculate the translational shake amounts fx(t) and fy(t).

The total shake amount computer 148 calculates the total amount of shake on the basis of the amount of rotational shake detected by the triaxial gyro sensor 113 and the amount of translational shake calculated by the translational shake amount computer 144. More specifically, the total shake amount θpf in the pitch direction and the total shake amount θyf in the yaw direction are expressed by the following formulas.

$$\theta yf = \theta y(t) + \tan^{-1}\frac{fx(t)}{L}$$ [Mathematical Formula 27]

$$\theta pf = \theta p(t) + \tan^{-1}\frac{fy(t)}{L}$$ [Mathematical Formula 28]

The blur correction controller 151 controls the blur correction device 170 on the basis of the total shake amounts θpf and θyf calculated by the total shake amount computer 148. More specifically, the blur correction controller 151 sends target position information for the correcting lens to the blur correction device 170 so that the correcting lens will be driven by the drive unit to the position corresponding to the total shake amount. When the blur correction function has been switched off, the blur correction controller 151 controls the blur correction device 170 so that the correcting lens is maintained in the center position.

The operation of the camera 112 will now be described through reference to FIG. 29. The description here will be for a case in which a second correction mode is selected as the blur correction mode, and live view mode is selected as the imaging mode.

Figure 29:
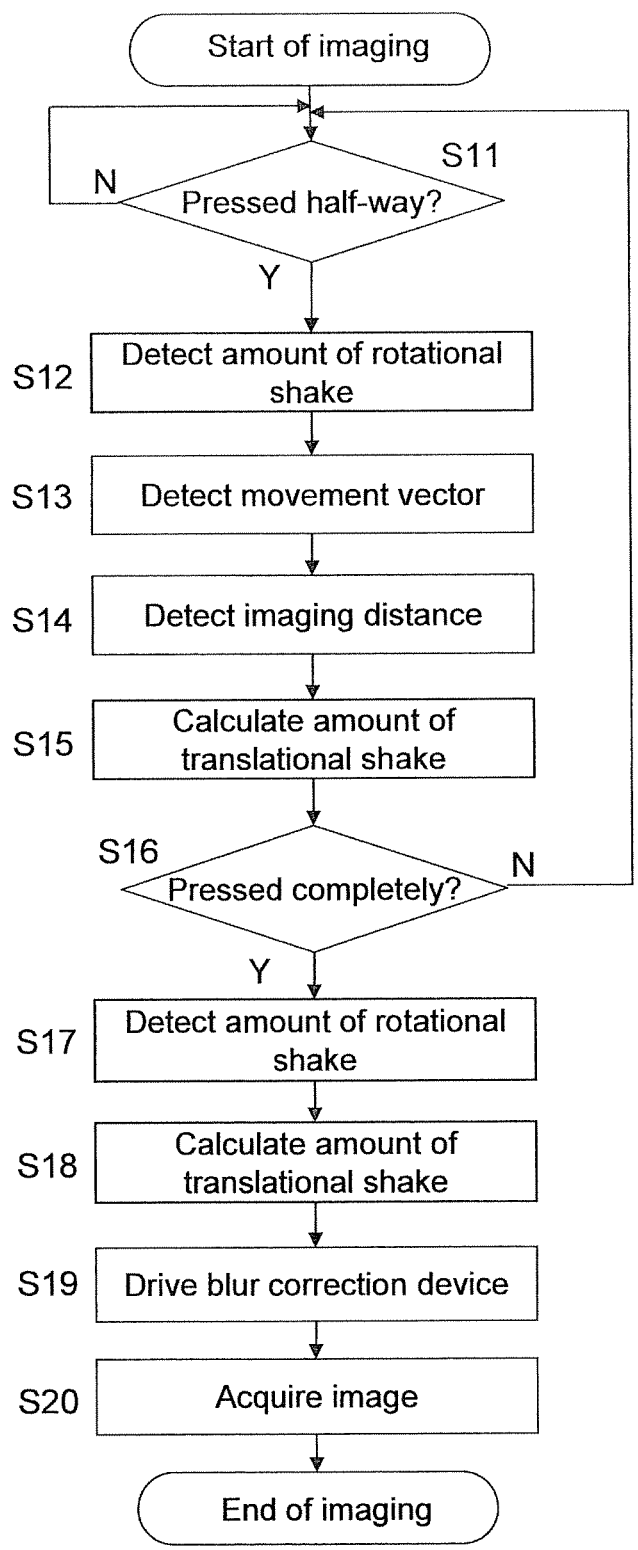
FIG. 29 is a flow chart for a camera (second embodiment)

As shown in FIG. 29, in live view mode, a real-time image of a subject is displayed on the liquid crystal monitor 160 while the state of the shutter button 125 is monitored by the shutter button detector 121 (S11). If the shutter button 125 is pressed half-way down, this is detected by the shutter button detector 121, and a half-way pressed signal (an example of first manipulation information) is outputted from the shutter button detector 121. When this half-way pressed signal is outputted from he shutter button detector 121, auto-focusing is performed by the focal point detection device 114, and then rotational shake detection is performed (S12). More specifically, when a half-way pressed signal is outputted from the shutter button detector 121 to the second shake amount computer 145, the second shake amount computer 145 calculates the rotational angles θp(t), θy(t), and θr(t) around the X, Y, and Z axes on the basis of the angular velocities ωx(t), ωy(t), and ωz(t) outputted from the triaxial gyro sensor 113. The rotational angles θp(t), θy(t), and θr(t) calculated by the second shake amount computer 45 are temporarily stored in the second shake amount storage section 46 along with the time information t.

After the shutter button 125 has been pressed half-way down, detection of the movement vector by image processing is begun (S13). More specifically, a captured image corresponding to the vertical synchronization signal outputted after the shutter button 125 was pressed half-way down is compared by the movement vector computer 142 with the captured image acquired before that captured image and stored in the captured image recorder 147. As a result, the movement vector computer 142 calculates the movement vector in the pitch and yaw directions as the first shake amounts f1p(t) and f1y(t). As shown in FIGS. 25 and 26, the movement vector here is converted into a vector on the subject. The first shake amounts f1p(t) and f1y(t) calculated by the movement vector computer 142 are stored by the first shake amount storage section 143.

Furthermore, after the shutter button 125 has been pressed half-way down, focal detection is performed by the focal point detection device 114, and the imaging distance L from the camera 112 to the main subject is detected (S14). Auto-focusing is performed on the basis of the focal detection result. The calculated imaging distance L is sent from the focal point detection device 114 to the translational shake amount computer 144.

Next, the translational shake amount computer 144 calculates the translational shake amounts fx(t) and fy(t) on the basis of the first shake amounts f1p(t) and f1y(t), the second shake amounts θp(t) and θy(t), and the imaging distance L (S15). The above-mentioned Formulas 21 and 22 are used in calculating the translational shake amounts fx(t) and fy(t).

In calculating the amount of translational shake, it is preferable to synchronize the first shake amount and the second shake amount. For example, this synchronization processing is performed by the translational shake amount computer 144. More specifically, the detection period for the second shake amount detected by the triaxial gyro sensor 113 is shorter than the detection period for the first shake amount calculated as a movement vector. For example, the detection period for the first shake amount is 1/30 ins (30 Hz), whereas the detection period for the second shake amount is 1 ms (1000 Hz). Therefore, the translational shake amount computer 144 chooses a second shake amount acquired at the same timing (or a timing that is close), to match the detection timing of the first shake amount that has a longer detection period.

More precisely, in live view mode, in order to display a real-time image of the subject, vertical synchronization signals are successively outputted from the drive circuit 124 to the imaging element 123 at a specific period (such as the 30 Hz frame rate of the live view mode). At this point vertical synchronization signals are also sent from the drive circuit 124 to the translational shake amount computer 144. This allows the translational shake amount computer 144 to ascertain the timing at which the captured image is acquired by the imaging element 123.

Figure 30:
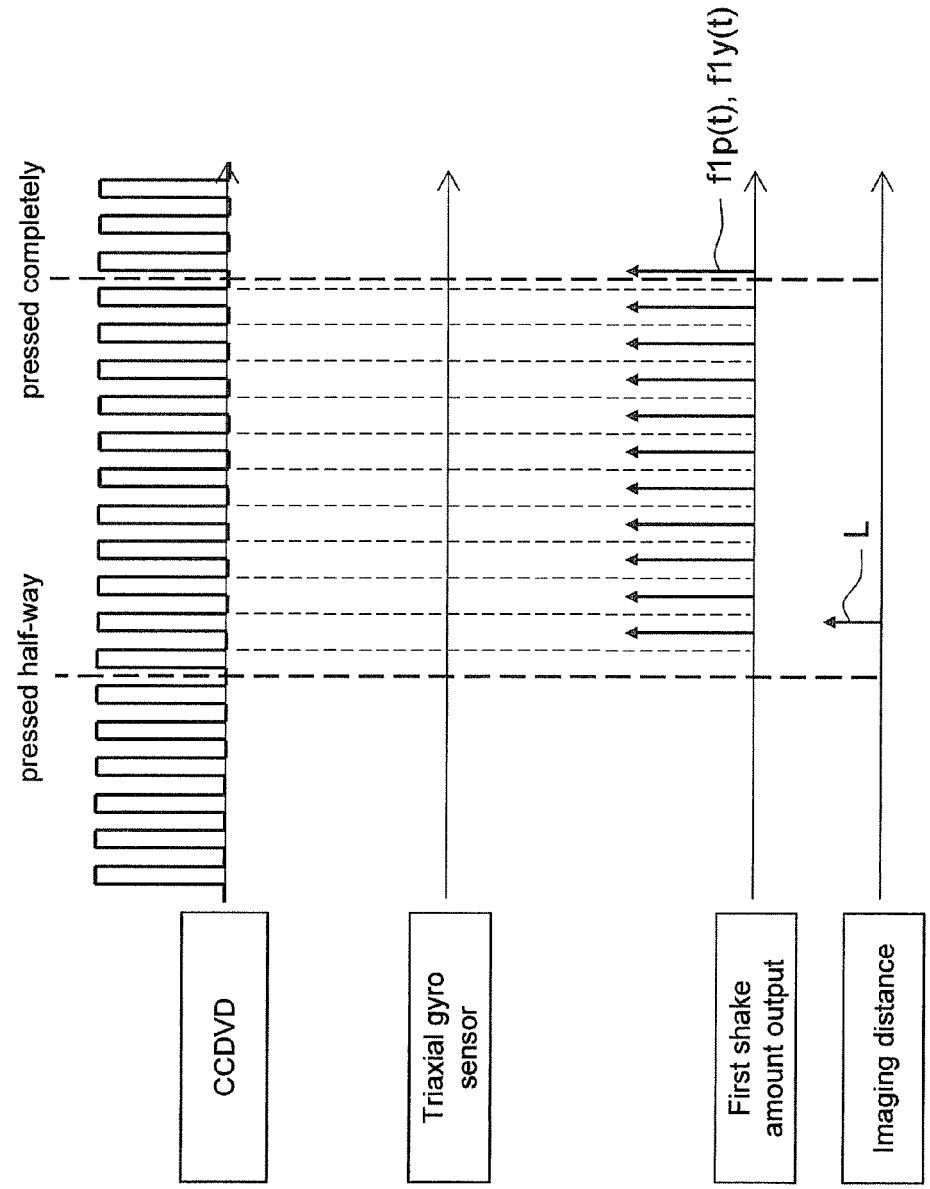
FIG. 30 is a detail view of a timing chart (second embodiment)

Meanwhile, since a half-way pressed signal is inputted from the shutter button detector 121 to the translational shake amount computer 144, the translational shake amount computer 144 selects the first and second shake amounts acquired at about the same time, using the half-way pressed signal as a reference. More specifically, as shown in FIG. 30, the vertical synchronization signal inputted simultaneously with the half-way pressed signal, or immediately after the half-way pressed signal, is identified by the translational shake amount computer 144, and the second shake amounts θp(t) and θy(t) inputted simultaneously with that vertical synchronization signal, or immediately after that vertical synchronization signal, are chosen by the translational shake amount computer 144.

Sine the calculation of the movement vector here is performed by image processing, there is a slight time lag from the input of the vertical synchronization signal until the calculation of the movement vector. Therefore, as shown in FIG. 30, the output of the first shake amount is actually somewhat slower than the input of the vertical synchronization signal.

In view of this, the movement vectors (first shake amounts) f1p(t1') and f1y(t1') calculated after the input of the half-way pressed signal are chosen by the translational shake amount computer 144 as the first shake amounts corresponding to the second shake amounts θp(t) and θy(t).

When selection of the first and second shake amounts is complete, the translational shake amount computer 144 calculates the amount of translational shake on the basis of these first and second shake amounts, and the imaging distance L detected using the focal point detection device 114.

Thereafter, when the half-way pressed button is either released or pressed the rest of the way down, the vertical synchronization signal serving as the reference is successively changed, and synchronization of the first and second shake amounts as above is successively carried out by the translational shake amount computer 144. Consequently, the amount of translational shake can be calculated on the basis of first and second shake amounts detected at substantially the same timing, and accuracy of the amount of translational shake can be maintained.

In the above flow, detection of the amount of rotational shake, calculation of the movement vector, and detection of the imaging distance are arranged in order, but these may be executed at the same time, or in a different order from that given above.

After steps S12 to S15, the shutter button detector 121 confirms whether the shutter button 125 has been pressed all the way down, and steps S12 to S15 are repeated until the shutter button 125 has been pressed all the way down, or until the half-way pressed button is released. Every time steps S12 to S15 are repeated, the amount of translational shake stored in the translational shake amount computer 144 is updated to the newest value. The update period is the same as the period (1/30 s) of the vertical synchronization signal.

The translational shake amount stored in the translational shake amount computer 144 need not be just the latest data from immediately after calculation, and past data may also be held along with time information.

When the shutter button 125 is pressed all the way down, a fully pressed signal is outputted from the shutter button detector 121. The processing of steps S12 to S15 is halted on the basis of this fully pressed signal (an example of second manipulation information). More specifically, when the shutter button 125 is pressed all the way down, the translational shake amount computer 144 receives a fully pressed signal from the shutter button detector 121. The translational shake amount computer 144 halts calculation of the translational shake amount on the basis of this fully pressed signal. Meanwhile, when the translational shake amount computer 144 receives a fully pressed signal, the amount of rotational shake is detected by the triaxial gyro sensor 113 and the second shake amount computer 145. In this way, the amount of rotational shake when the button has been pressed all the way down is chosen by the translational shake amount computer 144 as the second shake amount from the second shake amount storage section 146.

When the rotational shake amount is chosen, the total amount of shake is calculated by the total shake amount computer 148 using the rotational shake amount and the translational shake amount (S18). At this point the amount of translational shake calculated last in step S15 is used as the translational shake amount, but the latest rotational shake amount detected in step S17 is used as the rotational shake amount. The translational shake amount need not be just the data calculated last, and a plurality of data values calculated up to that point may be used to calculate an average value or a predicted value, and that value used.

After calculation of the total shake amount, drive of the blur correction device 170 is begun as one of the exposure preparation operations (S19). More specifically, the drive amount of the correcting lens of the blur correction device 170 is calculated on the basis of the calculated total shake amount, and the correcting lens is driven to a specific position on the basis of the calculated drive amount.

After the drive of the blur correction device 170, if the other exposure preparation operations have been completed, an image is acquired (S20). More specifically, the shutter unit (not shown) causes the imaging element 123 to expose for a specific length of time. Once the image acquisition is complete, the captured image is stored on a memory card or other such storage medium.

As described above, since the total shake amount includes not only the rotational shake amount, but also the translational shake amount, better blur correction performance can be realized that also takes translational shake into account, and the effect that shaking of the camera 112 has on the captured image can be effectively reduced.

In particular, experiments conducted by the inventors have revealed that while the detection period (1/30 s) of the first shake amount is longer than the detection period (1 ms) of the second shake amount, translational shake has a lower frequency that rotational shake, and is a smoother shaking. Accordingly, even though the movement vector is calculated under conditions of a relatively low frame rate, such as in live view, accuracy of the first shake amount can still be maintained adequately. Furthermore, since use is made of the output of the triaxial gyro sensor 113 which can detect the amount of rotational shake at relatively high accuracy, detection accuracy for the total shake amount can be improved over when the total shake amount is detected from the movement vector alone. That is, with this camera 112 highly accurate blur correction that takes translational shake into account is possible.

Since there is no need to provide an acceleration sensor for detecting the amount of translational shake, with the camera 112 accurate blur correction is possible with a simple constitution.

Third Embodiment

Figure 31:
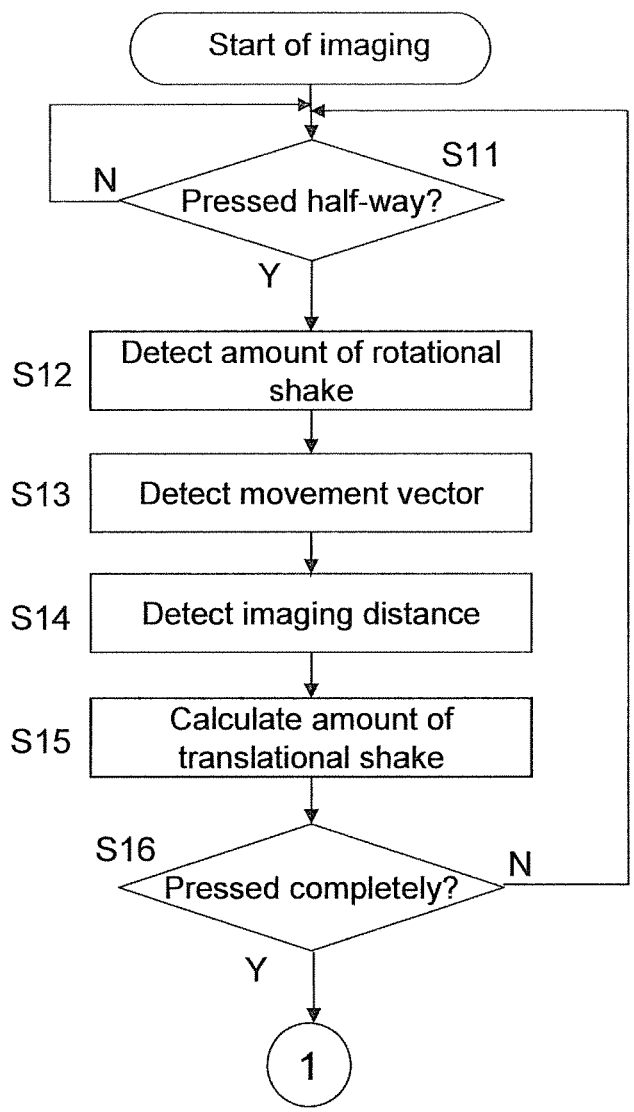
FIG. 31 is a flow chart for a camera (third embodiment)
Figure 32:
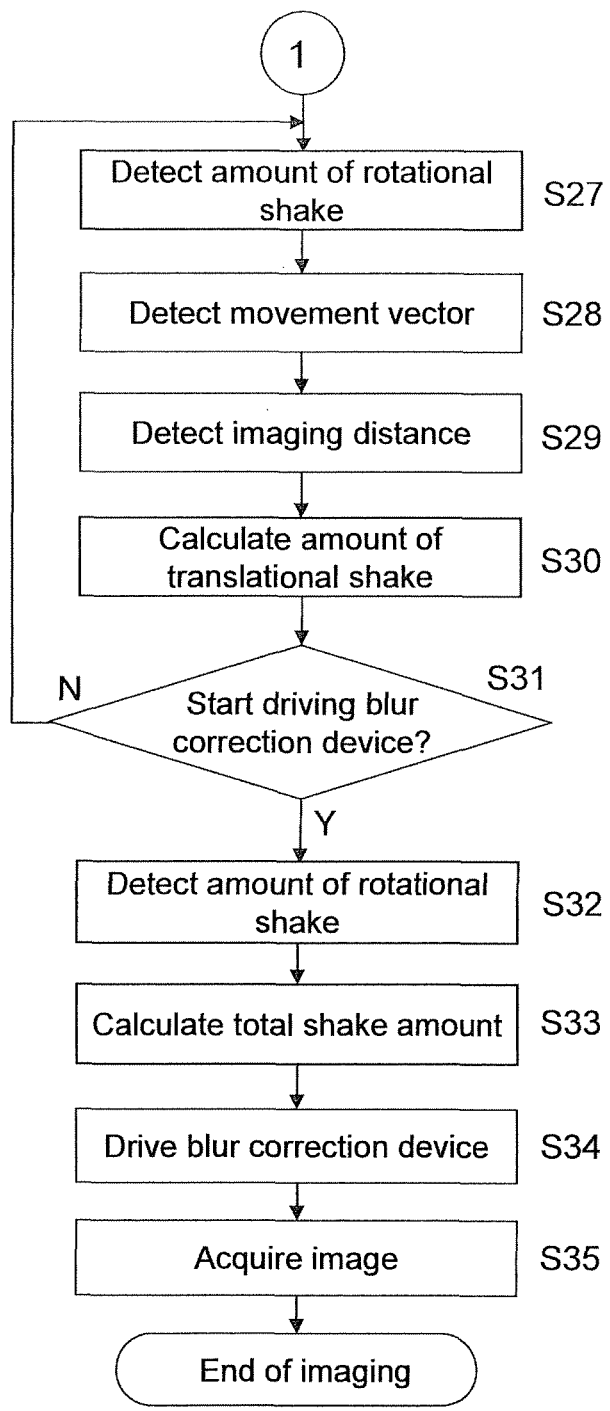
FIG. 32 is a flow chart for a camera (third embodiment)

In the second embodiment above, the calculation of the translational shake amount is halted when the shutter button 125 is pressed all the way down, but it is also conceivable that the calculation of the translational shake amount will continue until just before the blur correction device 170 is driven. For example, as shown in FIGS. 31 and 32, the flow is the same as in FIG. 29 from steps S11 to S16, but after the shutter button 125 is pressed all the way down, the operation of steps S12 to S15 is further repeated until the drive of the blur correction device 170 begins.

More specifically. when the shutter button 125 is pressed all the way down, a fully pressed signal is outputted from the shutter button detector 121, and just as in steps S12 to S14 in FIG. 29, the amount of rotational shake, the movement vector, and the imaging distance are detected by the various components (S27 to S29). Furthermore, just as in step S15 above, the amount of translational shake is calculated by the translational shake amount computer 144 (S30).

After the calculation of the translational shake amount, the blur correction controller 151 determines whether or not the drive of the blur correction device 170 has begun (S31), and steps S27 to S30 are repeated until the blur correction device 170 begins correcting. If the blur correction controller 151 determines that the drive of the blur correction device 170 has begun, the processing moves to step S32.

In step S32, a blur correction start signal is sent from the blur correction controller 151 to the translational shake amount computer 144, and just as in steps S17 to S20 in FIG. 29, detection of the amount of rotational shake, calculation of the total shake amount, drive of the blur correction device 170, and image acquisition are performed (S32 to S35).

Thus, with the flow pertaining to the third embodiment, calculation of the translational shake amount is carried out just before the blur correction device 170 is driven, so the accuracy of the translational shake amount can be increased and an improvement in correction performance of the blur correction device 170 can be anticipated.

Fourth Embodiment

In the second and third embodiments above, the translational shake amount calculation processing of steps S12 to S15 is begun after the shutter button 125 is pressed half-way down, but a configuration is also possible in which the translational shake amount calculation processing is begun at an earlier stage. For example, detection of the amount of rotational shake, calculation of the movement vector, detection of the imaging distance, and calculation of the amount of translational shake may be started when the imaging mode is switched to live view mode. We will now describe a case in which the imaging mode is the live view mode, and continuous auto-focus mode has been set, in which the auto-focus is carried out continuously.

Figure 33:
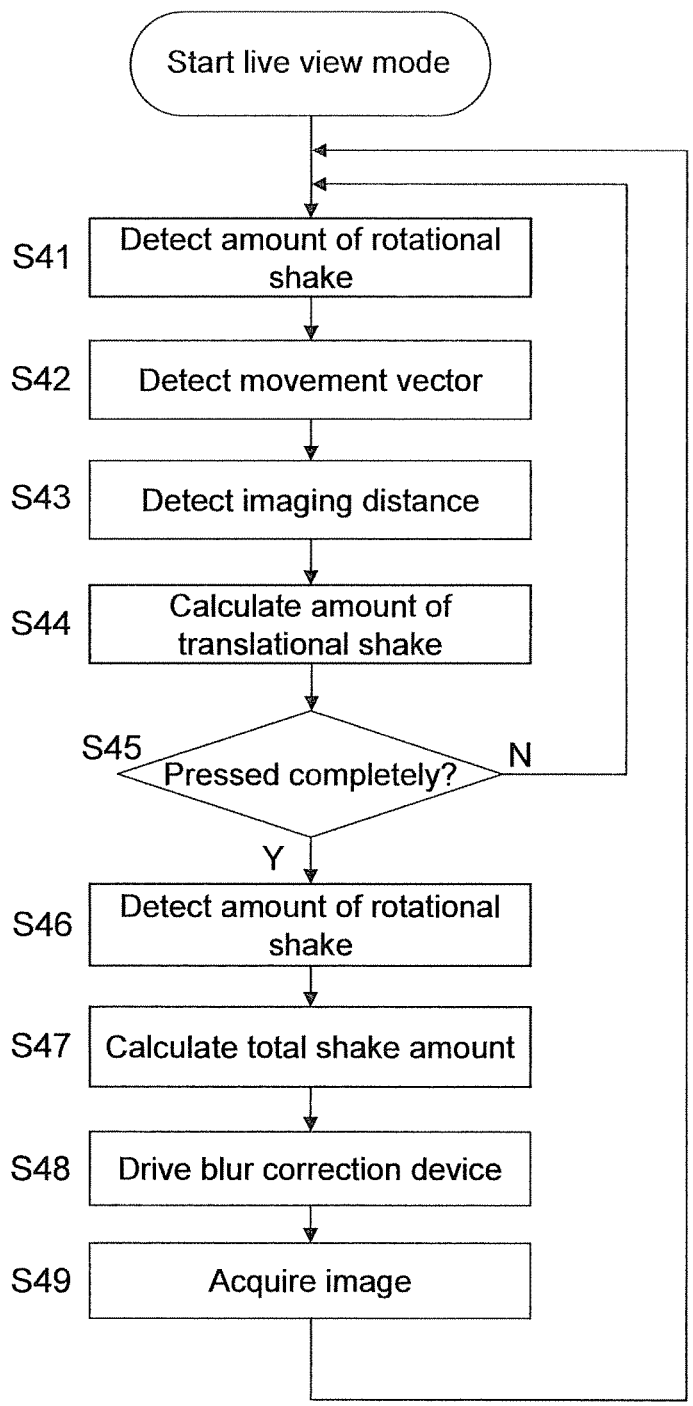
FIG. 33 is a flow chart for a camera (fourth embodiment)

As shown in FIG. 33, after the change to live view mode, just as in steps S12 to S15 in FIG. 29, detection of the amount of rotational shake, calculation of he movement vector, detection of the imaging distance, and calculation of the amount of translational shake are started (S41 to S44). Since the continuous auto-focus mode is set at this point, a state is maintained in which the subject is in focus. In this state, steps S41 to S44 are repeated until the shutter button 125 is pressed all the way down (S45). Sine the subject is in focus, accurate detection of the movement vector can be ensured.

When the shutter button 125 is pressed all the way down, just as in steps S17 to S20 in FIG. 29, detection of the amount of rotational shake, calculation of the total shake amount, drive of the blur correction device 170, and image acquisition are successively executed (S46 to S49).

Thus, detection of the amount of translational shake is begun when the imaging mode is switched to live view mode, so the amount of translational shake can be calculated in advance, before the shutter button 125 is pressed half-way down. Consequently, even when the time between half-way pressing and full pressing is extremely short (such as when the user presses the shutter button 125 all the way down all at once), since there is no need to execute calculation processing for the amount of translational shake between when the button is pressed half-way down and when it is pressed all the way down, the time lag during imaging can be reduced, at least compared to the second and third embodiments.

Fifth Embodiment

Figure 34:
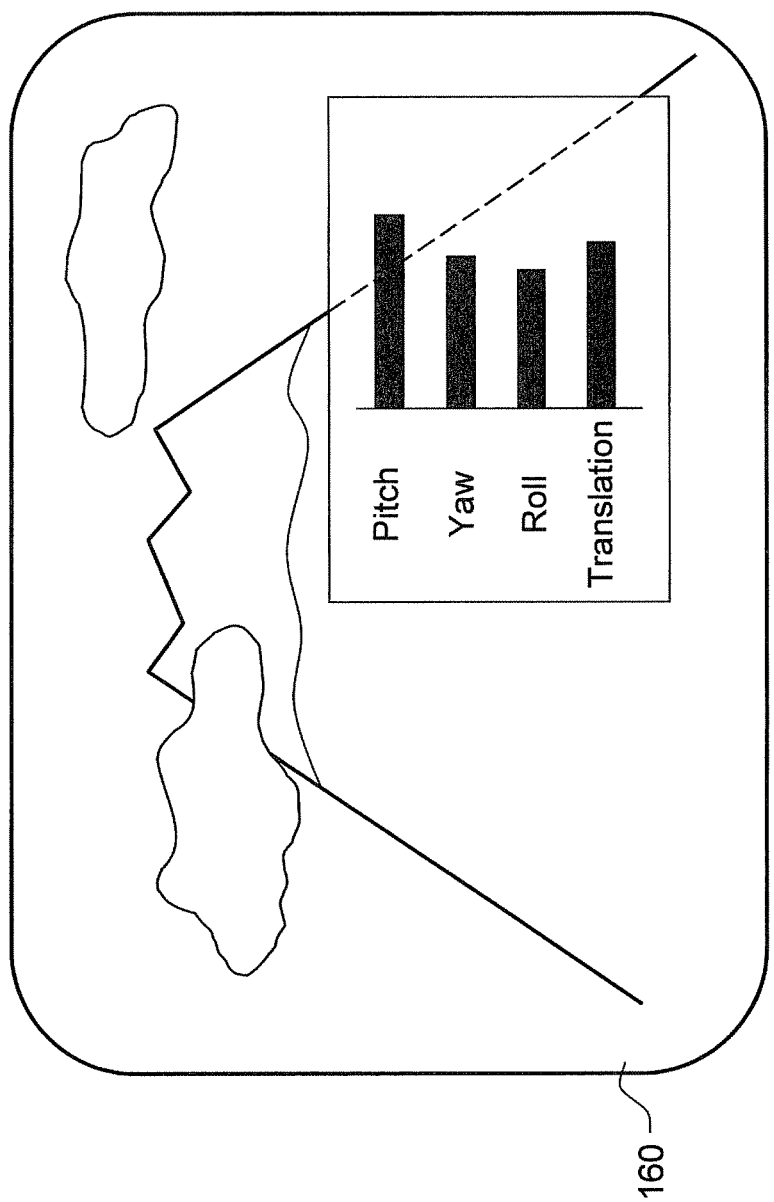
FIG. 34 is an example of displaying the amount of shake (fifth embodiment)

With a camera capable of detecting both the amount of rotational shake and the amount of translational shake, such as in the second to fourth embodiments above, it is also conceivable that the detected rotational shake amount and translational shake amount will be displayed on the liquid crystal monitor 160. More specifically, as shown in FIG. 34, the amount of rotational shake (second shake amount) in the pitch, yaw, and roll directions detected by the triaxial gyro sensor 113, and the amount of translational shake (third shake amount) calculated from the amount of rotational shake and the movement vector, are displayed on the liquid crystal monitor 160 of the camera 112. For example, when a captured image is displayed on the liquid crystal monitor 160 after image acquisition is complete. the bar graph shown in FIG. 34 may be displayed on the liquid crystal monitor 160 along with the captured image. In this case, the user can ascertain the amount of shake during imaging, and can determine the quality of the captured image by referring to the displayed amount of shake.

The same effect as above can be obtained with a constitution in which the amount of rotational shake (second shake amount) in the yaw and roll directions, and/or the amount of translational shake (third shake amount) calculated from the amount of rotational shake and the movement vector, is displayed.

Other Embodiments

The present invention is not limited to the embodiments given above, and various modifications are possible without departing from the gist of the invention.

(A)

In the first embodiment above, pattern matching processing is performed in calculating the first shake amount, but other methods are also possible. For instance, the first shake amount may be calculated by calculating the movement vector from a captured image. In this case, a shake measurement system can be realized with just a camera, as in the second to fourth embodiments above.

Figure 35:
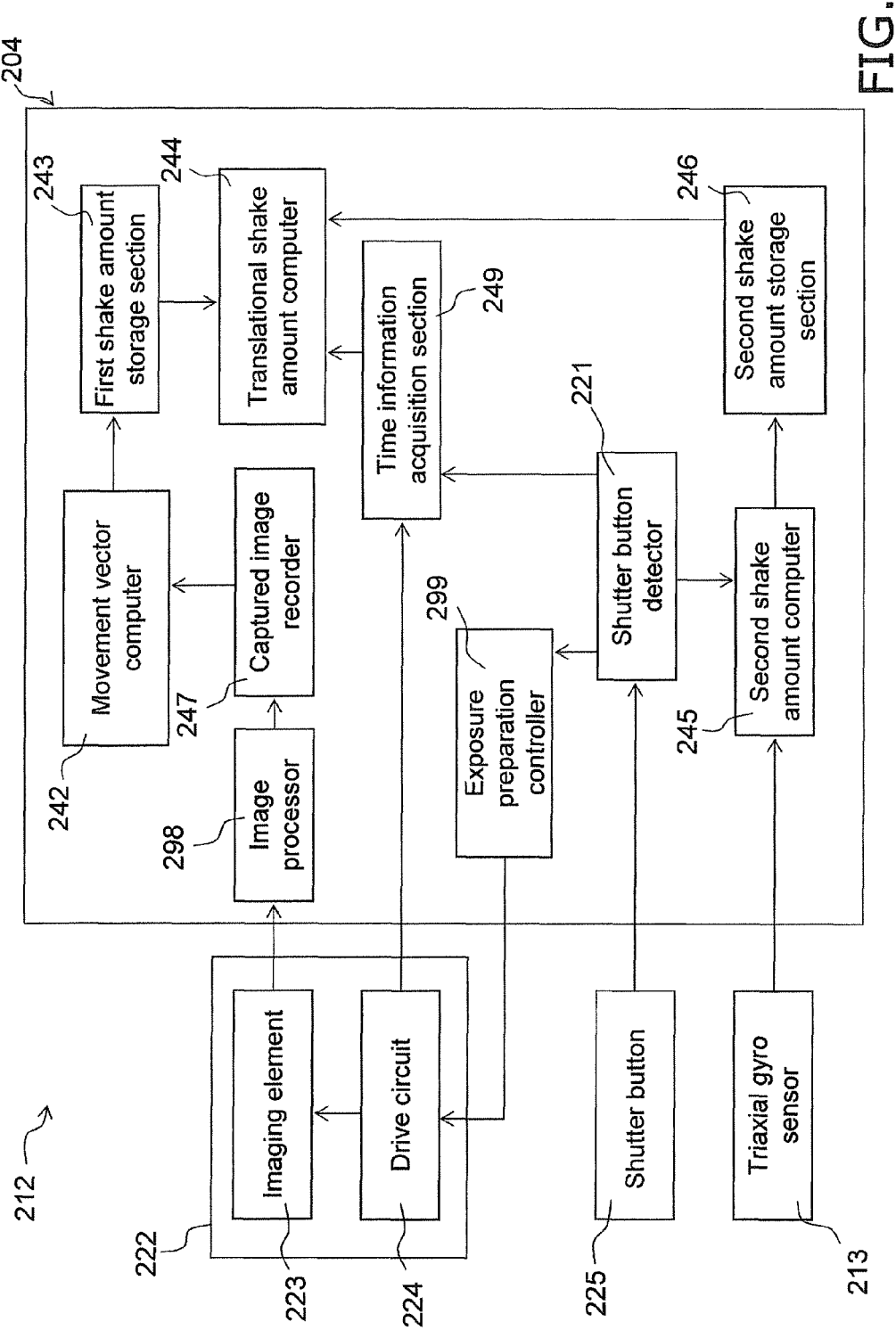
FIG. 35 is a simplified diagram of a camera configuration (other embodiment)

More specifically, as shown in FIG. 35, a camera 212 (an example of an imaging device) has an optical system (not shown), an image acquisition section 222, a triaxial gyro sensor 213, a controller 204, and a shutter button 225. When this shake measurement system is used, the camera 212 is switched to the mode of the shake measurement system. In this mode, the blur correction function is off.

The image acquisition section 222 has an imaging element 223 and a drive circuit 224 for driving the imaging element 223. The imaging element 223 is a CCD, for example. The drive circuit 224 produces a vertical synchronization signal that serves as a reference for the timing at which the imaging element 223 starts charge elimination or charge accumulation, for example.

The shutter button 225 is pressed when imaging is to be performed. The pressing of the shutter button 225 is detected by a shutter button detector 221 of the controller 204.

The triaxial gyro sensor 213 has basically the same configuration as the triaxial gyro sensor 3 discussed above, but differs in that it is built into the camera 212 from the outset. The triaxial gyro sensor 213 detects the angular velocity around the X, Y, and Z axes of the camera 212.

The controller 204 is a unit that controls the camera 212, and has an image processor 298, a captured image recorder 247, the movement vector computer 242, a first shake amount storage section 243, a translational shake amount computer 244, a time information acquisition section 249, an exposure preparation controller 299, the shutter button detector 221, a second shake amount computer 245, and a second shake amount storage section 246.

The image processor 298 subjects an image acquired by the image acquisition section 222 to digitization or other such specific processing. The captured image recorder 247 stores as a captured image the image data that has been processed by the image processor 298. The movement vector computer 242 detects a movement vector on the basis of the captured image. An example of how the movement vector is detected is a method in which the movement of a representative point between two images is found by computation. The first shake amount storage section 243 stores as a first shake amount the shake amount obtained by the movement vector computer 242.

The shutter button detector 221 detects whether or not the shutter button 225 has been pressed. The exposure preparation controller 299 is a unit for adjusting the focus unit and the aperture unit to the desire imaging state prior to the start of exposure with the image acquisition section 222. If the shutter button detector 221 has detected that the shutter button 225 has been pressed, control of the various components is begun by the exposure preparation controller 299.

The time information acquisition section 249 acquires time information for synchronization in calculating the amount of translational shake from the first and second shake amounts on the basis of signals outputted from the drive circuit 224 and the shutter button detector 221.

The second shake amount computer 245 calculates the second shake amount on the basis of the angular velocity outputted from the triaxial gyro sensor 213. The second shake amount storage section 246 stores as a second shake amount the angular velocity outputted by the second shake amount computer 245.

The operation of the camera 212 will now be described through reference to FIG. 36.

Figure 36:
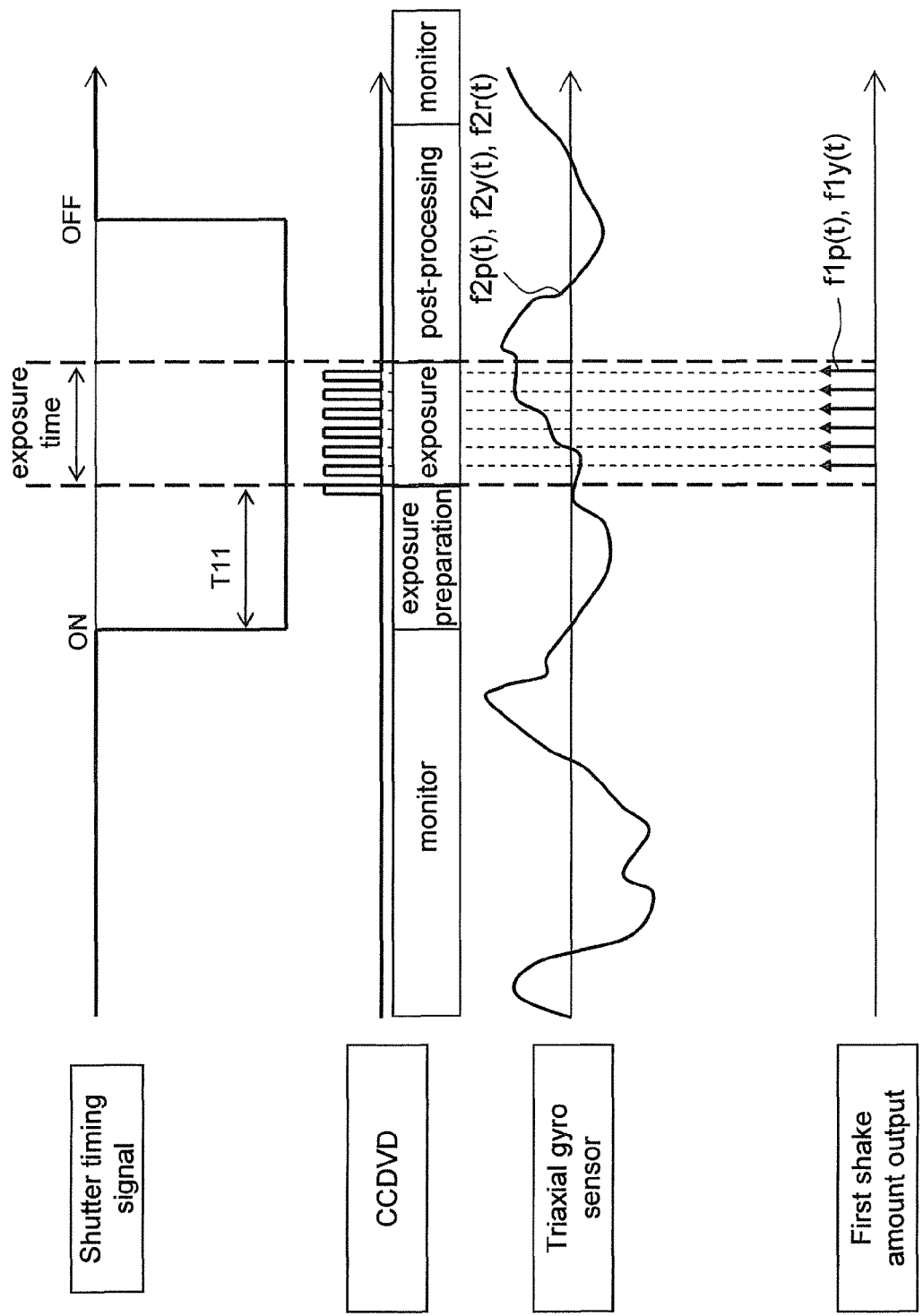
FIG. 36 is a timing chart for a camera (other embodiment).

As shown in FIG. 36, when the shutter button 225 is pressed on, the exposure preparation controller 299 begins exposure preparations. How long these exposure preparations take will vary with the imaging situation, as discussed above.

Next, the image acquisition section 222 begins exposure. More specifically, when the drive circuit 224 receives a signal from the exposure preparation controller 299 indicating completion of preparations, the drive circuit 224 produces vertical synchronization signals at a specific period and outputs them to the imaging element 223. These signals result in the accumulation of charges and the output of accumulated charges at the imaging element 223. The period of the vertical synchronization signals is 1/30 s, for example. As shown in FIG. 36, data corresponding to seven images is successively outputted from the imaging element 223 during exposure.

After the charges outputted from the imaging element 223 have been converted into digital signals, they are successively stored in the captured image recorder 247.

The movement vector computer 242 detects a movement vector by comparing the captured images stored in the captured image recorder 247. For example, the first image is compared with the second image, and the pitch and yaw components of the shake amount of the camera 212 are detected as first shake amounts. The first shake amounts detected by the movement vector computer 242 are stored by the first shake amount storage section 243. Here, the pitch and yaw components of the shake amount of the camera 212 include the amount of rotational shake and the amount of translational shake. In detecting the amount of shake of the camera 212, it is preferable to detect movement that does not include the roll component of the camera 212.

The second shake amount computer 245 calculates the pitch, yaw, and roll components of the amount of shake of the camera 212 on the basis of the angular velocity outputted from the triaxial gyro sensor 213. The second shake amounts calculated by the second shake amount computer 245 are stored in the second shake amount storage section 246.

The translational shake amount computer 244 calculates the amount of translational shake by using the first shake amounts stored in the first shake amount storage section 243 and the second shake amounts stored in the second shake amount storage section 246. More specifically, the translational shake amount computer 244 calculates the translational shake amounts $fx(t)$ and $fy(t)$ by using the above-mentioned Formulas 21 and 22.

In calculating the amount of translational shake, it is necessary to synchronize the first and second shake amounts, and in this case the synchronization processing is carried out by a time information acquisition section 249 and the translational shake amount computer 244.

More specifically, the time information acquisition section 249 starts keeping track of the time T11 at the point of receiving a shutter timing signal from the shutter button detector 221. The time information acquisition section 249 keeps track of the time from when the shutter button is pressed on the basis of a vertical synchronization signal outputted from the drive circuit 224 (more accurately, from when the shutter timing signal is received by the time information acquisition section 249) until the vertical synchronization signal is received. Consequently, the timing at which an image is acquired can be identified using the time when the shutter button is switched on as a reference.

Meanwhile, detection and storage of the second shake amounts are begun by the second shake amount computer 245 and the second shake amount storage section 246 on the basis of the shutter timing signal outputted from the shutter button detector 221. The second shake amounts are stored in the second shake amount storage section 246 along with the time since the shutter button was switched on.

The translational shake amount computer 244 selects the second shake amount detected when the vertical synchronization signal was outputted, from among the second shake amounts stored in the second shake amount storage section 246. The amount of translational shake is calculated from Formulas 21 and 22 on the basis of the selected second shake amount and the first shake amount calculated by movement vector detection. Thus, synchronization of the first and second shake amounts is performed by the time information acquisition section 249 and the translational shake amount computer 244.

As described above, the first shake amount may be calculated by image processing, such as movement vector detection. In this case, the above-mentioned synchronization signal generation device 7 and test pattern display device 5 can be omitted, which allows the system to be simplified.

This shake measurement mode of the camera 212 can also be used when a user or a developer is trying to ascertain the amount of shake of a camera, or when a user is learning an imaging method that reduces shake.

Also, the technology of this camera 212 can be utilized in the field of game devices, which require the movement of the device to be detected, for example.

(B)

A MEMS was used as an example of the triaxial gyro sensor 3 in the above embodiment, but the gyro sensor can instead be a mechanical gyro sensor that makes use of rotational momentum, or an optical gyro sensor that makes use of the Sagnac effect. Also, a gyro sensor was used as an example of the sensor for acquiring the second shake amount, but another type of sensor may be used instead.

(C)

The order of the above-mentioned steps S1 to S10 is not limited to the order shown in FIG. 14.

(D)

The light emitting elements of the light emitter 71 are not limited to the LED elements 72, and may instead be some other type of light emitting elements.

It is also possible to use a display device (such as a plasma display panel) having a faster display update rate than a liquid crystal monitor, in place of the liquid crystal monitor 55. In this case, all that needs to be done is to capture the image displayed on the display device by displaying a pattern that stands for the light emitter 71 next to the test pattern. Here again, the synchronization signal generation device 7 can be omitted.

(E)

In the above embodiment, if a vertical synchronization signal can be taken out of the camera 2, then a vertical synchronization signal that is sent to an imaging element 17 may be utilized just as with the camera 112 for the purpose of synchronization. In this case, the synchronization signal generation device 7 can be omitted.

(F)

In the above embodiment, the shake amount computer 4 has the image cropper 48, but the image cropper 48 can also be omitted if there is no problem with processing by the pattern matching processor 42 and the time information acquisition section 49.

(G)

The imaging device need not be just a compact digital camera, and can also be an interchangeable type of digital camera.

INDUSTRIAL APPLICABILITY

The shake measurement system pertaining to the present invention is useful in the field of imaging devices because the amount of shake can be measured accurately.

REFERENCE SIGNS LIST

1 shake measurement system
2 camera
21 shutter button detector
22 image acquisition section
23 housing
3 triaxial gyro sensor (an example of a second shake amount acquisition section)
4 shake amount computer (an example of a third shake amount acquisition section)
40 time computer (an example of a synchronization information acquisition section)
41 test pattern storage section
42 pattern matching processor (an example of a first shake amount computer)
43 first shake amount storage section
44 translational shake amount computer
45 second shake amount computer
46 second shake amount storage section
47 captured image storage section
48 image cropper
49 time information acquisition section (an example of a synchronization information acquisition section)
5 test pattern display device (an example of a first shake amount acquisition section)
51 control device
52 test pattern storage section
53 display controller (an example of a first synchronization signal generator)
55 liquid crystal monitor (an example of a pattern display section)
7 synchronization signal generation device (an example of a synchronization information acquisition section)
71 light emitter (an example of a time information display section)
72 LED element
73 LED drive controller (an example of a second synchronization signal generator)
P1 to P9 test patterns

The invention claimed is:

1. A shake measurement system for measuring an amount of shake of a housing that contains an image acquisition section, the shake measurement system comprising:
   a first shake amount acquisition section configured to acquire an amount of shake of the housing as a first shake amount by using image processing;
   a second shake amount acquisition section configured to acquire an amount of shake of the housing as a second shake amount by a different method from a method of the first shake amount acquisition section;
   a third shake amount acquisition section configured to acquire an amount of translational shake of the housing on the basis of the first shake amount and the second shake amount; and
   a synchronization information acquisition section configured to acquire synchronization information for synchronizing the first shake amount and the second shake amount, wherein:
   the third shake amount acquisition section is configured to calculate the amount of translational shake by using the synchronization information,
   the synchronization information acquisition section includes a time information display section whose display allows a change in time to be visually discerned,
   the first shake amount acquisition section includes a pattern display section configured to successively display a plurality of mutually different test patterns, and a first shake amount computer configured to compute the first shake amount by the image processing, and
   the image processing is performed on the basis of a captured image including an image of the time information display section acquired by the image acquisition section and an image of the pattern display section.

2. The shake measurement system according to claim 1, wherein
the first shake amount acquisition section further includes a first synchronization signal generator configured to generate a first synchronization signal when a particular test pattern out of the plurality of test patterns is displayed on the pattern display section.

3. The shake measurement system according to claim 2, wherein
the time information display section is configured to successively display a plurality of mutually different patterns, and
the synchronization information acquisition section further includes a second synchronization signal generator configured to generate a second synchronization signal when a particular pattern out of the plurality of patterns is displayed.

4. The shake measurement system according to claim 3, wherein
the synchronization information acquisition section further includes a time information acquisition section configured to acquire the synchronization information on the basis of the second synchronization signal and the image of the time information display section included in the captured image.

5. A shake measurement system for measuring an amount of shake of a housing that contains an image acquisition section, the shake measurement system comprising:
a first shake amount acquisition section configured to acquire an amount of shake of the housing as a first shake amount by using image processing;
a second shake amount acquisition section configured to acquire an amount of shake of the housing as a second shake amount by a different method from a method of the first shake amount acquisition section; and
a third shake amount acquisition section configured to acquire an amount of translational shake of the housing on the basis of the first shake amount and the second shake amount,
wherein the third shake amount acquisition section is configured to calculate the amount of translational shake by using the following formula, where f1 is the first shake amount, θ2 is the second shake amount, f3 is the amount of translational shake, and L is the imaging distance:

$f3 = f1 - L \times \tan(\theta 2)$.

6. The shake measurement system according to claim 5, wherein:
the first shake amount includes at least an amount of translational shake of the housing, and
the second shake amount does not include the amount of translational shake of the housing.

7. The shake measurement system according to claim 1, wherein
the second shake amount acquisition section is configured to acquire the second shake amount by utilizing a physical change brought about by shaking of the housing.

8. The shake measurement system according to claim 1, wherein
the second shake amount acquisition section is configured to acquire an amount of rotational shake of the housing around at least one reference axis as the second shake amount.

9. The shake measurement system according to claim 1, further comprising:
a synchronization information acquisition section configured to acquire synchronization information for synchronizing the first shake amount and the second shake amount, wherein
the third shake amount acquisition section is configured to calculate the amount of translational shake by using the synchronization information.

10. The shake measurement system according to claim 9, wherein
the synchronization information acquisition section includes a time information display section whose display allows a change in time to be visually discerned.

11. The shake measurement system according to claim 1, wherein
the translational shake includes a translational movement of the housing that occurs when the housing moves in parallel in a state in which orientation of the housing does not change with respect to the coordinate system and a rotational movement of the housing that occurs when a rotational center of the rotational movement moves away from the housing.

12. An imaging device, comprising:
a housing;
an image acquisition section housed in the housing and configured to acquire image data for a subject;
a first shake amount acquisition section configured to acquire an amount of shake of the housing as a first shake amount on the basis of the image data acquired by the image acquisition section, the first shake amount including at least an amount of translational shake of the housing;
a second shake amount acquisition section configured to acquire an amount of shake of the housing as a second shake amount by a different method from that of the first shake amount acquisition section, the second shake amount not including the amount of translational shake of the housing;
a third shake amount acquisition section configured to acquire the amount of translational shake of the housing, as a third shake amount, on the basis of a difference between the first shake amount and the second shake amount; and
a blur correction device configured to reduce an effect that shake of the housing has on the image data on the basis of the second shake amount and the third shake amount,
wherein the third shake amount acquisition section is configured to calculate the amount of translational shake by using the following formula, where f1 is the first shake amount, θ2 is the second shake amount, f3 is the amount of translational shake, and L is the imaging distance:

$f3 = f1 - L \times \tan(\theta 2)$.

13. The imaging device according to claim 12, wherein
the third shake amount acquisition section configured to start acquiring the third shake amount at least before acquisition of image data is performed by the image acquisition section.

14. The imaging device according to claim 13, further comprising:
a manipulation section with which a user can input first manipulation information and second manipulation information inputted after the first manipulation information, the second manipulation information being used for executing the acquisition of the image data by the image acquisition section, wherein the third shake amount acquisition section is configured to start acquiring the third shake amount on the basis of the first manipulation information.

15. The imaging device according to claim 14, wherein the third shake amount acquisition section is configured to stop acquiring the third shake amount on the basis of the second manipulation information.

16. The imaging device according to claim 15, wherein the blur correction device is configured to reduce the effect that shake of the housing has on the image data by using the second shake amount acquired after the input of the second manipulation information.

17. The imaging device according to claim 12, wherein the third shake amount acquisition section starts acquiring the third shake amount when an imaging mode is switched to live view mode.

18. The imaging device according to claim 12, wherein the third shake amount acquisition section is configured to continue acquiring the third shake amount until the blur correction device starts correction.

19. The imaging device according to claim 12, further comprising:
a display section configured to display a captured image, wherein
the display section is designed to display at lease one of the second shake amount and the third shake amount.

20. An imaging device comprising:
the housing;
the image acquisition section; and
the shake measurement system according to claim 1.

21. A shake measurement method for measuring an amount of shake of a housing that contains an image acquisition section, the method comprising:
a step of using image processing to acquire an amount of shake of the housing as a first shake amount, the first shake amount including at least an amount of translational shake of the housing;
a step of acquiring an amount of shake of the housing as a second shake amount by a different method from a method of the first shake amount acquisition section, the second shake amount not including the amount of translational shake of the housing; and
a step of acquiring the amount of translational shake of the housing on the basis of a difference between the first shake amount and the second shake amount,
wherein the third shake amount acquisition section is configured to calculate the amount of translational shake by using the following formula, where f1 is the first shake amount, θ2 is the second shake amount, f3 is the amount of translational shake, and L is the imaging distance:

$f3 = f1 - L \times \tan(\theta 2)$.

\* \* \* \* \*